(12) United States Patent
Gandhi

(10) Patent No.: US 7,516,214 B2
(45) Date of Patent: Apr. 7, 2009

(54) RULES ENGINE FOR MANAGING VIRTUAL LOGICAL UNITS IN A STORAGE NETWORK

(75) Inventor: Shreyas P. Gandhi, Sunnyvale, CA (US)

(73) Assignee: EMC Corporation, Hopkinton, PA (US)

( * ) Notice: Subject to any disclaimer, the term of this patent is extended or adjusted under 35 U.S.C. 154(b) by 955 days.

(21) Appl. No.: 10/931,794

(22) Filed: Aug. 31, 2004

(65) Prior Publication Data

US 2006/0080416 A1    Apr. 13, 2006

(51) Int. Cl.
*G06F 13/00* (2006.01)
(52) U.S. Cl. ...................................... 709/224
(58) Field of Classification Search .................. 709/224
See application file for complete search history.

(56) References Cited

U.S. PATENT DOCUMENTS

2002/0180795 A1* 12/2002 Wright ........................ 345/772

* cited by examiner

*Primary Examiner*—Robert B Harrell
(74) *Attorney, Agent, or Firm*—Barry N. Young

(57) ABSTRACT

A rules engine is provided to enhance management capability in storage area networks and particularly within storage switches. Resulting state and status information for virtual logical units can be maintained in a database. The database can be indexed according to the current state and/or status of members of a virtual logical unit. When an event associated with a physical target of a virtual logical unit is detected, the current state and status of members of the virtual logical unit can be determined. The current state and status information can be maintained in dynamic state and status indicator. The current state and status information can be used to identify a corresponding entry in the rules database. From the rules database, the proper resulting status and/or state of the members and/or the virtual logical unit can be determined.

28 Claims, 36 Drawing Sheets

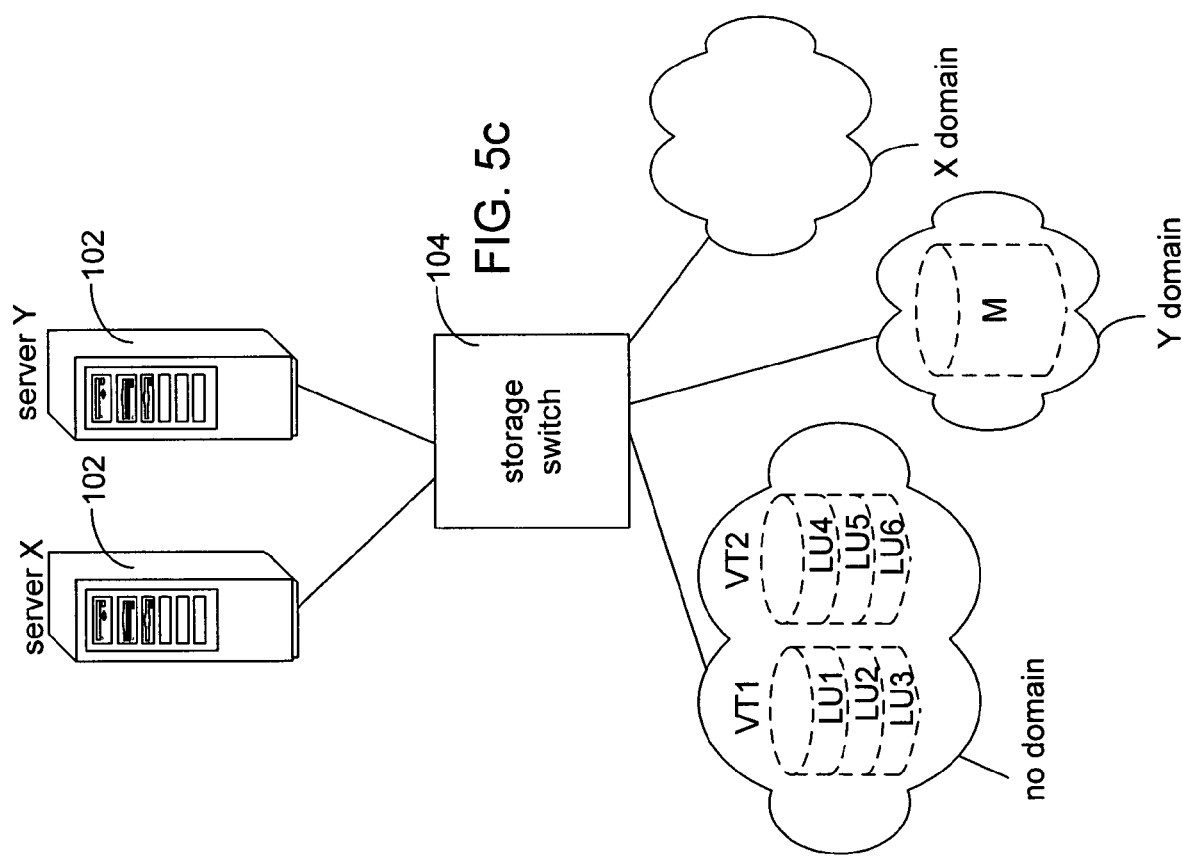

(Classification - PACE - iSCSI - egress)

(classification - PACE -
FCP - ingress)

(classification - PACE -
FCP - egress)

(Classification - PPU - ingress)

(Classification - PPU - egress)

(Virtualization Ingress - cmd)

(Virtualization - Egress - cmd)

(Virtualization - Ingress - R2T/XFR_RDY)

(Virtualization - Egress -
R2T/XFR_RDY)

(Virtualization - Ingress - write data packet)

(Virtualization - Egress - write data pkt)

| O | Online |
|---|---|
| X | Offline |
| S | Synchronized |
| N | Needs Synchronization |
| IZ | Synchronizing |
| SOMC | Synchronized & Online Member Count |
| UT | Un-Touched |

FIG. 25

| rule number | event member state | member 2 status | member 2 state | resulting event member state | resulting member 2 status | resulting member 2 state | resulting CVLU status |
|---|---|---|---|---|---|---|---|
| 1. | S | O | S | NS | O | S | O |
| 2. | S | O | IZ | S | O | NS | X |
| 3. | S | O | NS | S | O | NS | X |
| 4. | S | X | S | S | X | NS | X |
| 5. | S | X | NS | S | X | NS | X |
| 6. | S | X | IZ | S | X | NS | X |
| 7. | IZ | O | S | NS | O | S | O |

FIG. 24

| rule # | event member state | member 2 status | member 2 state | resulting event member state | resulting member 2 status | resulting member 2 state | resulting VLU status |
|---|---|---|---|---|---|---|---|
| 1. | S | O | S | IZ | O | S | O |
| 2. | S | O | NS | S | O | IZ | O |
| 3. | S | X | NS | S | X | NS | O |
| 4. | NS | O | S | IZ | O | S | O |
| 5. | NS | X | S | NS | X | S | X |

FIG. 26

| rule # | event member state | member 2 status | member 2 state | member 3 status | member 3 state | resulting event member state | resulting member 2 status | resulting member 2 state | resulting member 3 status | resulting member 3 state | resulting VLU status |
|---|---|---|---|---|---|---|---|---|---|---|---|
| 2. | S | O | S | X | S | IZ | O | S | X | S | O |
| 3. | S | X | S | O | S | IZ | X | S | O | S | O |
| 4. | S | X | S | X | S | IZ | X | S | X | S | O |
| 5. | NS | O | S | O | S | IZ | O | S | O | S | O |
| 6. | NS | O | S | X | S | IZ | O | S | X | S | O |
| 7. | NS | X | S | O | S | IZ | X | S | O | S | O |
| 8. | NS | X | S | X | S | IZ | X | S | X | S | O |
| 9. | IZ | O | S | O | S | IZ | O | S | O | S | O |
| 10. | IZ | O | S | X | S | IZ | O | S | X | S | O |
| 11. | IZ | X | S | O | S | IZ | X | S | O | S | O |
| 12. | IZ | X | S | X | S | IZ | X | S | X | S | O |
| 13. | S | O | S | O | NS | IZ | O | S | O | NS | O |
| 14. | S | O | S | X | NS | IZ | O | S | X | NS | O |
| 15. | S | X | S | O | NS | IZ | X | S | O | NS | O |
| 16. | S | X | S | X | NS | IZ | X | S | X | NS | O |
| 17. | NS | O | S | O | NS | IZ | O | S | O | NS | O |
| 18. | NS | O | S | X | NS | IZ | O | S | X | NS | O |
| 19. | NS | X | S | O | NS | IZ | X | S | O | NS | O |
| 20. | NS | X | S | X | NS | IZ | X | S | X | NS | O |
| 21. | IZ | O | S | O | NS | IZ | O | S | O | NS | O |
| 22. | IZ | O | S | X | NS | IZ | O | S | X | NS | O |
| 23. | IZ | X | S | O | NS | IZ | X | S | O | NS | O |
| 24. | IZ | X | S | X | NS | IZ | X | S | X | NS | O |
| 25. | S | O | S | O | IZ | NS | O | S | O | IZ | O |
| 26. | S | O | S | X | IZ | NS | O | S | X | NS | O |
| 27. | S | X | S | O | IZ | S | X | NS | O | IZ | O |
| 28. | S | X | S | X | IZ | NS | X | S | X | NS | X |
| 29. | NS | O | S | O | IZ | NS | O | S | O | IZ | O |
| 30. | NS | O | S | X | IZ | IZ | O | S | X | NS | O |
| 31. | NS | X | S | O | IZ | NS | X | S | O | NS | X |
| 32. | NS | X | S | X | IZ | NS | X | S | X | NS | X |
| 33. | IZ | O | S | O | IZ | NS | O | S | O | IZ | O |
| 34. | IZ | O | S | X | IZ | IZ | O | S | X | NS | O |
| 35. | IZ | X | S | O | IZ | NS | X | S | O | NS | X |
| 36. | IZ | X | S | X | IZ | NS | X | S | X | NS | X |

| rule # | event member state | member 2 status | member 2 state | member 3 status | member 3 state | resulting event member state | resulting member 2 status | resulting member 2 state | resulting member 3 status | resulting member 3 state | resulting VLU status |
|---|---|---|---|---|---|---|---|---|---|---|---|
| 37. | S | O | NS | O | S | IZ | O | NS | O | S | O |
| 38. | S | O | NS | X | S | NS | O | NS | X | S | X |
| 39. | S | X | NS | O | S | IZ | X | NS | O | S | O |
| 40. | S | X | NS | X | S | NS | X | NS | X | S | X |
| 41. | NS | O | NS | O | S | IZ | O | NS | O | S | O |
| 42. | NS | O | NS | X | S | NS | O | NS | X | S | X |
| 43. | NS | X | NS | O | S | IZ | X | NS | O | S | O |
| 44. | NS | X | NS | X | S | NS | X | NS | X | S | X |
| 45. | IZ | O | NS | O | S | IZ | O | NS | O | S | O |
| 46. | IZ | O | NS | X | S | NS | O | NS | X | S | X |
| 47. | IZ | X | NS | O | S | IZ | X | NS | O | S | O |
| 48. | IZ | X | NS | X | S | NS | X | NS | X | S | X |
| 49. | S | O | NS | O | NS | S | O | IZ | O | NS | O |
| 50. | S | O | NS | O | IZ | S | O | IZ | O | NS | O |
| 51. | S | O | IZ | O | NS | S | O | IZ | O | NS | O |
| 52. | S | O | IZ | O | IZ | S | O | IZ | O | NS | O |
| 53. | S | O | NS | X | NS | S | O | IZ | X | NS | O |
| 54. | S | O | NS | X | IZ | S | O | IZ | X | NS | O |
| 55. | S | O | IZ | X | NS | S | O | IZ | X | NS | O |
| 56. | S | O | IZ | X | IZ | S | O | IZ | X | NS | O |
| 57. | S | X | NS | O | NS | S | X | NS | O | IZ | O |
| 58. | S | X | NS | O | IZ | S | X | NS | O | IZ | O |
| 59. | S | X | IZ | O | NS | S | X | NS | O | IZ | O |
| 60. | S | X | IZ | O | IZ | S | X | NS | O | IZ | O |
| 61. | S | X | NS | X | NS | S | X | NS | X | NS | O |
| 62. | S | X | NS | X | IZ | S | X | NS | X | NS | O |
| 63. | S | X | IZ | X | NS | S | X | NS | X | NS | O |
| 64. | S | X | IZ | X | IZ | S | X | NS | X | NS | O |
| 65. | S | O | IZ | O | S | NS | O | IZ | O | S | O |
| 66. | S | O | IZ | X | S | NS | O | NS | X | S | X |
| 67. | S | X | IZ | O | S | IZ | X | NS | O | S | O |
| 68. | S | X | IZ | X | S | NS | X | NS | X | S | X |
| 69. | NS | O | IZ | O | S | NS | O | IZ | O | S | O |
| 70. | NS | O | IZ | X | S | NS | O | NS | X | S | X |
| 71. | NS | X | IZ | O | S | IZ | X | NS | O | S | O |
| 72. | NS | X | IZ | X | S | NS | X | NS | X | S | X |
| 73. | IZ | O | IZ | O | S | NS | O | IZ | O | S | O |
| 74. | IZ | O | IZ | X | S | NS | O | NS | X | S | X |
| 75. | IZ | X | IZ | O | S | IZ | X | NS | O | S | O |
| 76. | IZ | X | IZ | X | S | NS | X | NS | X | S | X |

| rule # | event member state | member 2 status | member 2 state | member 3 status | member 3 state | resulting event member state | resulting member 2 status | resulting member 2 state | resulting member 3 status | resulting member 3 state | resulting VLU status |
|---|---|---|---|---|---|---|---|---|---|---|---|
| 1. | S | O | S | O | S | NS | O | S | O | S | O |
| 2. | S | O | S | X | S | NS | O | S | X | S | O |
| 3. | S | X | S | O | S | NS | X | S | O | S | O |
| 4. | S | X | S | X | S | S | X | NS | X | NS | X |
| 5. | NS | O | S | O | S | NS | O | S | O | S | O |
| 6. | NS | O | S | X | S | NS | O | S | X | NS | O |
| 7. | NS | X | S | O | S | NS | X | NS | O | S | O |
| 8. | NS | X | S | X | S | NS | X | S | X | S | X |
| 9. | IZ | O | S | O | S | NS | O | S | O | S | O |
| 10. | IZ | O | S | X | S | NS | O | S | X | NS | O |
| 11. | IZ | X | S | O | S | NS | X | NS | O | S | O |
| 12. | IZ | X | S | X | S | NS | X | S | X | S | X |
| 13. | S | O | S | O | IZ | NS | O | S | O | IZ | O |
| 14. | S | O | S | X | IZ | NS | O | S | X | NS | O |
| 15. | S | X | S | O | IZ | S | X | NS | O | NS | X |
| 16. | S | X | S | X | IZ | S | X | NS | X | NS | X |
| 17. | NS | O | S | O | IZ | NS | O | S | O | IZ | O |
| 18. | NS | O | S | X | IZ | NS | O | S | X | NS | O |
| 19. | NS | X | S | O | IZ | NS | X | S | O | NS | X |
| 20. | NS | X | S | X | IZ | NS | X | S | X | NS | X |
| 21. | IZ | O | S | O | IZ | NS | O | S | O | IZ | O |
| 22. | IZ | O | S | X | IZ | NS | O | S | X | NS | O |
| 23. | IZ | X | S | O | IZ | NS | X | S | O | NS | X |
| 24. | IZ | X | S | X | IZ | NS | X | S | X | NS | X |
| 25. | S | O | S | O | NS | NS | O | S | O | IZ | O |
| 26. | S | O | S | X | NS | NS | O | S | X | NS | O |
| 27. | S | X | S | O | NS | S | X | NS | O | NS | X |
| 28. | S | X | S | X | NS | S | X | NS | X | IZ | X |
| 29. | NS | O | S | O | NS | NS | O | S | O | IZ | O |
| 30. | NS | O | S | X | NS | NS | O | S | X | NS | O |
| 31. | NS | X | S | O | NS | NS | X | S | O | NS | X |
| 32. | NS | X | S | X | NS | NS | X | S | X | NS | X |
| 33. | IZ | O | S | O | NS | NS | O | S | O | IZ | O |
| 34. | IZ | O | S | X | NS | NS | O | S | X | NS | O |
| 35. | IZ | X | S | O | NS | NS | X | S | O | NS | X |
| 36. | IZ | X | S | X | NS | NS | X | S | X | NS | X |

| rule # | event member state | member 2 status | member 2 state | member 3 status | member 3 state | resulting event member state | resulting member 2 status | resulting member 2 state | resulting member 3 status | resulting member 3 state | resulting VLU status |
|---|---|---|---|---|---|---|---|---|---|---|---|
| 37 | S | O | NS | O | S | NS | O | IZ | O | S | O |
| 38 | S | O | NS | X | S | NS | O | NS | X | S | X |
| 39 | S | X | NS | O | S | NS | X | NS | O | S | O |
| 40 | S | X | NS | X | S | S | X | NS | X | NS | X |
| 41 | NS | O | NS | O | S | NS | O | IZ | O | S | O |
| 42 | NS | O | NS | X | S | NS | O | NS | X | S | X |
| 43 | NS | X | NS | O | S | NS | X | NS | O | S | O |
| 44 | NS | X | NS | X | S | NS | X | NS | X | S | X |
| 45 | IZ | O | NS | O | S | NS | O | IZ | O | S | O |
| 46 | IZ | O | NS | X | S | NS | O | NS | X | S | X |
| 47 | IZ | X | NS | O | S | NS | X | NS | O | S | O |
| 48 | IZ | X | NS | X | S | NS | X | NS | X | S | X |
| 49 | S | O | IZ | O | S | NS | O | IZ | O | S | O |
| 50 | S | O | IZ | X | S | S | O | NS | X | NS | X |
| 51 | S | X | IZ | O | S | NS | X | NS | O | S | O |
| 52 | S | X | IZ | X | S | S | X | NS | X | NS | X |
| 53 | NS | O | IZ | O | S | NS | O | IZ | O | S | O |
| 54 | NS | O | IZ | X | S | NS | O | NS | X | S | X |
| 55 | NS | X | IZ | O | S | NS | X | NS | O | S | O |
| 56 | NS | X | IZ | X | S | NS | X | NS | X | S | X |
| 57 | IZ | O | IZ | O | S | NS | O | IZ | O | S | O |
| 58 | IZ | O | IZ | X | S | NS | O | NS | X | S | X |
| 59 | IZ | X | IZ | O | S | NS | X | NS | O | S | O |
| 60 | IZ | X | IZ | X | S | NS | X | NS | X | S | X |
| 61 | S | O | NS | O | NS | S | O | NS | O | NS | X |
| 62 | S | O | NS | X | NS | S | O | NS | X | NS | X |
| 63 | S | X | NS | O | NS | S | X | NS | O | NS | X |
| 64 | S | X | NS | X | NS | S | X | NS | X | NS | X |
| 65 | S | O | NS | O | IZ | S | O | NS | O | NS | X |
| 66 | S | O | NS | X | IZ | S | O | NS | X | NS | X |
| 67 | S | X | NS | O | IZ | S | X | NS | O | NS | X |
| 68 | S | X | NS | X | IZ | S | X | NS | X | NS | X |
| 69 | S | O | IZ | O | NS | S | O | NS | O | NS | X |
| 70 | S | O | IZ | X | NS | S | O | NS | X | NS | X |
| 71 | S | X | IZ | O | NS | S | X | NS | O | NS | X |
| 72 | S | X | IZ | X | NS | S | X | NS | X | NS | X |
| 73 | S | O | IZ | O | IZ | S | O | NS | O | NS | X |
| 74 | S | O | IZ | X | IZ | S | O | NS | X | NS | X |
| 75 | S | X | IZ | O | IZ | S | X | NS | O | NS | X |
| 76 | S | X | IZ | X | IZ | S | X | NS | X | NS | X |

FIG. 29b

| rule # | event member state | member 2 status | member 2 state | member 3 status | member 3 state | member 4 status | member 4 state | resulting event member state | resulting member 2 status | resulting member 2 state | resulting member 3 status | resulting member 3 state | resulting member 4 status | resulting member 4 state | resulting VLU status |
|---|---|---|---|---|---|---|---|---|---|---|---|---|---|---|---|
| 1 | * | UT | S | UT | S | UT | S | NS | UT | S | UT | S | UT | S | O |
| 2 | * | O | S | O | S | O | NS/IZ | NS | O | S | O | S | O | IZ | O |
| 3 | * | O | S | O | S | X | NS/IZ | NS | O | S | O | S | X | NS | O |
| 4 | * | O | S | X | S | O | NS/IZ | NS | O | S | X | NS | O | IZ | O |
| 5 | S | O | S | X | S | X | NS/IZ | S | O | S | X | NS | X | NS | O |
| 6 | S | X | S | X | S | X | NS/IZ | S | X | NS | X | NS | X | NS | X |
| 7 | * | O | S | O | NS/IZ | O | S | NS | O | S | O | IZ | O | S | O |
| 8 | * | O | S | O | NS/IZ | X | S | NS | O | S | O | IZ | X | NS | O |
| 9 | * | O | S | X | NS/IZ | O | S | NS | O | S | X | NS | O | S | O |
| 10 | * | O | S | X | NS/IZ | X | S | NS | O | S | X | NS | X | NS | O |
| 11 | S | X | S | X | NS/IZ | X | S | S | X | NS | X | NS | X | NS | X |
| 12 | * | X | S | O | NS/IZ | O | S | NS | X | NS | O | IZ | O | S | O |
| 13 | * | X | S | X | NS/IZ | O | S | NS | X | NS | X | NS | O | S | O |
| 14 | IZ/NS | X | S | X | NS/IZ | X | S | NS | X | S | X | NS | X | S | X |
| 15 | * | O | S | O | NS/IZ | X | NS | NS | O | S | O | IZ | X | NS | O |
| 16 | * | O | S | X | NS/IZ | O | NS | NS | O | S | X | NS | O | IZ | O |
| 17 | S | X | S | UT | NS/IZ | UT | NS | S | X | NS | UT | NS | UT | NS | X |
| 18 | NS/IZ | X | S | UT | NS/IZ | O | NS | NS | X | S | UT | NS | UT | NS | X |
| 19 | * | O | S | O | NS | X | NS/IZ | NS | O | S | O | IZ | X | NS | O |
| 20 | * | O | S | X | NS | O | NS/IZ | NS | O | S | X | NS | O | IZ | O |
| 21 | S | X | S | UT | NS/IZ | UT | NS | S | X | NS | UT | NS | UT | NS | X |
| 22 | NS/IZ | X | S | UT | NS/IZ | UT | NS | NS | X | S | UT | NS | UT | NS | X |
| 23 | * | O | S | O | NS/IZ | O | S | NS | O | S | O | IZ | UT | S | O |
| 24 | * | O | S | X | NS/IZ | O | S | NS | O | S | X | NS | O | S | O |
| 25 | * | O | S | X | NS/IZ | X | S | NS | O | S | X | NS | X | NS | O |
| 26 | * | X | S | O | NS/IZ | O | S | NS | X | NS | O | IZ | O | S | O |
| 27 | S | X | S | O | NS/IZ | X | S | S | X | NS | O | NS | X | NS | X |
| 28 | NS/IZ | X | S | O | NS/IZ | X | S | NS | X | S | O | NS | X | S | O |
| 29 | * | X | S | X | NS/IZ | O | S | NS | X | NS | X | NS | O | S | O |
| 30 | S | X | S | X | NS/IZ | X | S | S | X | NS | X | NS | X | NS | X |
| 31 | NS/IZ | X | S | X | NS/IZ | X | S | NS | X | S | X | NS | X | S | X |
| 32 | * | O | S | O | IZ | O | IZ | NS | O | S | O | IZ | O | IZ | O |
| 33 | S | X | S | O | IZ | O | IZ | S | X | NS | O | NS | O | NS | X |
| 34 | * | O | NS | O | S | O | S | NS | O | IZ | O | S | O | S | O |
| 35 | * | X | NS | O | S | O | S | NS | X | NS | O | S | O | S | O |
| 36 | * | O | NS/IZ | O | S | O | NS | NS | O | IZ | O | S | O | NS | O |

| rule # | event member state | member 2 status | member 2 state | member 3 status | member 3 state | member 4 status | member 4 state | resulting event member state | resulting member 2 status | resulting member 2 state | resulting member 3 status | resulting member 3 state | resulting member 4 status | resulting member 4 state | resulting VLU status |
|---|---|---|---|---|---|---|---|---|---|---|---|---|---|---|---|
| 37 | * | X | NS/IZ | O | S | O | NS | NS | X | NS | O | S | O | IZ | O |
| 38 | * | X | NS/IZ | O | S | X | NS | NS | X | NS | O | S | X | NS | O |
| 39 | * | UT | NS | UT | S | UT | IZ | NS | UT | NS | UT | S | UT | IZ | O |
| 40 | * | O | NS/IZ | O | NS | O | S | NS | O | IZ | O | NS | O | S | O |
| 41 | S | O | NS/IZ | O | NS | X | S | S | O | NS | O | NS | X | NS | X |
| 42 | NS/IZ | O | NS/IZ | O | NS | X | S | NS | O | NS | O | NS | X | S | X |
| 43 | * | O | NS/IZ | X | NS | O | S | NS | O | IZ | X | NS | O | S | O |
| 44 | S | O | NS/IZ | X | NS | X | S | NS | O | NS | X | NS | X | S | X |
| 45 | NS/IZ | O | NS/IZ | X | NS | X | S | S | O | NS | X | NS | X | NS | X |
| 46 | * | X | NS/IZ | O | NS | O | S | NS | X | NS | O | IZ | O | S | O |
| 47 | S | X | NS/IZ | O | NS | X | S | S | X | NS | O | NS | X | NS | X |
| 48 | NS/IZ | X | NS/IZ | O | NS | X | S | NS | X | NS | O | NS | X | S | X |
| 49 | * | X | NS/IZ | X | NS | O | S | NS | X | NS | X | NS | O | S | O |
| 50 | S | X | NS/IZ | X | NS | X | S | S | X | NS | X | NS | X | NS | X |
| 51 | NS/IZ | X | NS/IZ | X | NS | X | S | NS | X | NS | X | NS | X | S | X |
| 52 | S | UT | NS | UT | NS | UT | NS | S | UT | NS | UT | NS | UT | NS | X |
| 53 | * | O | NS | O | IZ | O | S | NS | O | NS | O | IZ | O | S | O |
| 54 | S | O | NS | UT | IZ | X | S | S | O | NS | O | NS | X | NS | X |
| 55 | NS/IZ | O | NS | O | IZ | X | S | NS | O | NS | O | NS | X | S | X |
| 56 | * | O | NS | X | IZ | O | S | NS | O | IZ | X | NS | O | S | O |
| 57 | NS/IZ | O | NS | X | IZ | X | S | NS | O | NS | X | NS | X | S | X |
| 58 | * | X | NS | O | IZ | O | S | NS | X | NS | O | IZ | O | S | O |
| 59 | S | X | NS | O | IZ | X | S | S | X | NS | X | NS | X | NS | X |
| 60 | NS/IZ | X | NS | UT | IZ | X | S | NS | X | NS | UT | NS | X | S | X |
| 61 | * | X | NS | X | IZ | O | S | NS | X | NS | X | NS | O | S | O |
| 62 | S | X | NS | X | IZ | X | S | S | X | NS | X | NS | X | NS | X |
| 63 | * | O | IZ | O | S | O | S | NS | O | IZ | O | S | O | S | O |
| 64 | * | O | IZ | O | S | X | S | NS | O | IZ | O | S | X | S | O |
| 65 | * | O | IZ | X | S | O | S | NS | O | IZ | X | S | O | S | O |
| 66 | S | O | IZ | X | S | X | S | S | O | NS | X | NS | X | NS | X |
| 67 | * | O | IZ | O | S | UT | NS | NS | O | IZ | O | S | UT | NS | O |
| 68 | S | UT | IZ | X | S | UT | NS | S | UT | NS | X | NS | UT | NS | X |
| 69 | * | O | IZ | O | S | O | IZ | NS | O | IZ | O | S | O | IZ | O |
| 70 | S | O | IZ | X | S | O | IZ | S | O | NS | X | NS | O | NS | O |
| 71 | * | O | IZ | O | IZ | O | S | NS | O | IZ | O | IZ | O | S | O |
| 72 | S | O | IZ | O | IZ | X | S | S | O | NS | O | NS | X | NS | O |
| 73 | NS/IZ | O | IZ | O | IZ | X | S | NS | O | NS | O | NS | X | S | O |
| 74 | NS | UT | NS | UT | NS | UT | NS | NS | UT | NS | UT | NS | UT | NS | X |

| rule # | event member state | member 2 status | member 2 state | member 3 status | member 3 state | member 4 status | member 4 state | resulting event member state | resulting member 2 status | resulting member 2 state | resulting member 3 status | resulting member 3 state | resulting member 4 status | resulting member 4 state | resulting VLU status |
|---|---|---|---|---|---|---|---|---|---|---|---|---|---|---|---|
| 1. | S | UT | S | UT | S | UT | S | NS | UT | S | UT | S | UT | S | O |
| 2. | * | O | S | UT | S | O | NS/IZ | NS | O | S | UT | S | O | IZ | O |
| 3. | * | UT | S | O | S | O | NS/IZ | NS | UT | S | O | S | O | IZ | O |
| 4. | * | O | S | UT | S | X | NS/IZ | NS | UT | S | UT | S | X | NS | O |
| 5. | * | UT | S | O | S | X | NS/IZ | NS | UT | S | O | S | X | NS | O |
| 6. | S | X | S | X | S | O | NS/IZ | S | X | NS | X | NS | O | IZ | O |
| 7. | S | X | S | X | S | X | NS/IZ | S | X | NS | X | NS | X | NS | O |
| 8. | * | O | S | O | NS/IZ | UT | S | NS | O | S | O | IZ | UT | S | O |
| 9. | * | UT | S | O | NS/IZ | O | S | NS | UT | S | O | IZ | O | S | O |
| 10. | S | X | S | X | NS/IZ | X | S | S | X | NS | X | NS | X | NS | O |
| 11. | * | O | S | X | NS/IZ | UT | S | IZ | O | S | X | NS | UT | S | O |
| 12. | * | UT | S | X | NS/IZ | O | S | IZ | UT | S | X | NS | O | S | O |
| 13. | * | O | S | O | NS/IZ | UT | NS | NS | O | S | O | IZ | UT | NS | O |
| 14. | * | O | S | X | NS/IZ | O | NS | NS | O | S | X | NS | O | IZ | O |
| 15. | * | O | S | X | NS/IZ | X | NS | IZ | O | S | X | NS | X | NS | O |
| 16. | S | X | S | UT | NS/IZ | UT | NS | NS | X | S | X | NS | X | NS | X |
| 17. | * | O | S | O | NS | O | IZ | NS |  | S |  | NS |  | IZ | O |
| 18. | * | O | S | O | IZ | O | IZ | NS |  | S |  | IZ |  | IZ | O |
| 19. | * | O | NS/IZ | O | S | O | S | NS |  | IZ |  | S |  | S | O |
| 20. | * | O | NS/IZ | O | S | O | NS | NS |  | IZ |  | S |  | NS | O |
| 21. | * | O | NS | O | S | O | IZ | NS |  | NS |  | S |  | IZ | O |
| 22. | * | O | NS/IZ | O | NS | O | S | NS |  | IZ |  | NS |  | S | O |
| 23. | S | O | NS/IZ | O | NS/IZ | O | NS/IZ | S |  | IZ |  | NS |  | NS | O |
| 24. | * | O | NS | O | IZ | O | S | NS |  | NS |  | IZ |  | S | O |
| 25. | * | O | * | O | S | O | IZ/N | NS |  | IZ |  | S |  | IZ | O |
| 26. | * | O | IZ | O | IZ | O | S | NS |  | IZ |  | IZ |  | S | O |
| 27. | NS/IZ | O | S | O | S | O | S | IZ |  | S |  | S |  | S | O |
| 28. | NS | O | S | O | S | O | NS | IZ |  | S |  | S |  | NS | O |
| 29. | NS | O | S | O | NS | O | S | IZ |  | S |  | NS |  | S | O |
| 30. | NS | O | S | O | NS | O | NS | IZ |  | S |  | NS |  | NS | O |
| 31. | NS | O | NS | O | S | O | NS | IZ |  | NS |  | S |  | NS | O |

RULES ENGINE FOR MANAGING VIRTUAL LOGICAL UNITS IN A STORAGE NETWORK

CROSS-REFERENCE TO RELATED APPLICATIONS

The following applications are cross-referenced and incorporated by reference herein in their entirety:

U.S. patent application Ser. No. 10/931,504, entitled MULTI-CHASSIS, MULTI-PATH STORAGE SOLUTIONS IN STORAGE AREA NETWORKS, filed concurrently;

U.S. patent application Ser. No. 10/833,438, entitled PROACTIVE TRANSFER READY RESOURCE MANAGEMENT IN STORAGE AREA NETWORKS, filed Apr. 28, 2004;

U.S. patent application Ser. No. 10/051,321, entitled STORAGE SWITCH FOR STORAGE AREA NETWORK, filed Jan. 18, 2002;

U.S. patent application Ser. No. 10/051,396, entitled VIRTUALIZATION IN A STORAGE SYSTEM, filed Jan. 18, 2002; and U.S. patent application Ser. No. 10/050,974, entitled POOLING AND PROVISIONING STORAGE RESOURCES IN A STORAGE NETWORK, filed Jan. 18, 2002, now U.S. Pat. No. 6,976,134, issued Dec. 13, 2005.

BACKGROUND OF THE INVENTION

1. Field of the Invention

The present invention relates generally to storage area networks.

2. Description of the Related Art

The management of information is becoming an increasingly daunting task in today's environment of data intensive industries and applications. More particularly, the management of raw data storage is becoming more cumbersome and difficult as more companies and individuals are faced with larger and larger amounts of data that must be effectively, efficiently, and reliably maintained. Entities continue to face the necessity of adding more storage, servicing more users, and providing access to more data for larger numbers of users.

The concept of storage area networks or SANs has gained popularity in recent years to meet these increasing demands. Although various definitions of a SAN exist, a SAN can generally be considered a network whose primary purpose is the transfer of data between computer systems and storage elements and among storage elements. A SAN can form an essentially independent network that does not have the same bandwidth limitations as many of its direct-connect counterparts including storage devices connected directly to servers (e.g., with a SCSI connection) and storage devices added directly to a local area network (LAN) using traditional Ethernet interfaces, for example.

In a SAN environment, targets, which can include storage devices (e.g., tape drives and RAID arrays) and other devices capable of storing data, and initiators, which can include servers, personal computing devices, and other devices capable of providing read and write commands, are generally interconnected via various switches and/or appliances. The connections to the switches and appliances are usually Fibre Channel or iSCSI.

A typical appliance may receive and store data within the appliance, then, with an internal processor for example, analyze and operate on the data in order to forward the data to the appropriate target(s). Such store-and-forward processing can slow down data access, including the times for reading data from and writing data to the storage device(s). Accordingly, switches are often used to connect initiators with appliances, given the large number of initiators and small number of ports available in many appliances. In more current SAN implementations, switches have replaced certain functionality previously preformed by appliances such that appliances are not necessary and can be eliminated from the systems.

Storage switches in storage area networks are providing increased virtualization capabilities to increase data reliability and access. For example, some storage switches can perform so called mirroring operations to maintain multiple copies of data within the network. Physical devices may be virtualized and presented to host devices as a virtual volume. Internally within the switch, data for the virtual volume can be routed to more than one physical location for increased reliability. Mirroring is but one example of increased virtualization options being provided by storage switches in SANs.

As storage switches increase virtualization options, the management of virtual targets becomes an increasingly complex operation. Care must be taken to ensure that virtual volumes are properly managed to accurately and reliably maintain user data within a virtual volume. Numerous factors such as the availability of underlying storage devices and subsystems affect the status of a virtual volume. Determining the proper status for a virtual volume becomes more difficult and time-consuming as the complexity in provisioned virtual volumes increases.

Traditional techniques of coding each possible scenario to determine the resulting outcome can become impractical in today's fast-paced environment. Initially developing a representation of every scenario can be very time-consuming. Furthermore, any changes to the volume for which the code is applicable may require re-coding which can be impractical in today's flexible environment where volume definitions can easily be modified.

Accordingly, there is a need for techniques and systems in storage area networks to address these identified deficiencies and provide for accurate and efficient state maintenance in storage switches.

SUMMARY OF THE INVENTION

In accordance with embodiments, systems and methods are provided to efficiently manage the state of virtual targets. The core functionality of virtual target state maintenance is centralized to provide efficient and accurate management. One or more rules engines can provide proper state and status information for a virtual target after an event associated with one or more members of the virtual target is detected.

A rules engine is provided to enhance management capability in storage area networks and particularly within storage switches. Resulting state and status information for virtual logical units can be maintained in a database. The database can be indexed according to the current state and/or status of members of a virtual logical unit. When an event associated with a physical target of a virtual logical unit is detected, the current state and status of members of the virtual logical unit can be determined. The current state and status information can be maintained in a dynamic state and status indicator. The current state and status information can be used to identify a corresponding entry in the rules database. From the rules database, the proper resulting status and/or state of the members and/or the virtual logical unit can be determined.

In one embodiment, a method of managing virtual logical units, is provided that comprises detecting an event associated with at least one first member of a first virtual logical unit configuration, determining a resulting status of the at least one first member as a result of the event, accessing current state and status information for at least one second member of the first virtual logical unit, and determining a resulting status of the first virtual logical unit from a rules database. The current state and status information for the at least one second member and the resulting status of the at least one first member can be used to index into the rules database.

In one embodiment, a key can be formulated from the resulting status of the at least one first member and the current state and status information for the at least one second member. Accordingly, the step of determining a resulting status of the first virtual logical unit can include accessing the rules database, matching the key to a key index in the rules database to determine an entry corresponding to the resulting status of the at least one first member and the current state and status information for the at least one second member, determining the resulting status of the first virtual logical unit from the entry in the rules database.

In one embodiment, the method further includes determining a resulting state of the at least one first member and a resulting state and status of the at least one second member from the rules database. The current state and status information for the at least one second member and the resulting status of the at least one first member can be used to index into the rules database.

In one embodiment, the first virtual logical unit is a clustered virtual logical unit including a first instance of a virtual logical unit provisioned at a first storage switch and a second instance provisioned at a second storage switch. The at least one first member can include a local portion provisioned at the first storage switch and a remote portion provisioned at the second storage switch.

In accordance with one embodiment, a storage switch is provided that comprises a first virtual logical unit configuration including at least one first member and at least one second member and a state and status indicator for the first virtual logical unit configuration. The state and status indicator is updated to reflect a current state and status of each member of the first virtual logical unit configuration. The switch further includes a rules database including resulting status information for the first virtual logical unit configuration. The resulting status information is indexed in the rules database based upon an event associated with the first virtual logical unit configuration and a current state and status of each member of the first virtual logical unit configuration. A management is also provided to receive an indication of an event associated with the at least one first member of the first virtual logical unit configuration. The management module, upon receipt of an indication, determines resulting status information for the first virtual logical unit configuration using the state and status indicator and the rules database.

In accordance with one embodiment, a method of managing virtual targets is provided that includes providing a dynamic state and status indicator for at least one first member of a virtual logical unit, and providing a table of resulting state and status information for the virtual logical unit. The resulting state and status information includes a plurality of entries of resulting state and status information indexed according to at least a current state and status of a non-event member of the virtual logical unit.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM, flash memory or other suitable storage devices. In alternative embodiments, some or all of the software can be replaced by dedicated hardware including custom integrated circuits, gate arrays, FPGAs, PLDs, and special purpose processors. In one embodiment, software implementing the present invention is used to program one or more processors. The one or more processors can be in communication with one or more storage devices (hard disk drives, CD-ROMs, DVDs, optical disks, floppy disks, tape drives, RAM, ROM, flash memory or other suitable storage devices), peripherals (printers, monitors, keyboards, pointing devices) and/or communication interfaces (e.g. network cards, wireless transmitters/receivers, etc.).

Other features, aspects, and objects of the invention can be obtained from a review of the specification, the figures, and the claims.

BRIEF DESCRIPTION OF THE DRAWINGS

FIGS. 5a-5c are generalized functional block diagrams of a storage area network illustrating an exemplary provisioning of virtual targets;

FIG. 24 depicts a rules database in accordance with one embodiment for online to offline member transitions in a two member virtual logical unit configuration;

FIG. 25 is a legend for the rules database of FIGS. 24, 26, and 28a-31;

FIG. 26 depicts a rules database in accordance with one embodiment for offline to online member transitions in a two member virtual logical unit configuration;

FIGS. 28a-28b depict a rules database in accordance with one embodiment for offline to online member transitions in a three member virtual logical unit configuration;

FIGS. 29a-29b depict a rules database in accordance with one embodiment for online to offline member transitions in a three member virtual logical unit configuration;

FIGS. 30a-30b depict a rules database in accordance with one embodiment for online to offline member transitions in a four member virtual logical unit configuration; and FIG. 31 depicts a rules database in accordance with one embodiment for offline to online member transitions in a four member virtual logical unit configuration.

DETAILED DESCRIPTION

Figure 1:
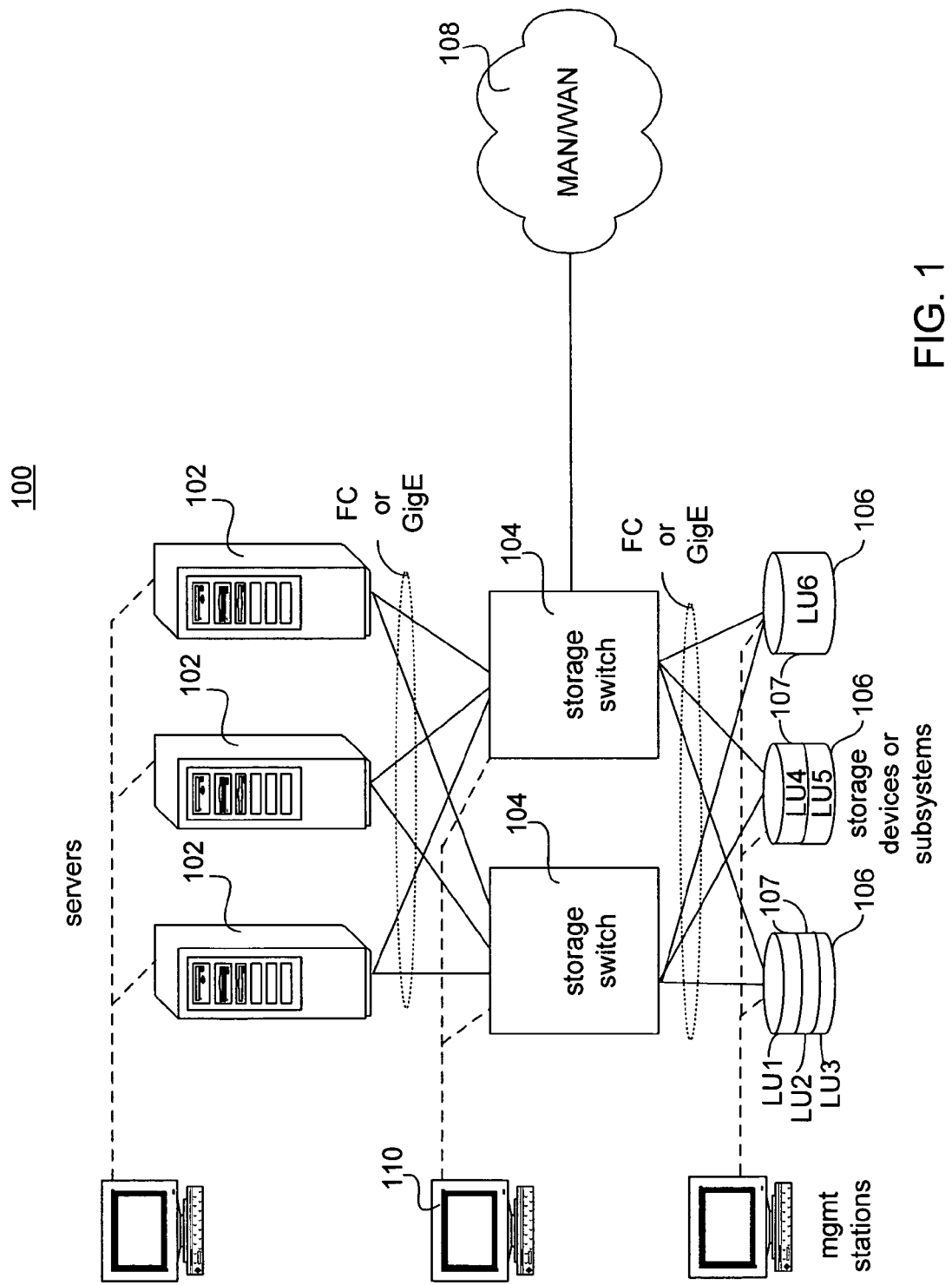
FIG. 1 is a generalized functional block diagram of a storage area network in accordance with one embodiment.

An exemplary system 100 including a storage switch in accordance with one embodiment is illustrated in FIG. 1. System 100 can include a plurality of initiating devices such as servers 102. It will be appreciated that more or fewer servers can be used and that embodiments can include any suitable physical initiator in addition to or in place of servers 102. Although not shown, the servers could also be coupled to a LAN. As shown, each server 102 is connected to a storage switch 104. In other embodiments, however, each server 102 may be connected to fewer than all of the storage switches 104 present. The connections formed between the servers and switches can utilize any protocol, although in one embodiment the connections are Fibre Channel or Gigabit Ethernet (carrying packets in accordance with the iSCSI protocol). Other embodiments may use the Infiniband protocol, defined by the Infiniband Trade Association, or other protocols or connections.

In some embodiments, one or more switches 104 are each coupled to a Metropolitan Area Network (MAN) or Wide Area Network (WAN) 108, such as the Internet. The connection formed between a storage switch 104 and a WAN 108 will generally use the Internet Protocol (IP) in most embodiments. Although shown as directly connected to MAN/WAN 108, other embodiments may utilize a router (not shown) as an intermediary between switch 104 and MAN/WAN 108.

In addition, respective management stations 110 are connected to each storage switch 104, to each server 102, and to each storage device 106. Although management stations are illustrated as distinct computers, it is to be understood that the software to manage each type of device could collectively be on a single computer.

Such a storage switch 104, in addition to its switching function, can provide virtualization and storage services (e.g., mirroring). Such services can include those that would typically be provided by appliances in conventional architectures.

In addition, the intelligence of a storage switch in accordance with an embodiment of the invention is distributed to every switch port. This distributed intelligence allows for system scalability and availability. The distributed intelligence allows a switch in accordance with an embodiment to process data at "wire speed," meaning that a storage switch 104 introduces no more latency to a data packet than would be introduced by a typical network switch. Thus, "wire speed" for the switch is measured by the connection to the particular port. Accordingly, in one embodiment having OC-48 connections, the storage switch can keep up with an OC-48 speed (2.5 bits per ns). A two Kilobyte packet (with 10 bits per byte) moving at OC-48 speed can take as little as eight microseconds coming into the switch. A one Kilobyte packet can take as little as four microseconds. A minimum packet of 100 bytes can only elapse a mere 400 ns.

More information on various storage area networks, including a network as illustrated in FIG. 1 can be found in U.S. patent application Ser. No. 10/051,396, entitled VIRTUALIZATION IN A STORAGE SYSTEM, filed Jan. 18, 2002 and U.S. patent application Ser. No. 10/051,321, entitled STORAGE SWITCH FOR STORAGE AREA NETWORK, filed Jan. 18, 2002.

"Virtualization" generally refers to the mapping of a virtual target space subscribed to by a user to a space on one or more physical storage target devices. The terms "virtual" and "virtual target" (or "virtual logical unit") come from the fact that storage space allocated per subscription can be anywhere on one or more physical storage target devices connecting to a storage switch 104. The physical space can be provisioned as a "virtual target" or "virtual logical unit (VLU)" which may include one or more "logical units" (LUs). Each virtual target consists of one or more LUs identified with one or more LU numbers (LUNs), which are frequently used in the iSCSI and FC protocols. Each logical unit is generally comprised of one or more extents—a contiguous slice of storage space on a physical device. Thus, a virtual target or VLU may occupy a whole storage device (one extent), a part of a single storage device (one or more extents), or parts of multiple storage devices (multiple extents). The physical devices, the LUs, the number of extents, and their exact locations are immaterial and invisible to a subscriber user.

Storage space may come from a number of different physical devices, with each virtual target belonging to one or more "pools" in various embodiments, sometimes referred to herein as "domains." Only users of the same domain are allowed to share the virtual targets in their domain in one embodiment. Domain-sets can also be formed that include several domains as members. Use of domain-sets can ease the management of users of multiple domains, e.g., if one company has five domains but elects to discontinue service, only one action need be taken to disable the domain-set as a whole. The members of a domain-set can be members of other domains as well.

Figure 2:
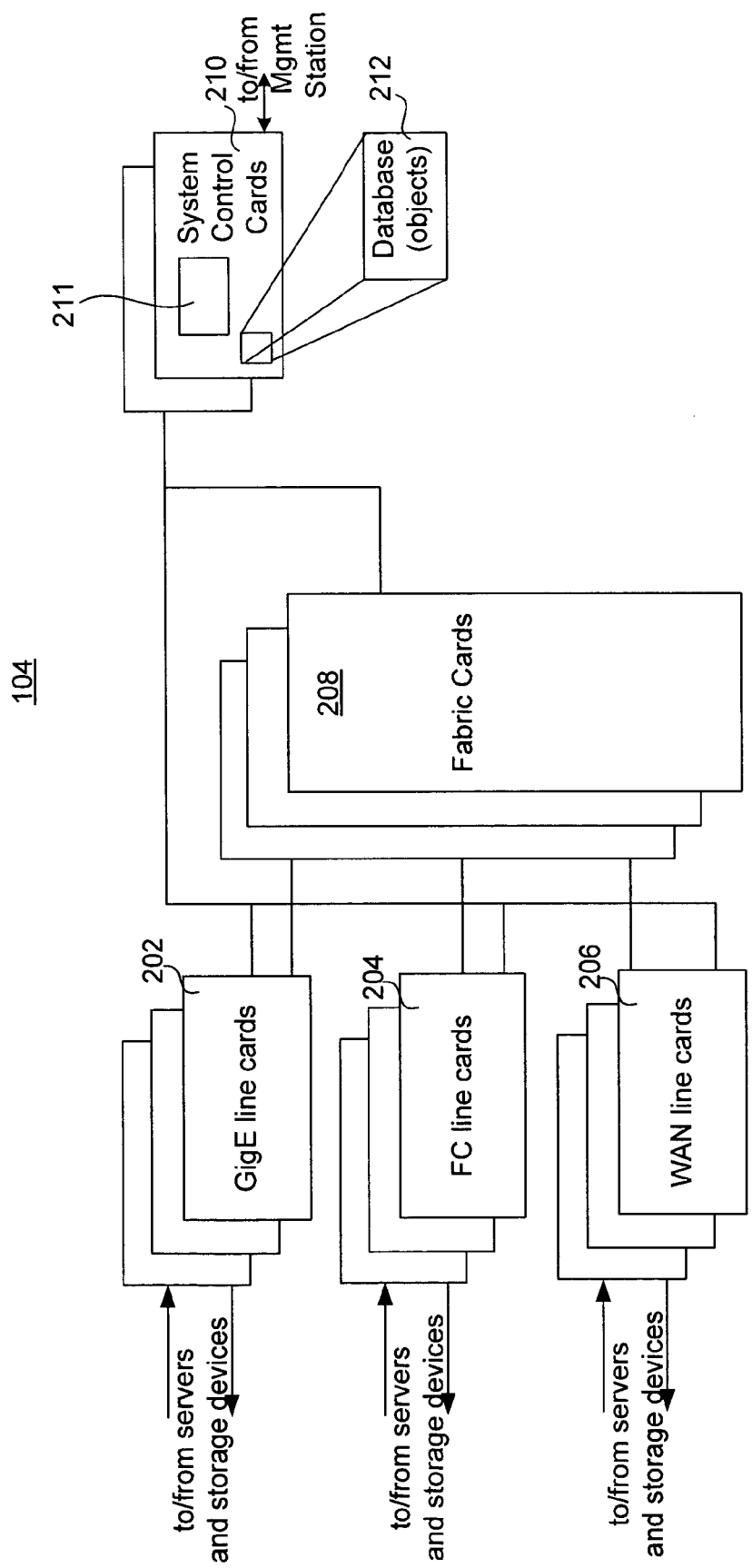
FIG. 2 is a generalized functional block diagram of a storage switch in accordance with one embodiment.

FIG. 2 illustrates a functional block diagram of a storage switch 104 in accordance with an embodiment of the invention. More information regarding the details of a storage switch such as storage switch 104 and its operation can be found in U.S. patent application Ser. No. 10/051,321, entitled STORAGE SWITCH FOR STORAGE AREA NETWORK, filed Jan. 18, 2002. In one embodiment, the storage switch 104 includes a plurality of linecards 202, 204, and 206, a plurality of fabric cards 208, and two system control cards 210, each of which will be described in further detail below. Although an exemplary storage switch is illustrated, it will be appreciated that numerous other implementations and configurations can be used in accordance with various embodiments.

System Control Cards. Each of the two System Control Cards (SCCs) 210 connects to every line card 202, 204, 206. In one embodiment, such connections are formed by $I^2C$ signals, which are well known in the art, and through an Ethernet connection with the SCC. The SCC controls power up and monitors individual linecards, as well as the fabric cards, with the $I^2C$ connections. Using inter-card communication over the Ethernet connections, the SCC also initiates various storage services, e.g., snapshot and replicate.

In addition, the SCC maintains a database 212 that tracks configuration information for the storage switch as well as all virtual targets and physical devices attached to the switch, e.g., servers and storage devices. In addition, the database keeps information regarding usage, error and access data, as well as information regarding different domains and domain sets of virtual targets and users. The records of the database may be referred to herein as "objects." Each initiator (e.g., a server) and target (e.g., a storage device) has a World Wide Unique Identifier (WWUI), which are known in the art. The database is maintained in a memory device within the SCC, which in one embodiment is formed from flash memory, although other memory devices can be used in various embodiments.

The storage switch 104 can be reached by a management station 110 through the SCC 210 using an Ethernet connection. Accordingly, the SCC also includes an additional Ethernet port for connection to a management station. An administrator at the management station can discover the addition or removal of storage devices or virtual targets, as well as query and update virtually any object stored in the SCC database 212.

Fabric Cards. In one embodiment of switch 104, there are three fabric cards 208, although other embodiments could have more or fewer fabric cards. Each fabric card 208 is coupled to each of the linecards 202, 204, 206 in one embodiment and serves to connect all of the linecards together. In one embodiment, the fabric cards 208 can each handle maximum traffic when all linecards are populated. Such traffic loads handled by each linecard are up to 160 Gbps in one embodiment although other embodiments could handle higher or lower maximum traffic volumes. If one fabric card 208 fails, the two surviving cards still have enough bandwidth for the maximum possible switch traffic: in one embodiment, each linecard generates 20 Gbps of traffic, 10 Gbps ingress and 10 Gbps egress. However, under normal circumstances, all three fabric cards are active at the same time. From each linecard, the data traffic is sent to any one of the three fabric cards that can accommodate the data.

Linecards. The linecards form connections to servers and to storage devices. In one embodiment, storage switch 104 supports up to sixteen linecards although other embodiments could support a different number. Further, in one embodiment, three different types of linecards are utilized: Gigabit Ethernet (GigE) cards 202, Fibre Channel (FC) cards 204, and WAN cards 206. Other embodiments may include more or fewer types of linecards. The GigE cards 202 are for Ethernet connections, connecting in one embodiment to either iSCSI servers or iSCSI storage devices (or other Ethernet based devices). The FC cards 204 are for Fibre Channel connections, connecting to either Fibre Channel Protocol (FCP) servers or FCP storage devices. The WAN cards 206 are for connecting to a MAN or WAN.

Figure 3:
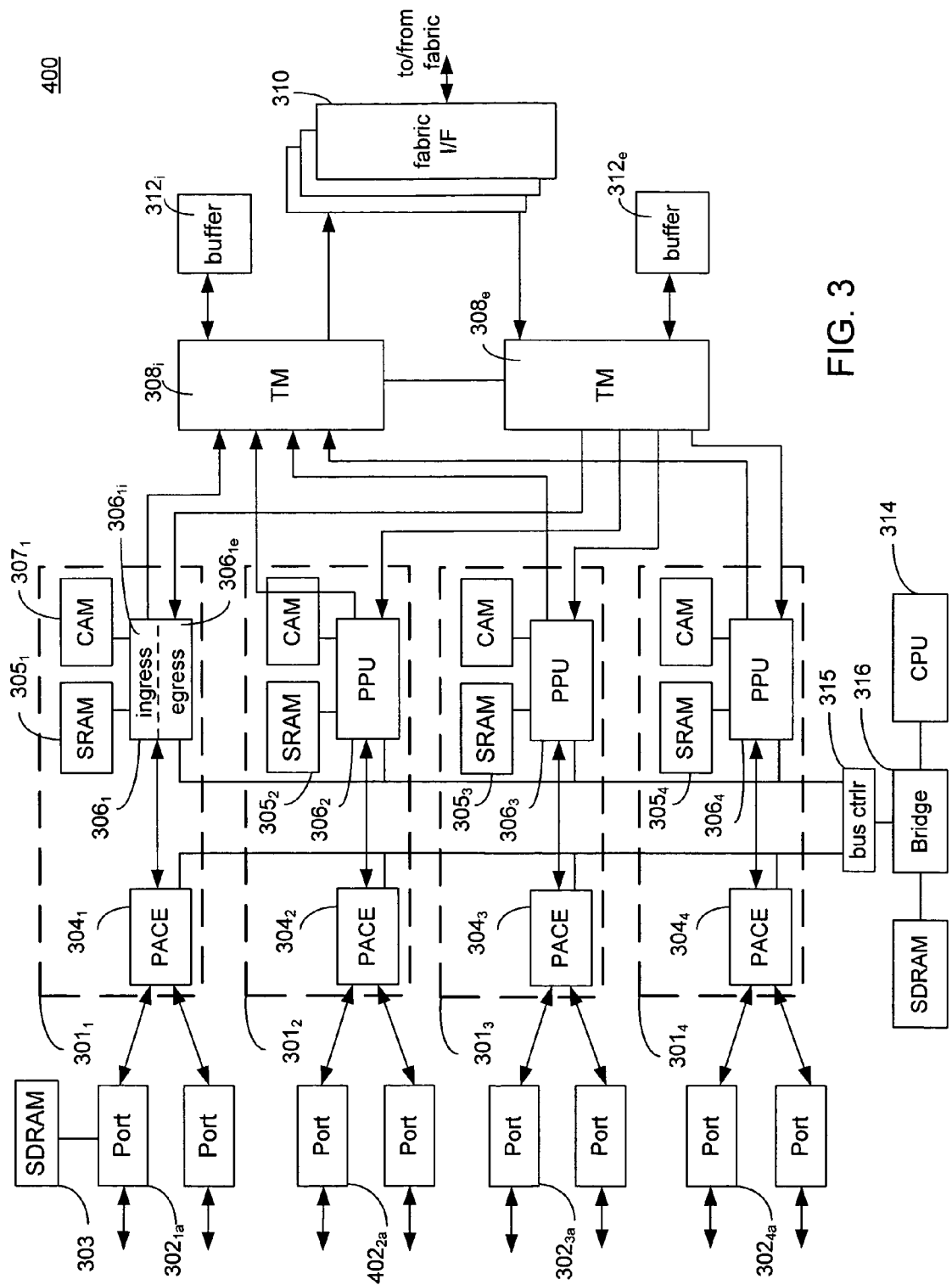
FIG. 3 is a generalized functional block diagram of a linecard used in a storage switch in accordance with one embodiment.

FIG. 3 illustrates a functional block diagram of a generic line card 300 used in a storage switch 104 in accordance with one embodiment. Line card 300 is presented for exemplary purposes only. Other line cards and designs can be used in accordance with embodiments. The illustration shows those components that are common among all types of linecards, e.g., GigE 302, FC 304, or WAN 306. In other embodiments other types of linecards can be utilized to connect to devices using other protocols, such as Infiniband.

Ports. Each line card 300 includes a plurality of ports 302. The ports form the linecard's connections to either servers or storage devices. Eight ports are shown in the embodiment illustrated, but more or fewer could be used in other embodiments. For example, in one embodiment each GigE card can support up to eight 1 Gb Ethernet ports, each FC card can support up to either eight 1 Gb FC ports or four 2 Gb FC ports, and each WAN card can support up to four OC-48 ports or two OC-192 ports. Thus, in one embodiment, the maximum possible connections are 128 ports per switch 104. The ports of each linecard are full duplex in one embodiment, and connect to either a server or other client, and/or to a storage device or subsystem.

In addition, each port 302 has an associated memory 303. Although only one memory device is shown connected to one port, it is to be understood that each port may have its own memory device or the ports may all be coupled to a single memory device. Only one memory device is shown here coupled to one port for clarity of illustration.

Storage Processor Unit. In one embodiment, each port is associated with a Storage Processor Unit (SPU) 301. In one embodiment the SPU rapidly processes the data traffic allowing for wire-speed operations. In one embodiment, each SPU includes several elements: a Packet Aggregation and Classification Engine (PACE) 304, a Packet Processing Unit (PPU) 306, an SRAM 305, and a CAM 307. Still other embodiments may use more or fewer elements or could combine elements to obtain the same functionality. For instance, some embodiments may include a PACE and a PPU in the SPU, but the SPU may share memory elements with other SPUs.

PACE. Each port is coupled to a Packet Aggregation and Classification Engine (PACE) 304. As illustrated, the PACE 304 aggregates two ports into a single data channel having twice the bandwidth. For instance, the PACE 304 aggregates two 1 Gb ports into a single 2 Gb data channel. The PACE can classify each received packet into a control packet or a data packet. Control packets are sent to the CPU 314 for processing, via bridge 316. Data packets are sent to a Packet Processing Unit (PPU) 306, discussed below, with a local header added. In one embodiment the local header is sixteen bytes resulting in a data "cell" of 64 bytes (16 bytes of header and 48 bytes of payload). The local header is used to carry information and used internally by switch 104. The local header is removed before the packet leaves the switch. Accordingly, a "cell" can be a transport unit used locally in the switch that includes a local header and the original packet (in some embodiments, the original TCP/IP headers are also stripped from the original packet). Nonetheless, not all embodiments of the invention will create a local header or have "internal packets" (cells) that differ from external packets. Accordingly, the term "packet" as used herein can refer to either "internal" or "external" packets.

The classification function helps to enable a switch to perform storage virtualization and protocol translation functions at wire speed without using a store-and-forward model of conventional systems. Each PACE has a dedicated path to a PPU, e.g. PPU $306_1$, while all four PACEs in the illustrated embodiment share a path to the CPU 314, which in one embodiment is a 104 MHz/32 (3.2 Gbps) bit data path.

Packet Processing Unit (PPU). Each PPU such as PPU $306_1$ performs virtualization and protocol translation on-the-fly, meaning that cells are not buffered for such processing. It also implements other switch-based storage service functions, described later. The PPU is capable, in one embodiment, of moving cells at OC-48 speed or 2.5 Gbps for both the ingress and egress directions, while in other embodiments it can move cells at OC-192 speeds or 10 Gbps. The PPU in one embodiment includes an ingress PPU $306_{1i}$ and an egress PPU $306_{1e}$, which both run concurrently. The ingress PPU $306_{1i}$ receives incoming data from PACE $304_1$ and sends data to the Traffic Manager $308_i$ while the egress PPU $306_{1e}$ receives data from Traffic Manager $308_e$ and sends data to a PACE $304_1$. Although only one PPU $306_1$ is shown in FIG. 3 as having an ingress PPU $306_{1i}$ and an egress PPU $306_{1e}$, it is to be understood that in one embodiment all PPUs 306 will include both an ingress and an egress PPU and that only one PPU is shown in FIG. 3 with both ingress and egress PPUs for clarity of illustration.

A large number of storage connections (e.g., server to virtual target) can be established concurrently at each port. Nonetheless, each connection is unique to a virtual target and can be uniquely identified by a TCP Control Block Index (in the case of iSCSI connections) and a port number. When a connection is established, the CPU 314 of the linecard 300 informs a PPU 306 of an active virtual target by sending it a Virtual Target Descriptor (VTD) for the connection. The VTD includes all relevant information regarding the connection and virtual target that the PPU will need to properly operate on the data, e.g., perform virtualization, translation, and various storage services. The VTD is derived from an object in the SCC database and usually contains a subset of information that is stored in the associated object in the SCC database.

Similarly, Physical Target Descriptors (PTDs) are utilized in an embodiment of the invention. PTDs describe the actual physical devices, their individual LUs, or their individual extents (a contiguous part of or whole LU) and will include information similar to that for the VTD. Also, like the VTD, the PTD is derived from an object in the SCC database.

To store the VTDs and PTDs and have quick access to them, in one embodiment the PPUs such as PPU $306_1$ are connected to an SRAM $305_1$ and CAM $307_1$. SRAM $305_1$ can store a VTD and PTD database. A listing of VTD Identifiers (VTD IDs), or addresses, as well as PTD Identifiers (PTD IDs), is also maintained in the PPU CAM $307_1$ for quick accessing of the VTDs. The VTD IDs are indexed (mapped) using a TCP Control Block Index and a LUN. The PTD IDs are indexed using a VTD ID. In addition, for IP routing services, the CAM $307_1$ contains a route table, which is updated by the CPU when routes are added or removed.

In various embodiments, each PPU will be connected with its own CAM and SRAM device as illustrated, or the PPUs will all be connected to a single CAM and/or SRAM (not illustrated).

For each outstanding request to the PPU (e.g., reads or writes), a task control block is established in the PPU SRAM 307 to track the status of the request. There are ingress task control blocks (ITCBs) tracking the status of requests received by the storage switch on the ingress PPU and egress task control blocks (ETCBs) tracking the status of requests sent out by the storage switch on the egress PPU. For each virtual target connection, there can be a large number of concurrent requests, and thus many task control blocks. Task control blocks are allocated as a request begins and freed as the request completes.

Traffic Manager. There are two traffic managers (TMs) 308 on each linecard 300: one TM $308_i$ for ingress traffic and one TM $308_e$ for egress traffic. The ingress TM receives cells from all four SPUs, in the form of 64-byte data cells, in one embodiment. In such an embodiment, each data cell has 16 bytes of local header and 48 bytes of payload. The header contains a Flow ID that tells the TM the destination port of the cell. In some embodiments, the SPU may also attach a TM header to the cell prior to forwarding the cell to the TM. Either the TM or the SPU can also subdivide the cell into smaller cells for transmission through the fabric cards in some embodiments.

The ingress TM sends data cells to the fabric cards via a 128-bit 104 Mhz interface 310 in one embodiment. Other embodiments may operate at 125 Mhz or other speeds. The egress TM receives the data cells from the fabric cards and delivers them to the four SPUs.

Both ingress and egress TMs have a large buffer 312 to queue cells for delivery. Both buffers 312 for the ingress and egress TMs are 64 MB, which can queue a large number of packets for internal flow control within the switch. The cells are not buffered as in cached or buffered switch implementations. There is no transport level acknowledgement as in these systems. The cells are only temporarily buffered to maintain flow control within the switch. The cells maintain their original order and there is no level high level processing of the cells at the TM The SPUs can normally send cells to the ingress TM quickly as the outgoing flow of the fabric cards is as fast as the incoming flow. Hence, the cells are moving to the egress TM quickly. On the other hand, an egress TM may be backed up because the outgoing port is jammed or being fed by multiple ingress linecards. In such a case, a flag is set in the header of the outgoing cells to inform the egress SPU to take actions quickly. The egress TM also sends a request to the ingress SPU to activate a flow control function used in providing Quality of Service for Storage access. It is worth noting that, unlike communications traffic over the Internet, for storage traffic dropping a packet or cell is unacceptable. Therefore, as soon as the amount of cells in the buffer exceeds a specified threshold, the SPU can activate its flow control function to slow down the incoming traffic to avoid buffer overflow.

Fabric Connection. The fabric connection 310 converts the 256-bit parallel signals of the TM (128 bits ingress and 128 bits egress, respectively), into a 16-bit serial interface (8-bit ingress and 8-bit egress) to the backplane at 160 Gbps. Thus the backplane is running at one sixteenth of the pins but sixteen times faster in speed. This conversion enables the construction of a high availability backplane at a reasonable cost without thousands of connecting pins and wires. Further, because there are three fabric cards in one embodiment, there are three high-speed connectors on each linecard in one embodiment, wherein the connectors each respectively connect the 8-bit signals to a respective one of the three fabric cards. Of course, other embodiments may not require three fabric connections 310.

CPU. On every linecard there is a processor (CPU) 614, which in one embodiment is a PowerPC 750 Cxe. In one embodiment, CPU 314 connects to each PACE with a 3.2 Gb bus, via a bus controller 315 and a bridge 316. In addition, CPU 314 also connects to each PPU, CAM and TM, however, in some embodiments this connection is slower at 40 Mbps. Both the 3.2 Gb and 40 Mb paths allow the CPU to communicate with most devices in the linecard as well as to read and write the internal registers of every device on the linecard, download microcode, and send and receive control packets.

The CPU on each linecard is responsible to initialize every chip at power up and to download microcode to the SPUs and each port wherever the microcode is needed. Once the linecard is in running state, the CPU processes the control traffic. For information needed to establish a virtual target connection, the CPU requests the information from the SCC, which in turn gets the information from an appropriate object in the SCC database.

Distinction in Linecards—Ports. The ports in each type of linecard, e.g., GigE, FC, or WAN are distinct as each linecard supports one type of port in one embodiment. In other embodiments, other linecard ports could be designed to support other protocols, such as Infiniband.

GigE Port. A gigabit Ethernet port connects to iSCSI servers and storage devices. While the GigE port carries all kinds of Ethernet traffic, the only network traffic generally to be processed by a storage switch 104 at wire speed in accordance with one embodiment of the invention is an iSCSI Packet Data Unit (PDU) inside a TCP/IP packet. Nonetheless, in other embodiments packets in accordance with other protocols (like Network File System (NFS)) carried over Ethernet connections may be received at the GigE Port and processed by the SPU and/or CPU.

The GigE port receives and transmits TCP/IP segments for virtual targets or iSCSI devices. To establish a TCP connection for a virtual target, both the linecard CPU 314 and the SCC 310 are involved. When a TCP packet is received, and after initial handshaking is performed, a TCP control block is created and stored in the GigE port memory 303. A VTD is also retrieved from an object of the SCC database and stored in the CPU SDRAM 305 for the purpose of authenticating the connection and understanding the configuration of the virtual target. The TCP Control Block identifies a particular TCP session or iSCSI connection to which the packet belongs, and contains in one embodiment, TCP segment numbers, states, window size, and potentially other information about the connection. In addition, the TCP Control Block is identified by an index, referred to herein as the "TCP Control Block Index." A VTD for the connection can be created and stored in the SPU SRAM 305. The CPU creates the VTD by retrieving the VTD information stored in its SDRAM and originally obtained from the SCC database. A VTD ID is established in a list of VTD IDs in the SPU CAM 307 for quick reference to the VTD. The VTD ID is affiliated with and indexed by the TCP Control Block Index.

When the port receives iSCSI PDUs, it serves essentially as a termination point for the connection, but then the switch initiates a new connection with the target. After receiving a packet on the ingress side, the port delivers the iSCSI PDU to the PACE with a TCP Control Block Index, identifying a specific TCP connection. For a non-TCP packet or a TCP packet not containing an iSCSI PDU, the port receives and transmits the packet without acting as a termination point for the connection. Typically, the port 302 communicates with the PACE 304 that an iSCSI packet is received or sent by using a TCP Control Block Index. When the TCP Control Block Index of a packet is −1, it identifies a non-iSCSI packet.

FC Port. An FC port connects to servers and FC storage devices. The FC port appears as a fibre channel storage subsystem (i.e., a target) to the connecting servers, meaning, it presents a large pool of virtual target devices that allow the initiators (e.g., servers) to perform a Process Login (PLOGI or PRLI), as are understood in the art, to establish a connection. The FC port accepts the GID extended link services (ELSs) and returns a list of target devices available for access by that initiator (e.g., server).

When connecting to fibre channel storage devices, the port appears as a fibre channel F-port, meaning, it accepts a Fabric Login, as is known in the art, from the storage devices and provides name service functions by accepting and processing the GID requests—in other words, the port will appear as an initiator to storage devices.

In addition, an FC port can connect to another existing SAN network, appearing in such instances as a target with many LUs to the other network.

At the port initialization, the linecard CPU can go through both sending Fabric Logins, Process Logins, and GIDs as well as receive the same. The SCC supports an application to convert FC ELSs to iSNS requests and responses. As a result, the same database in the SCC keeps track of both the FC initiators (e.g., servers) and targets (e.g., storage devices) as if they were iSCSI initiators and targets.

When establishing an FC connection, unlike for a GigE port, an FC port does not need to create TCP control blocks or their equivalent; all the necessary information is available from the FC header. But, a VTD (indexed by a D_ID which identifies the destination of a frame) will still need to be established in a manner similar to that described for the GigE port.

An FC port can be configured for 1 Gb or 2 Gb. As a 1 Gb port, two ports are connected to a single PACE as illustrated in FIG. 3; but in an embodiment where it is configured as a 2 Gb port, port traffic and traffic that can be accommodated by the SPU should match to avoid congestion at the SPU. The port connects to the PACE with a POS/PHY interface in one embodiment. Each port can be configured separately, i.e. one PACE may have two 1 Gb ports and another PACE has a single 2 Gb port.

WAN Ports. In embodiments that include a WAN linecard, the WAN linecard supports OC-48 and OC-192 connections in one embodiment. Accordingly, there are two types of WAN ports: OC-48 and OC-192. For OC-48, there is one port for each SPU. There is no aggregation function in the PACE, although there still is the classification function. A WAN port connects to SONET and works like a GigE port as it transmits and receives network packets such as ICMP, RIP, BPG, IP and TCP. A WAN port in one embodiment supports network security with VPN and IPSec that requires additional hardware components.

Since OC-192 results in a faster wire speed, a faster SPU will be required in embodiments that support OC-192.

Switch-Based Storage Operations

One of ordinary skill in the art will have a general knowledge of the iSCSI and FC protocols. However, for more information on iSCSI refer to "draft-ietf-ips-iSCSI-20.txt," an Internet Draft (see www.ietf.org) and work in progress by the Internet Engineering Task Force (IETF), Jan. 19, 2003, incorporated herein by reference in its entirety. For more information about Fibre Channel (FC) refer to "SCSI Fibre Channel Protocol-2 (FCP-2)", Nov. 23, 2002, Rev: 08 (see www.t10.org), incorporated herein by reference in its entirety. In addition, both are further described in U.S. patent application Ser. No. 10/051,321, entitled STORAGE SWITCH FOR STORAGE AREA NETWORK, filed Jan. 18, 2002.

Storage Pools

As shown in FIG. 1, in its physical configuration, a system in accordance with an embodiment of the invention includes a switch 104 coupled to one or more servers 102 and to one or more physical devices 106, i.e., storage devices or subsystems. Each physical target is comprised of one or more logical units (LUs) 107. It is from these LUs that virtual targets or VLUs will ultimately be formed.

Before a virtual target can be created, or "provisioned," the switch needs to be "aware" of the physical storage devices attached and/or available for access by it as well as the characteristics of those physical storage devices. Accordingly, in one embodiment of the invention, when a storage device or an initiator device is connected to or registered with the switch, the switch must learn about the performance characteristics of the new device. Once a device is "discovered," various inquiries are sent to the device to gather information regarding performance characteristics. For instance, read/write commands can be sent to measure transfer rate or to check access time. Alternatively, in some embodiments, the obtaining of performance characteristics can be done by having an administrator enter the performance characteristics at a management station 110, wherein the characteristics can then be provided to a switch 104.

Based on the information gathered about the device, all of which is generally invisible to the end user, in one embodiment of the invention the switch classifies the device based on a policy. Once a policy has been determined for a storage device, the LUs for the device are assigned to a storage pool 802, sometimes referred to herein as a "domain." Since each storage device is comprised of one or more LUs, all the LUs of a particular storage device are assigned to the same pool. However, in one embodiment, each LU is considered by the switch as a separate storage node and each LU is described by an LU object in the SCC database. Thus, each pool has as members the LUs. In one embodiment, assignment to a pool is done independent of the protocol under which the physical storage device operates, e.g., iSCSI or Fiber Channel. As will be understood by those of skill in the art, each pool is defined in a switch by a listing for the pool of the LUs assigned to it, which listing is stored in the SCC database in one embodiment. Such a listing may be comprised of pointers to the LU objects.

Generally each pool will be accessible only to users with particular characteristics. For example, a storage pool may be established for those users located in a Building 1, where the pool is entitled "Building 1 Shared Gold Storage Pool." Another exemplary pool may be entitled "Engineering Exclusive Silver Storage Pool" and may be exclusively accessible by the engineering team at a particular company. Of course an infinite variation of pools could be established and those described and illustrated are exemplary only.

In addition, in an embodiment, there are two special pools: a "Default Pool" and a "No Pool." A Default Pool allows access to anyone with access to the storage network. A "No Pool," in contrast, is not generally accessible to users and is only accessible to the switch itself or to the system administrator. Once assigned to a pool, the LUs can be reassigned to different pools by the switch itself or by a system administrator. For instance, an LU may initially be placed in the No Pool, tested, and then later moved to the default pool or other pool.

Provisioning a Virtual Target

Figure 4:
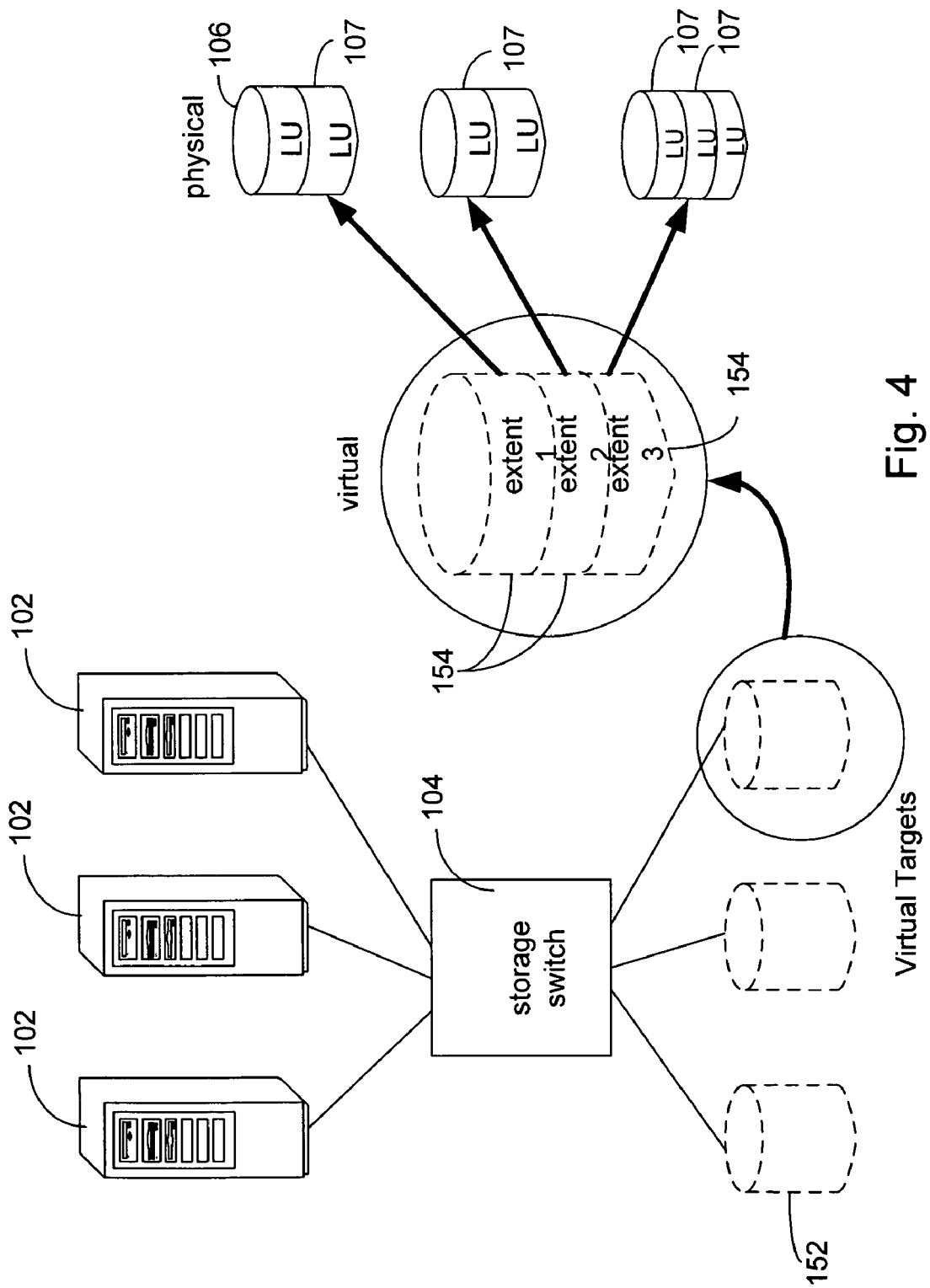
FIG. 4 is a generalized functional block diagram illustrating virtual targets as can be seen by an initiating device.

Once the LUs for physical devices are in an accessible pool (i.e., not the "No Pool"), then a virtual target or VLU can be created from those LUs. Once created, as shown in FIG. 4, the servers (and their respective users) will "see" one or more virtual targets or VLUs 152, each comprised of one or more extents 154, but they will not necessarily "see" the physical devices 106. An extent is a contiguous part of or a whole LU from a physical device. As shown in the example of FIG. 4, each extent in the example virtual target 152 is formed from entire LUs from several physical devices. "Extent" may still be referenced by an LUN from an initiator, such as a server, which doesn't realize a target is "virtual." The composition of the virtual targets, including protocols used by the LU is irrelevant to the server. However, as shown in FIG. 4, each virtual target is comprised of extents that map to the LUs of physical devices 106.

To provision a virtual target, a user selects several characteristics for the virtual target in one embodiment including:
the size (e.g., in Gigabytes);
a storage pool, although in one embodiment the user may select only from the storage pools which the user is permitted to access;
desired availability, e.g., always available (data is critical and must not ever go down), usually available, etc.;
the WWUI of the virtual target;
a backup pool;
user authentication data;
number of mirrored members;
locations of mirrored numbers (e.g., local or remote).

Still in other embodiments of the invention, different, additional, or fewer characteristics can also be selected.

The switch then analyzes the available resources from the selected pool to determine if the virtual target can be formed, and in particular the switch determines if a number of LUs (or parts of LUs) to meet the size requirement for the virtual target are available. If so, the virtual target is created with one or more extents and a virtual target object is formed in the SCC database identifying the virtual target, its extents, and its characteristics. Examples of user-selected characteristics for various virtual targets can be found in U.S. patent application Ser. No. 10/051,396, entitled VIRTUALIZATION IN A STORAGE SYSTEM, filed Jan. 18, 2002

Provisioning an Initiator Connection

When a server or other initiator is connected to a switch and the initiator supports iSNS or SLP, in one embodiment the initiator will register itself with the switch, resulting in an initiator object stored in the SCC database. In other embodiments, however, the switch will include an access provisioning function which creates, updates, or deletes an initiator connection.

In creating the access connection—the connection between the switch and an initiator (such as a server)—a user will specify various parameters such as, for example, the server WWUI, connection detail, such as protocol (e.g., GigE or Fiber Channel), exclusive or shared, source and destination IP addresses, minimum and maximum percentage of bandwidth, # of connections required by the server, access security, read only or read/write, and VPN enabled, etc.

Some or all of the user specified information is saved in an initiator object stored in the SCC database. When the connection is removed, the initiator object will be deleted.

The switch, the management station, or other network management then creates a storage pool for the particular connection, specifying the LUs available to the initiator to form virtual targets.

User Domains

Like physical devices, virtual targets can be assigned to a pool accessible only to those with specified characteristics. Thus, like physical devices, virtual targets can be assigned to a user-specific domain (sometimes referred to herein as the User's Domain), a default domain (accessible to anyone), or a No Domain. Each domain will be identified, in one embodiment, by an object in the SCC database that includes a listing of all the virtual targets assigned to the domain. For virtual targets, the No Domain may include spare virtual targets, members of mirrored virtual targets, or remote virtual targets from another switch. Essentially, the virtual target No Domain is a parking place for certain types of virtual targets. For ease of description, when referring to virtual targets, pools will be referred to herein as "domains," but when referencing physical devices, pools will continue to be referred to as "pools." It is to be understood, however, that conceptually "pools" and "domains" are essentially the same thing.

Once an initiator connection is provisioned, as described above, a virtual target is provisioned that meets the initiator's requirements and placed into an accessible pool for the initiator or a previously provisioned virtual target is made accessible to the initiator, e.g., by moving the virtual target to the initiator's user domain from another domain such as the No Domain or Default Domain. (Note that either the virtual target or the initiator connection can be provisioned first—there is no requirement that they be provisioned in a particular order). Then, once an initiator requests access to the virtual target, e.g., by sending a read or write request, both the virtual target object and initiator object are read from the SCC database and information regarding the initiator connection and virtual target is passed to the relevant linecard(s) for use in processing the requests.

Figure 5B:
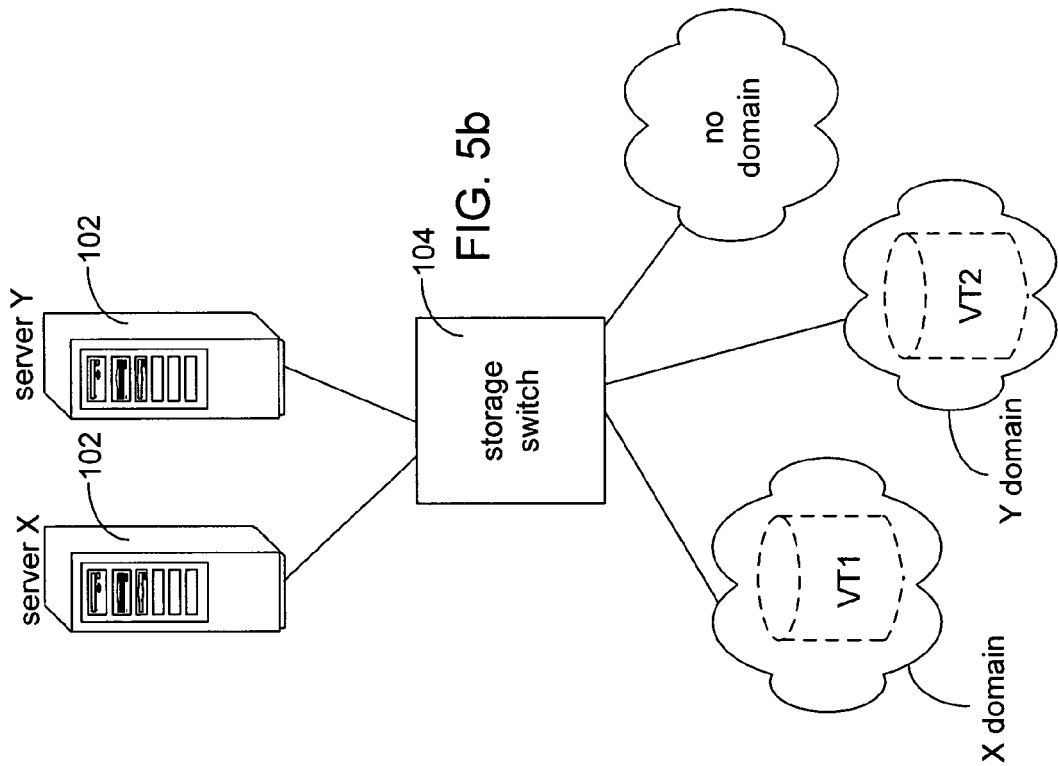
Figure 5A:
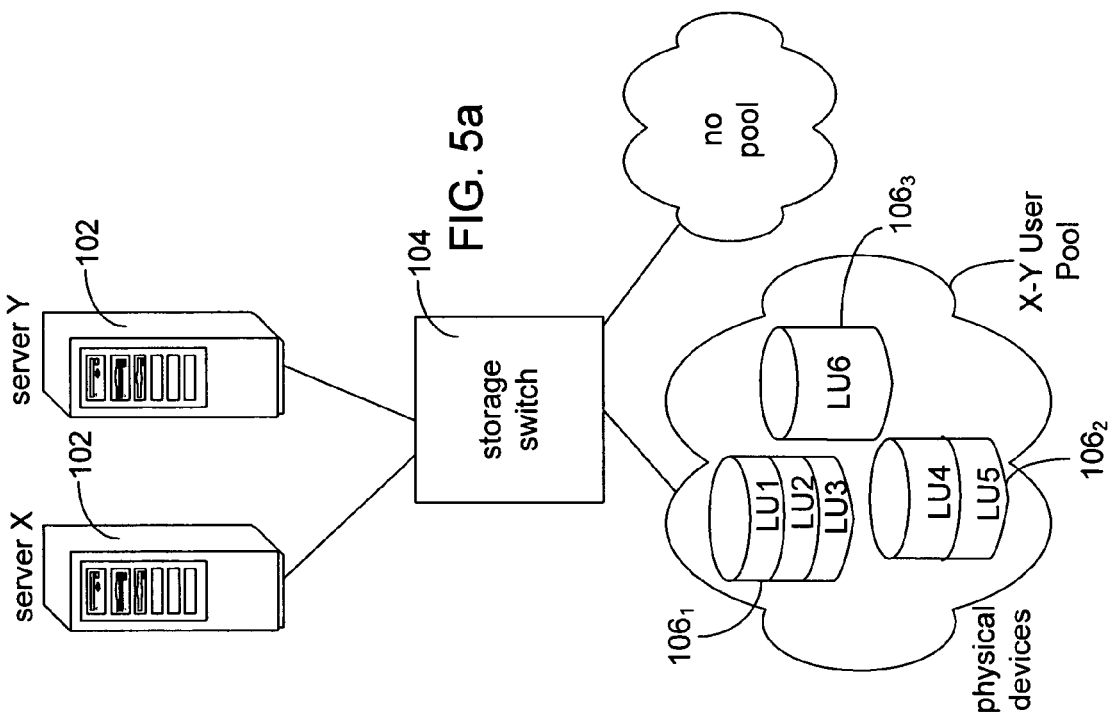

FIGS. 5a-5c illustrate one example of provisioning virtual targets in a storage area network. The system of FIGS. 5a-5c includes three physical devices $106_1$, $106_2$, and $106_3$, having a total of 6 LUs—LU1, LU2, LU3, LU4, LU5, LU6. In FIG. 5a, each physical device is coupled to a switch and placed in a pool accessible to two initiators X and Y, the "X-Y User Pool."

If initiator X and initiator Y each require one virtual target, then in one embodiment, the LUs are provisioned to form virtual targets VT1 and VT2, where VT1 includes as extents LUs 1-3 and VT2 includes as extents LUs 4-6 as depicted in FIG. 2b. VT1 is placed in the server X user domain and VT2 is placed in the server Y user domain. Initiator X will have access to VT1 but no VT2, while initiator Y will have access to VT2 but not VT1.

If instead, for example, initiator Y requires a mirrored virtual target M with a total of 6 LUs, VT1 and VT2 can be created as members of the virtual target M. VT1 and VT2 can be placed in the switch's No Domain (a domain where the physical targets are not directly accessible to users) while M is made accessible to Y, as shown in FIG. 2c. As members of M, VT1 and VT2 will not be independently accessible. VT1 is comprised of a LUs 1-3 (physical device $106_1$), while VT2 is comprised of LUs 4-6 (physical devices $106_2$ and $106_3$). When a request is received to write data to the virtual target M, switch 104 will route the incoming data to both VT1 (physical device $106_1$) and VT2 (physical device $106_2$ and/or $106_3$), thus storing the data in at least two physical locations.

Objects

As discussed above, each virtual target, each initiator connection, and each physical device is identified in the SCC database with information included in an object for the respective entity. Each virtual target object and physical target object will include a listing of extents or LUs that comprise it. An example of a Virtual Target object, in one embodiment of the invention, includes the following information:

entity type
entity identifier
managing IP address
time stamp and flags
ports
domain information
SCN bit map
capacity and inquiry information
number of extents
list of extents
extent locator
virtual mode pages
quality of service policy (e.g., the first three entries of Table 4)
statistics—usage, error, and performance data
SLA identifier A physical target (or LU) object may include similar information. More information regarding VTD information can be found in U.S. patent application Ser. No. 10/051,396, entitled VIRTUALIZATION IN A STORAGE SYSTEM, filed Jan. 18, 2002.

Classification for Storage Switch

As packets or frames (generically referred to herein as "packets") arrive at the storage switch they are separated at each port into data and control traffic. Data traffic is routed to the PPU for wire-speed virtualization and translation, while control traffic such as connection requests or storage management requests are routed to the CPU. This separation is referred to herein as "packet classification" or just "classification" and is generally initiated in the PACE of the SPU. Accordingly, unlike the existing art, which forwards all packets to the CPU for processing, a system in accordance with the invention recognizes the packet contents, so that data traffic can be processed separately and faster, aiding in enabling wire-speed processing. GigE packets and FC frames are handled slightly differently, as described below.

Figure 6A:
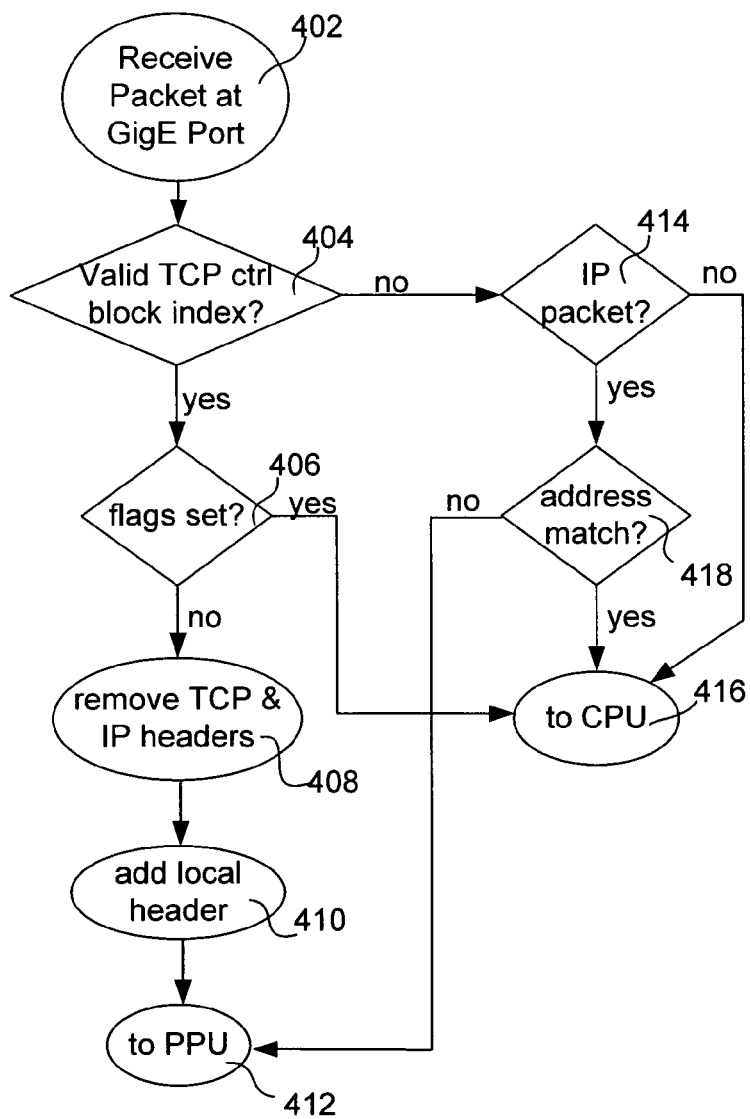
FIG. 6a is a flowchart depicting a classification process of iSCSI packets in the ingress direction as the process occurs in a PACE in accordance with one embodiment.

For packets arriving at a GigE port in the ingress direction (packets arriving at the switch), the following steps will be described with reference to FIG. 6a. A GigE port will receive a packet, which in one embodiment is either an IP packet or an iSCSI packet, step 402. Once the packet is received, the PACE determines if a virtual target access is recognized by whether it receives from the port a valid TCP Control Block Index with the packet (e.g., an index that is not −1), step 404. If there is a valid TCP Control Block Index, the PACE next checks the flags of the packet's TCP header, step 406. If the SYN, FIN, and RST flags of the TCP header are set, the packet is forwarded to the CPU, step 416, as the CPU would be responsible to establish and terminate a TCP session. Once an iSCSI TCP session is established, for managing the TCP session, the GigE port will receive a valid TCP control block from the CPU. But if the flags are not set, then in one embodiment the PACE will remove the TCP, IP, and MAC headers, step 408, leaving the iSCSI header, and then add a local header, step 410. Other embodiments, however, may leave the TCP, IP and MAC headers, and simply add a local header. Once the local header is added, the packet is sent to the PPU, step 412.

A local header can include a VTD ID to identify a VTD for a particular connection, a Flow ID to specify the destination port for a packet, a TCP Control Block Index to specify a TCP control block for a particular connection (if a TCP connection), a Type field to specify the packet classification (e.g., data or control), a Size field to indicate packet size, Task Index to track and direct the packet within the switch as well as to locate stored information related to the packet for the particular task, as well as some hardware identifiers such as source identifiers (e.g., identifying a source port, PACE, linecard, and/or CPU) and destination identifiers (e.g., identifying a distinction Port, PACE linecard, and/or CPU). The local header is used by various devices (e.g., PACE, PPU) throughout the switch. Accordingly, in some instances not all fields of the local header will be fully populated and in some instances the field contents may be changed or updated. An example of a local packet and conversion of a TCP packet can be found in co-pending U.S. patent application Ser. No. 10/051,321.

In the event that there is no valid TCP Control Block Index, step 604, then it is determined if the packet is an IP packet, step 414. If the packet is not an IP packet, it is forwarded to the CPU, step 416. If the packet is an IP packet, then the PACE checks the destination IP address, step 418. If the IP address matches that of the port of the storage switch, the packet is sent to the CPU, step 416, for processing. If the IP address does not match that of the port of the storage switch, then it is routing traffic and is forwarded to the PPU, step 412.

Figure 6B:
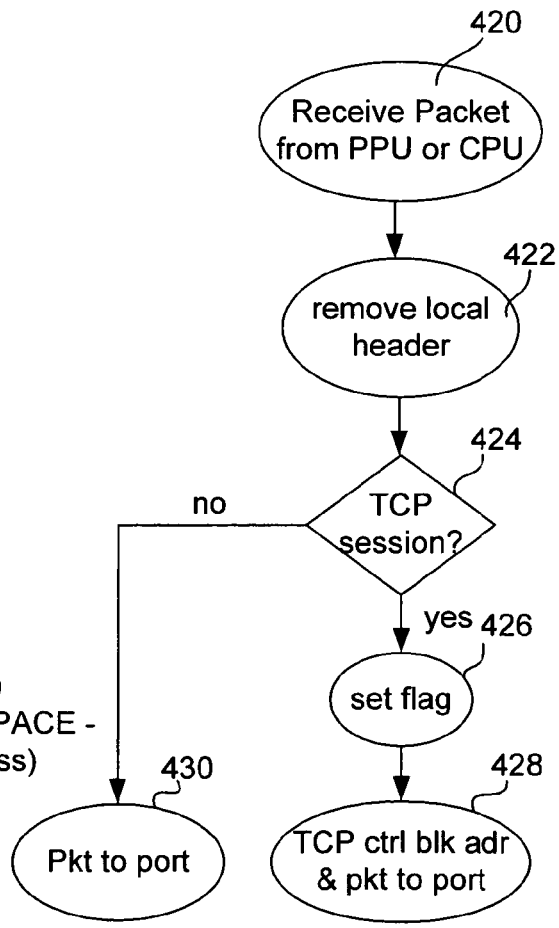
FIG. 6b is a flowchart depicting a classification process of iSCSI packets in the egress direction as the process occurs in a PACE in accordance with one embodiment.

Referring to FIG. 6b, when a packet destined for a GigE port is received in the egress direction by the PACE from an PPU or CPU, step 420, the PACE removes the local header, step 422. If the packet is for a TCP session, step 424, the PACE sets a control flag in its interface with the port to so inform the GigE port, step 426. If the packet is for a TCP session, the PACE passes the packet and the TCP Control Block Index to the port using interface control signals, step 428. If there is no TCP session, the packet is simply passed to the port, step 4300.

Figure 7A:
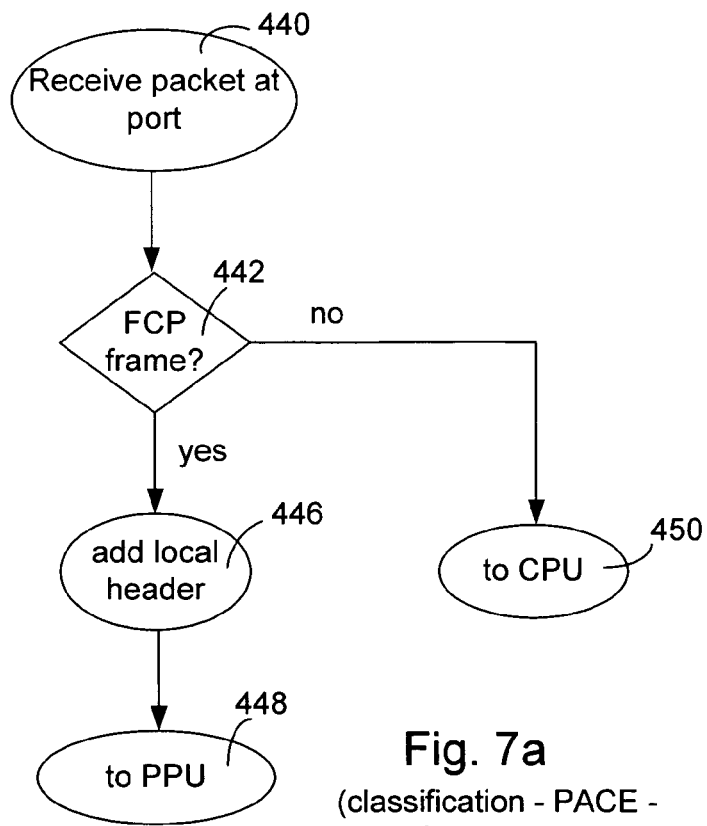
FIG. 7a is a flowchart depicting a classification process of FCP frames in the ingress direction as the process occurs in a PACE in accordance with one embodiment.

FIG. 7a illustrates the steps that occur at the PACE in classifying packets that arrive from an FC port. Unlike for a GigE port, the PACE for an FC port does not have to deal with a TCP Control Block Index. Instead, upon receiving a packet at an FC port, step 440, the S_ID field of the FCP frame header can be consulted to determine if the frame belongs to an open FC connection, however, this step is performed after the packet is passed to the PPU. Thus, the PACE only need determine if the frame is an FCP frame, step 442, which can be determined by consulting the R_CTL and TYPE fields of the frame header. A local header 4is added, step 444, although the FCP frame header is not removed at this point as the data in the header will be useful to the PPU later. The local packet is then passed to the PPU, step 448. If the frame is not an FCP frame, it is passed to the CPU, step 450.

Figure 7B:
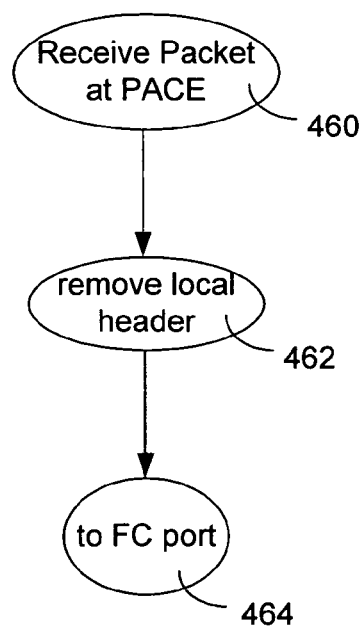
FIG. 7b is a flowchart depicting a classification process of FCP frames in the egress direction as the process occurs in a PACE in accordance with one embodiment.

Referring to FIG. 7b, when a packet destined for an FC port is received in the egress direction by the PACE from an PPU or CPU, step 460, the PACE simply removes the local header, step 462, before passing the frame to the FC port, step 464. The local header will indicate to the PACE which port (of the two ports the PACE is connected to) the packet is destined for.

Figure 8A:
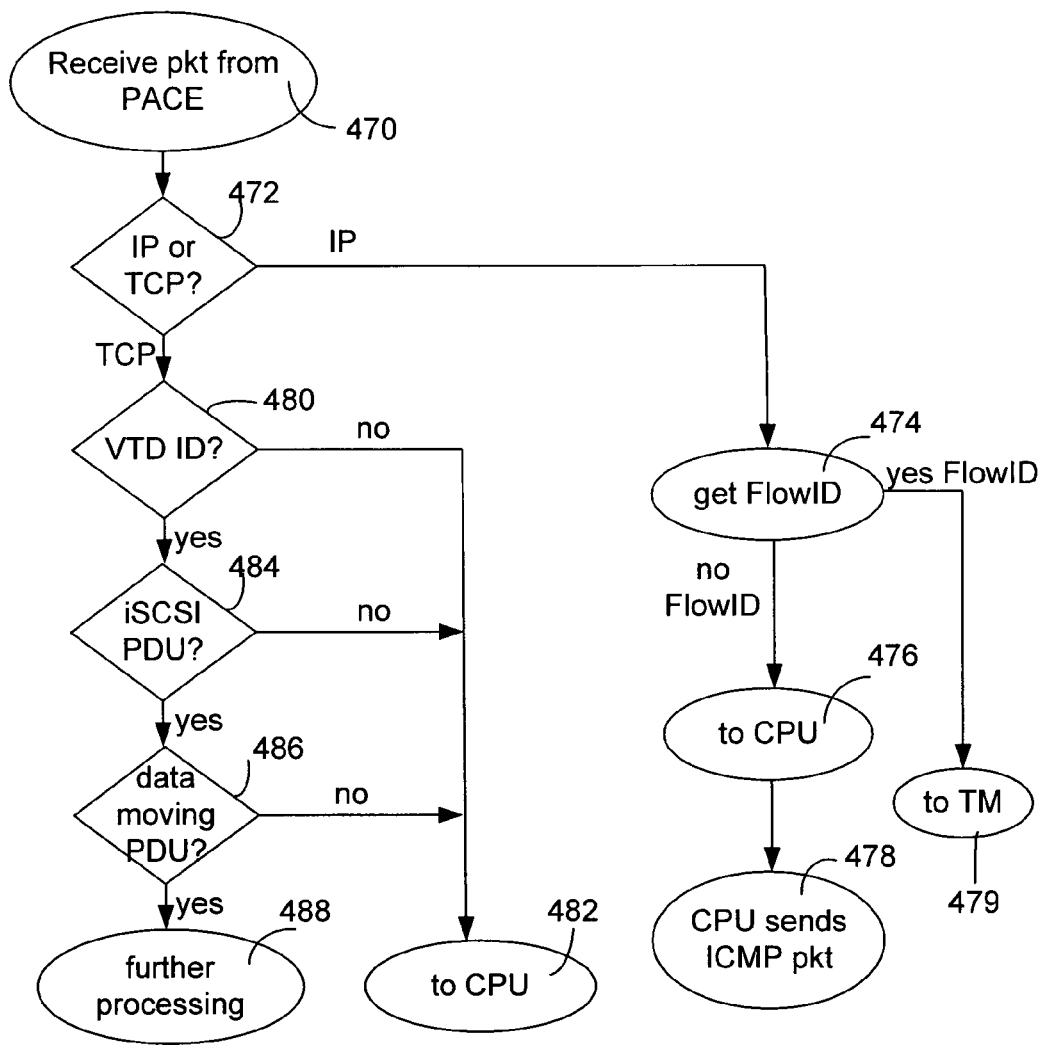
FIG. 8a is a flowchart depicting a classification process in the ingress direction as the process occurs in a PPU in accordance with one embodiment.

For packets received at either a GigE or FC port and that are passed to the PPU, the PPU further separates control traffic in one embodiment. Referring to FIG. 8a, when the PPU receives a packet from the PACE, step 470, the PPU determines if it is an IP or TCP packet, step 472. If the packet is an IP packet, the PPU searches its CAM to obtain the Flow ID of the packet from its route table, step 474. If the search fails, the packet has an unknown destination IP address, and it is passed to the CPU, step 476, which in turn sends an ICMP packet back to the source IP address step 478. If the search returns a Flow ID, then the packet is forwarded to the Traffic Manager, step 479.

When the packet received is a TCP packet, step 472, the PPU searches its CAM using the TCP Control Block Index, which identifies the TCP session, together with the LUN from the iSCSI header, which identifies the virtual target, to get a virtual target descriptor ID (VTD ID), step 480. The VTD IDs are essentially addresses or pointers to the VTDs stored in the PPU SRAM. The PPU uses the VTD ID to obtain the address of the VTD, step 480, so a search of VTD IDs allows the ability to quickly locate a VTD. If the VTD cannot be obtained, then the iSCSI session has not yet been established, and the packet is sent to the CPU, step 482. But if the VTD ID is obtained in step 480, the PPU determines if the packet contains an iSCSI PDU, step 484. If the packet does not contain an iSCSI PDU, it is forwarded to the CPU, step 482. But if it does include an iSCSI PDU, the PPU determines if the PDU is a data moving PDU (e.g., read or write command, R2T, write data, read data, response), step 486. If the PDU is not a data moving PDU, then the packet is passed to the CPU, step 482. But if the PDU is a data moving PDU, then the PPU performs further processing on the packet, step 488, e.g., virtualization and translation, as will be described later.

When the PPU receives an FCP frame with an FCP command IU in the TK2Z pg34 ingress direction, the PPU performs similar steps to those described in FIG. 8a, steps 470, 480-488, except that the CAM search in step 480 uses the S_ID address and the LUN from the FCP frame to find the VTD ID.

Figure 8B:
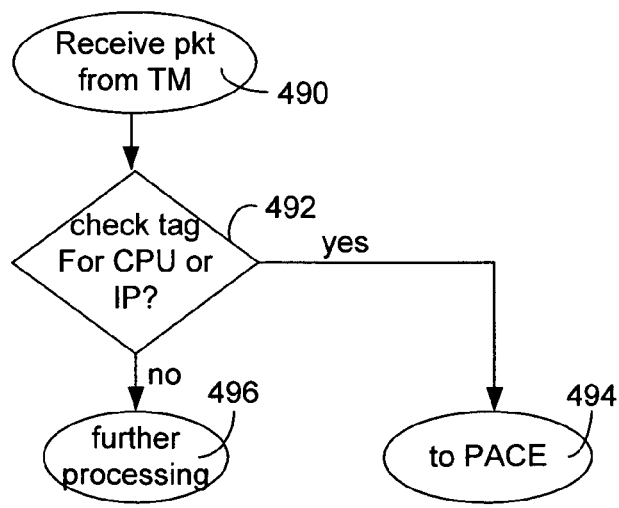
FIG. 8b is a flowchart depicting a classification process in the egress direction as the process occurs in a PPU in accordance with one embodiment.

In the egress direction, shown in FIG. 8b, after receiving a packet from the traffic manager, step 490, the PPU checks the Type field of the local header, step 492. If the field indicates that the packet is an IP packet or a packet destined for the CPU, then the PPU sends the packet to the PACE, step 494. Otherwise, the PPU performs further processing on the packet, step 496, e.g., virtualization and translation, as will be described later.

As described above, the CPU will be passed packets from the SPU in several situations. These situations include:

1. A non-TCP packet having the storage switch as its destination. Such a packet could be an ICMP, IP, RIP, BGP, or ARP packet, as are understood in the art. The CPU performs the inter-switch communication and IP routing function. The packet may also be SLP or iSNS requests that will be forwarded to the SCC.

2. An IP packet without a CAM match to a proper routing destination. While this situation will not frequently occur, if it does, the CPU returns an ICMP packet to the source IP address.

3. A non-iSCSI TCP packet. Such a packet would generally be for the CPU to establish or terminate a TCP session for iSCSI and will typically be packets with SYN, FIN, or RST flags set.

4. A non-FCP FC frame. Such frames are FLOGI, PLOGI, and other FCP requests for name services. Similar to iSCSI TCP session, these frames allow the CPU to recognize and to communicate with the FC devices. In one embodiment, the CPU needs to communicate with the SCC to complete the services.

5. An iSCSI PDU that is not a SCSI command, response, or data. Such a packet may be a ping, login, logout, or task management. Additional iSCSI communication is generally required before a full session is established. The CPU will need information from the SCC database to complete the login.

6. An iSCSI command PDU with a SCSI command that is not Read/Write/Verify. These commands are iSCSI control commands to be processed by the CPU where the virtual target behavior is implemented.

7. An FCP frame with a SCSI command that is not Read/Write/Verify. These commands are FCP control commands to be processed by the CPU where the virtual target behavior is implemented.

Switch-Based Storage Operations

One of ordinary skill in the art will have a general knowledge of the iSCSI and FC protocols. However, for more information on iSCSI refer to "draft-ietf-ips-iSCSI-20.txt," an Internet Draft (see www.ietf.org) and work in progress by the Internet Engineering Task Force (IETF), Jan. 19, 2003, incorporated herein by reference in its entirety. For more information about Fibre Channel (FC) refer to "SCSI Fibre Channel Protocol-2 (FCP-2)", Nov. 23, 2002, Rev: 08 (see www.t10.org), incorporated herein by reference in its entirety. In addition, both are further described in U.S. patent application Ser. No. 10/051,321, entitled STORAGE SWITCH FOR STORAGE AREA NETWORK, filed Jan. 18, 2002.

Virtualization

Exemplary ingress and egress processes for various packet types are described for explanatory purposes only. It will be understood that numerous processes for various packet types can be used in accordance with various embodiments. In one embodiment, after an incoming packet is classified as data or control traffic by the PPU, the PPU can perform virtualization for data packets without data buffering. For each packet received, the PPU determines the type of packet (e.g., command, R2T/XFER_RDY, Write Data, Read Data, Response, Task Management/Abort) and then performs either an ingress (where the packet enters the switch) or an egress (where the packet leaves the switch) algorithm to translate the virtual target to a physical target or vice versa. Thus, the virtualization function is distributed amongst ingress and egress ports. To further enable wire-speed processing, virtual descriptors are used in conjunction with a CAM, to map the request location to the access location. In addition, for each packet there may be special considerations. For instance, the virtual target to which the packet is destined may be spaced over several noncontiguous extents, may be mirrored, or both.

Command Packet—Ingress

Figure 9A:
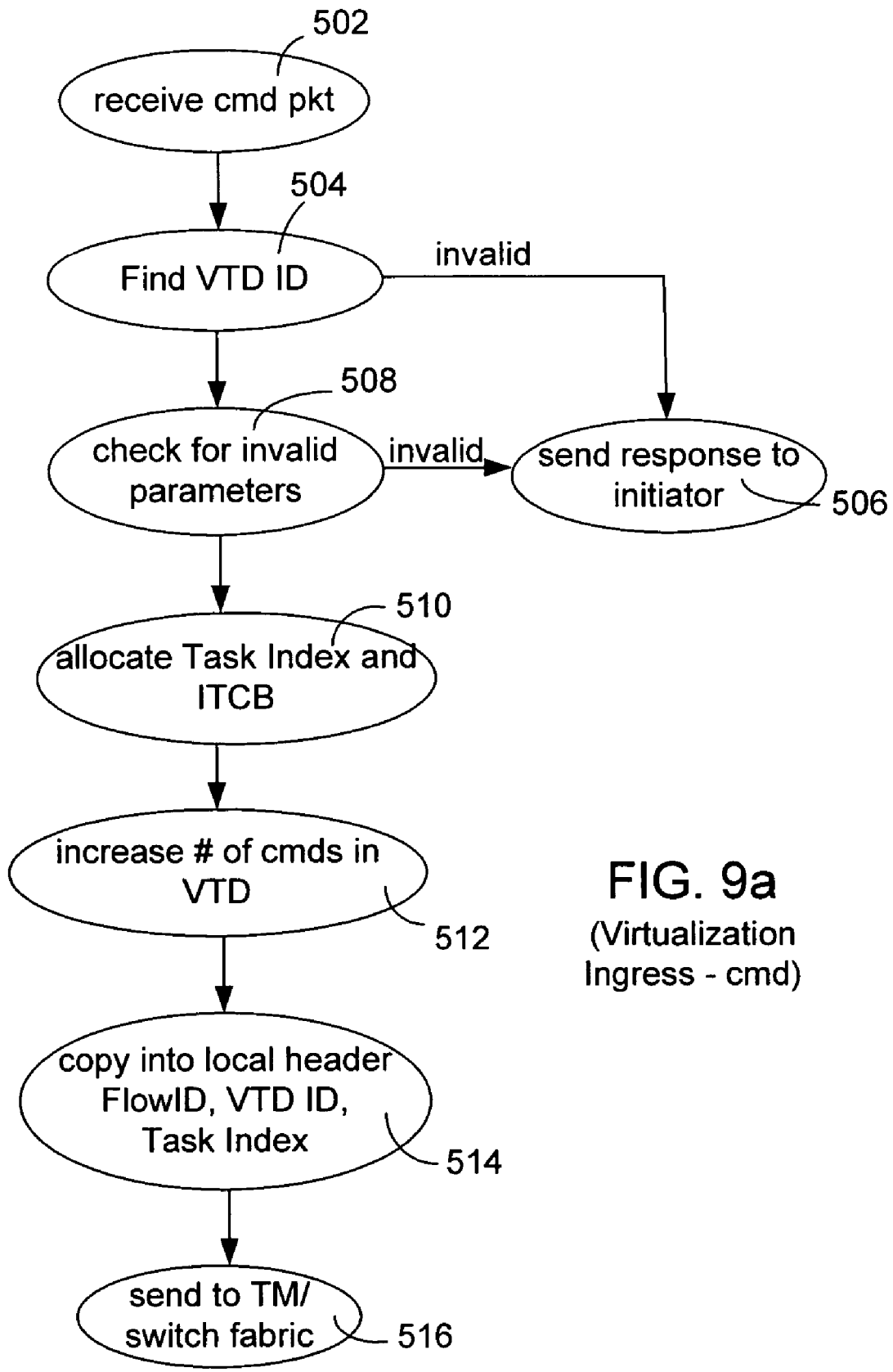
FIG. 9a is a flowchart illustrating a virtualization process in the ingress direction for command packets or frames, in accordance with one embodiment.

To initiate a transfer task to or from the virtual target, a SCSI command is sent by an iSCSI or FC initiator in an iSCSI PDU or FCP IU, respectively. Referring to FIG. 9a, when such a packet is received at the PPU (after classification), step 502, the PPU CAM is next checked to determine if a valid VTD ID exists, using the TCP Control Block Index and the logical unit number (LUN), in the case of an iSCSI initiator, or the S_ID (an identification of the source of the frame) and the LUN, in the case of an FC initiator, step 504. The LUNs in each case are found in the respective iSCSI PDU or FCP IU. If no valid VTD ID is found, then a response packet is sent back to the initiator, step 506. If a valid VTD is found, then a check is made for invalid parameters, step 508. If invalid parameters exists, a response packet is sent back to the iSCSI or FC initiator, step 506.

A Task Index is allocated along with an Ingress Task Control Block (ITCB), step 510. The Task Index points to or identifies the ITCB. The ITCB stores the Flow ID (obtained from the VTD), the VTD ID, command sequence number or CmdSN (from the iSCSI packet itself), as well as an initiator (originator) identification (e.g., the initiator_task_tag sent in the iSCSI PDU or the OX_ID in the FCP frame header). The OX_ID is the originator (initiator) identification of the exchange. The ITCB is stored in the PPU SRAM. Of course there may be many commands in progress at any given time, so the PPU may store a number of ITCBs at any particular time. Each ITCB will be referenced by its respective Task Index.

The VTD tracks the number of outstanding commands to a particular virtual target, so when a new ITCB is established, it increments the number of outstanding commands, step 512. In some embodiments, VTDs establish a maximum number of commands that may be outstanding to any one particular virtual target. The Flow ID, the VTD ID, and the Task Index are all copied into the local header, step 514. The Flow ID tells the traffic manager the destination linecards and ports. Later, the Task Index will be returned by the egress port to identify a particular task of a packet. Finally, the packet is sent to the traffic manager and then the routing fabric, so that it ultimately reaches an egress PPU, step 516.

When a virtual target is composed of multiple extents, there are multiple Flow IDs identified in the VTD, one for each extent. The PPU checks the block address for the packet and selects the correct Flow ID. For example, if a virtual target has two 1 Gb extents, and the block address for the command is in the second extent, then the PPU selects the Flow ID for the second extent. In other words, the Flow ID determines the destination/egress port. If a read command crosses an extent boundary, meaning that the command specifies a starting block address in a first extent and an ending block address in a second extent, then after reading the appropriate data from the first extent, the PPU repeats the command to the second extent to read the remaining blocks. For a write command that crosses an extent boundary, the PPU duplicates the command to both extents and manages the order of the write data. When a read command crosses an extent boundary, there will be two read commands to two extents. The second read command is sent only after completing the first to ensure the data are returned sequentially to the initiator.

Command Packet—Egress

Figure 9B:
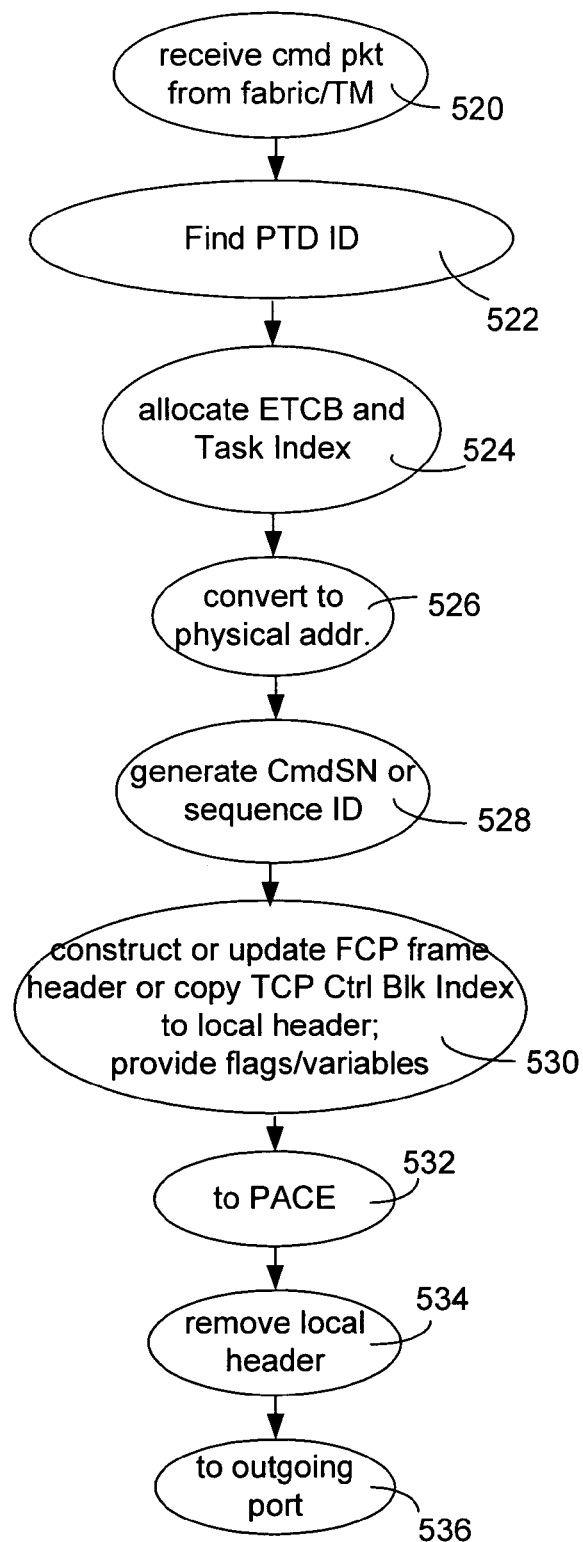
FIG. 9b is a flowchart illustrating a virtualization process in the egress direction for command packets or frames, in accordance with one embodiment.

Referring to FIG. 9b, after a command PDU or IU has passed through the switch fabric, it will arrive at an PPU, destined for an egress port, step 520. The PPU attempts to identify the physical device(s) that the packet is destined for, step 522. To do so, the VTD ID from the local header is used to search the PPU CAM for a PTD ID (Physical Target Descriptor Identifier). The VTD ID is affiliated with and indexes a particular PTD ID associated with the particular egress PPU. PTDs are stored in the PPU SRAM, like VTDs, and also contain information similar to that found in a VTD. If the search is unsuccessful, it is assumed that this is a command packet sent directly by the CPU and no additional processing is required by the PPU, causing the PPU to pass the packet to the proper egress port based on the Flow ID in the local header. If the search is successful, the PTD ID will identify the physical target (including extent) to which the virtual target is mapped and which is in communication with the particular egress linecard currently processing the packet.

The PPU next allocates a Task Index together with an egress task control block (ETCB), step 524. In an embodiment, the Task Index used for egress is the same as that used for ingress. The Task Index also identifies the ETCB. In addition, the ETCB also stores any other control information necessary for the command, including CmdSN of an iSCSI PDU or an exchange sequence for an FCP IU.

Using the contents of the PTD, the PPU converts the SCSI block address from a virtual target to the block address of a physical device, step 526. Adding the block address of the virtual target to the beginning block offset of the extent can provide this conversion. For instance, if the virtual target block sought to be accessed is 1990 and the starting offset of the corresponding first extent is 3000, then the block address of the extent to be accessed is 4990. Next the PPU generates proper iSCSI CmdSN or FCP sequence ID, step 528 and places them in the iSCSI PDU or FCP frame header. The PPU also constructs the FCP frame header if necessary (in some embodiments, after the ingress PPU reads the necessary information from the FCP header, it will remove it, although other embodiments will leave it intact and merely update or change the necessary fields at this step) or for a packet being sent to an iSCSI target, the TCP Control Block Index is copied into the local header from the PTD, step 530. In addition, the PPU provides any flags or other variables needed for the iSCSI or FCP headers. The completed iSCSI PDU or FCP frame are then sent to the PACE, step 532, which in turn strips the local header, step 534, and passes the packet to appropriate port, step 536.

R2T or XFER_RDY—Ingress

Figure 10A:
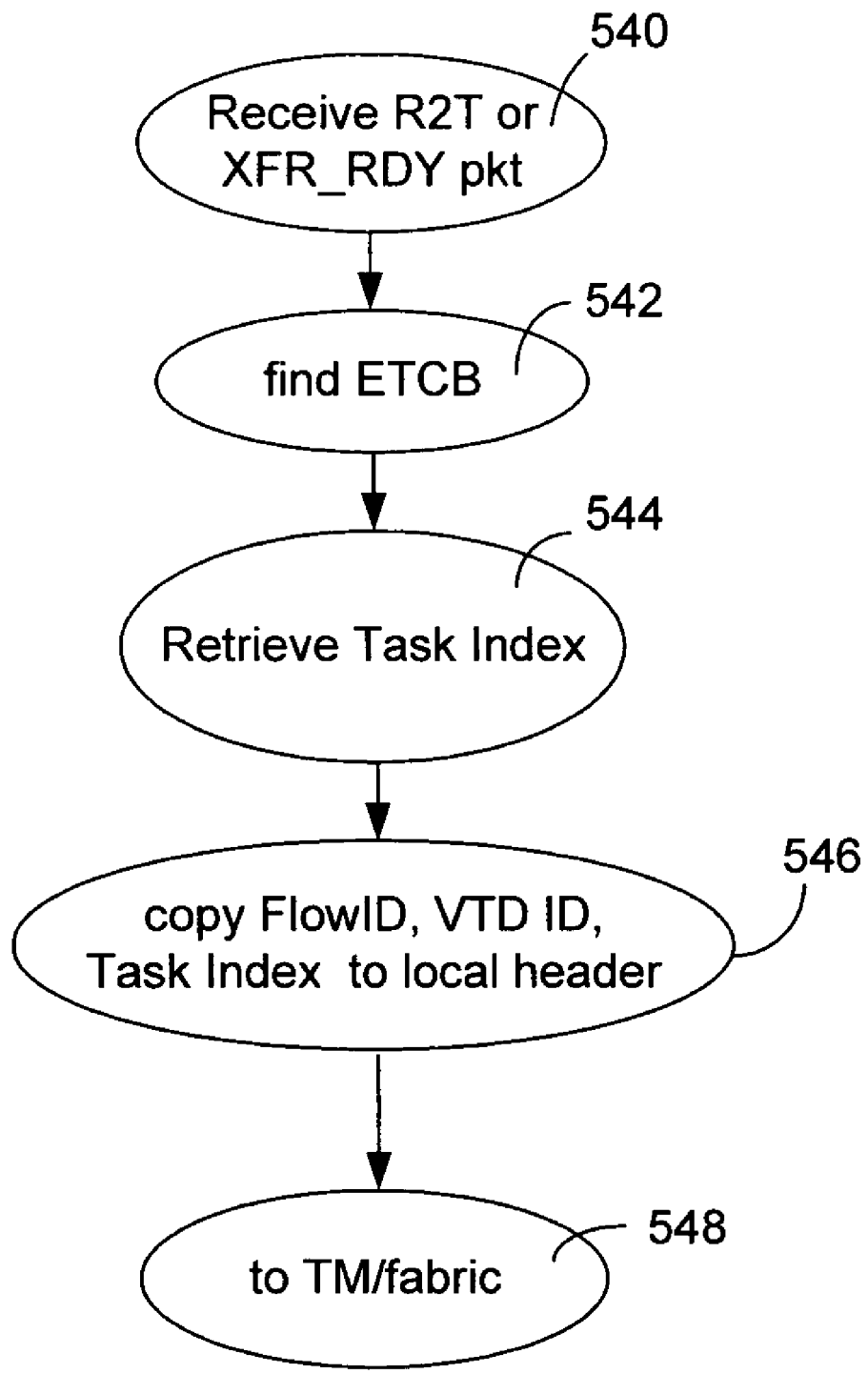
FIG. 10a is a flowchart illustrating a virtualization process in the ingress direction for R2T or XFER_RDY packets or frames, in accordance with one embodiment.

Referring to FIG. 10*a*, after a command has been sent to a target storage device as described above, and the command is a write command, an R2T PDU or an XFER_RDY IU will be received from a storage device when it is ready to accept write data, step 540. The PPU identifies the corresponding ETCB, step 542, by using the initiator_task_tag or OX_ID inside the packet. In some embodiments, the initiator_task_tag or OX_ID of the packet is the same as the Task Index, which identifies the ETCB. If the PPU cannot identify a valid ETCB because of an invalid initiator_task_tag or OX_ID, the packet is discarded. Otherwise, once the ETCB is identified, the PPU retrieves the Ingress Task Index (if different from the Egress Task Index) and the VTD ID from the ETCB, step 544. The PPU also retrieves the Flow ID from the PTD, which is also identified in the ETCB by the PTD ID. The Flow ID indicates to the traffic manager the linecard of the original initiator (ingress) port. The Flow ID, the VTD ID, and the Task Index are copied into the local header of the packet, step 546. Finally the packet is sent to the traffic manager and the switch fabric, step 548.

R2T or XFER_RDY—Egress

Figure 10B:
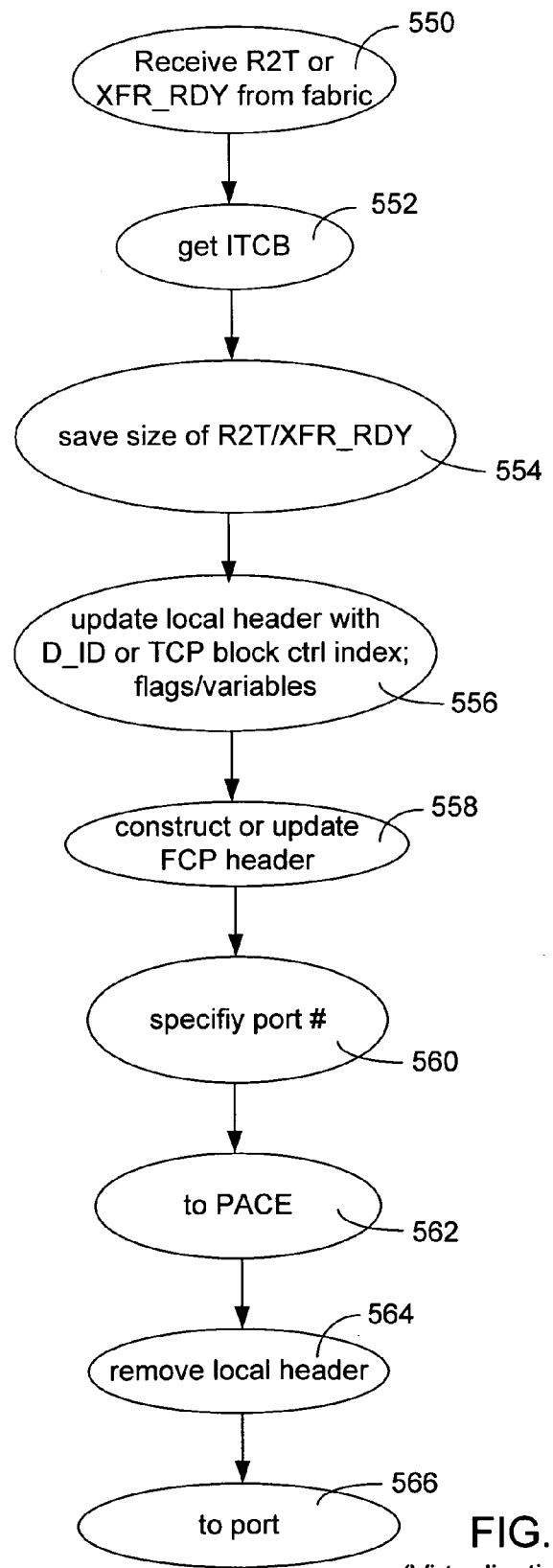
FIG. 10b is a flowchart illustrating a virtualization process in the egress direction for R2T or XFER_RDY packets or frames, in accordance with one embodiment.

Referring to FIG. 10*b*, after the R2T or XFER_RDY packet emerges from the switch fabric, it is received by a PPU, step 550, on its way to be passed back to the initiator (the device that initiated the original command for the particular task). The Task Index identifies the ITCB to the PPU, step 552, from which ITCB the original initiator_task_tag and the VTD ID can be obtained. The R2T/XFER_RDY Desired Data Transfer Length or BURST_LEN field is stored in the ITCB, step 554. The local header is updated with the FCP D_ID or the TCP Control Block Index for the TCP connection, step 556. Note that the stored S_ID from the original packet, which is stored in the ITCB, becomes the D_ID. If necessary, an FCP frame header is constructed or its fields are updated, step 558. The destination port number is specified in the local header in place of the Flow ID, step 560, and placed along with the initiator_task_tag in the SCSI PDU or, for an FC connection, the RX_ID and OX_ID are placed in the FCP frame. The RX_ID field is the responder (target) identification of the exchange. The PPU also places any other flags or variables that need to be placed in the PDU or FCP headers. The packet is forwarded to the PACE, step 562, which identifies the outgoing port from the local header. The local header is then stripped, step 564 and forwarded to the proper port for transmission, step 566.

In the event that the command is split over two or more extents, e.g., the command starts in one extent and ends in another, then the PPU must hold the R2T or XFER_RDY of the second extent until the data transfer is complete to the first extent, thus ensuring a sequential data transfer from the initiator. In addition, the data offset of the R2T or XFER_RDY of the second extent will need to be modified by adding the amount of data transferred to the first extent.

Write Data Packet—Ingress

Figure 11A:
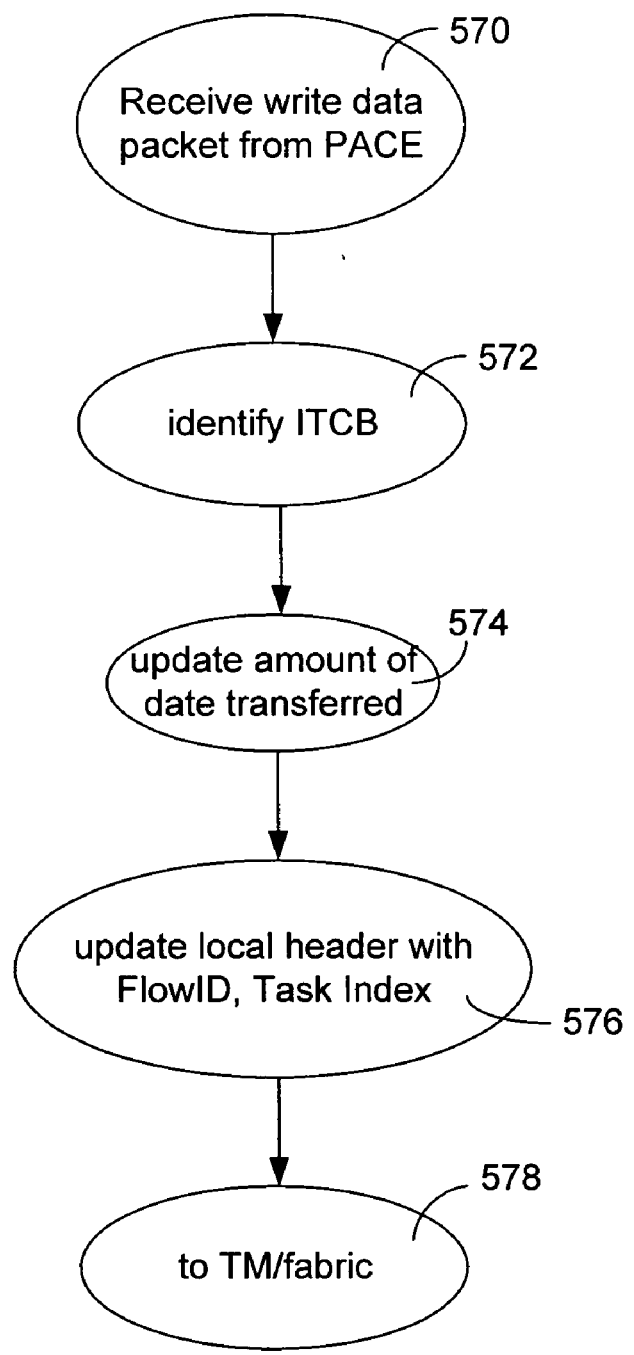
FIG. 11a is a flowchart illustrating a virtualization process in the ingress direction for write data packets or frames, in accordance with one embodiment.

After an initiator receives an R2T or XFER_RDY packet it returns a write-data packet. Referring to FIG. 11*a*, when a write-data iSCSI PDU or FC IU is received from an initiator, step 570, the ITCB to which the packet belongs must be identified, step 572. Usually, the ITCB can be identified using the RX_ID or the target_task_tag, which is the same as the Task Index in some embodiments. The SPU further identifies that received packets are in order. In some circumstances, however, the initiator will transfer unsolicited data: data that is sent prior to receiving an R2T or XFER_RDY. In such a case, the PPU must find the ITCB by a search through the outstanding tasks of a particular virtual target. But if the ITCB is not found, then the packet is discarded. If the ITCB is found, the total amount of data to be transferred is updated in the ITCB, step 574. The Flow ID and Task Index are added to the local header of the packet, step 576. The packet is then forwarded to the traffic manager and ultimately to the switch fabric, step 578.

Write Data Packet—Egress

Figure 11B:
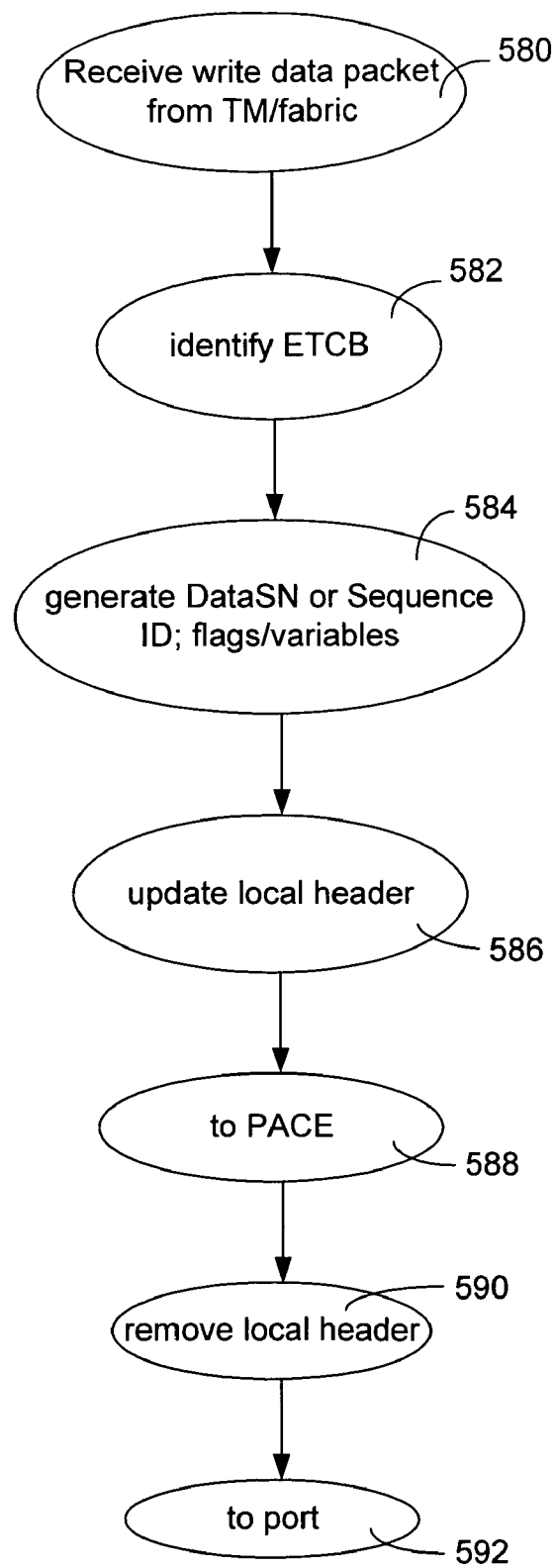
FIG. 11b is a flowchart illustrating a virtualization process in the egress direction for write data packets or frames, in accordance with one embodiment.

Referring to FIG. 11*b*, when a write-data packet is received from the switch fabric (via the traffic manager), step 580, the ETCB for the packet needs to be identified, step 582. Typically, the ETCB can be identified using the Task Index in the local header. Once the ETCB is found, using the information inside the ETCB, the PPU generates proper iSCSI DataSN or FCP sequence ID, step 584, along with any other flags and variables, e.g, data offset, for the PDU or FCP frame header. The local header is updated with the TCP Control Block Index or the FCP D_ID from the PTD, step 586. The port number is also added to the local header. The finished iSCSI PDU or FCP frame is sent to the PACE, step 588, which removes the local header, step 590, and forwards the packet to the appropriate port, 592.

Multi-Chassis Multi-Path Storage Solutions

Figure 12:
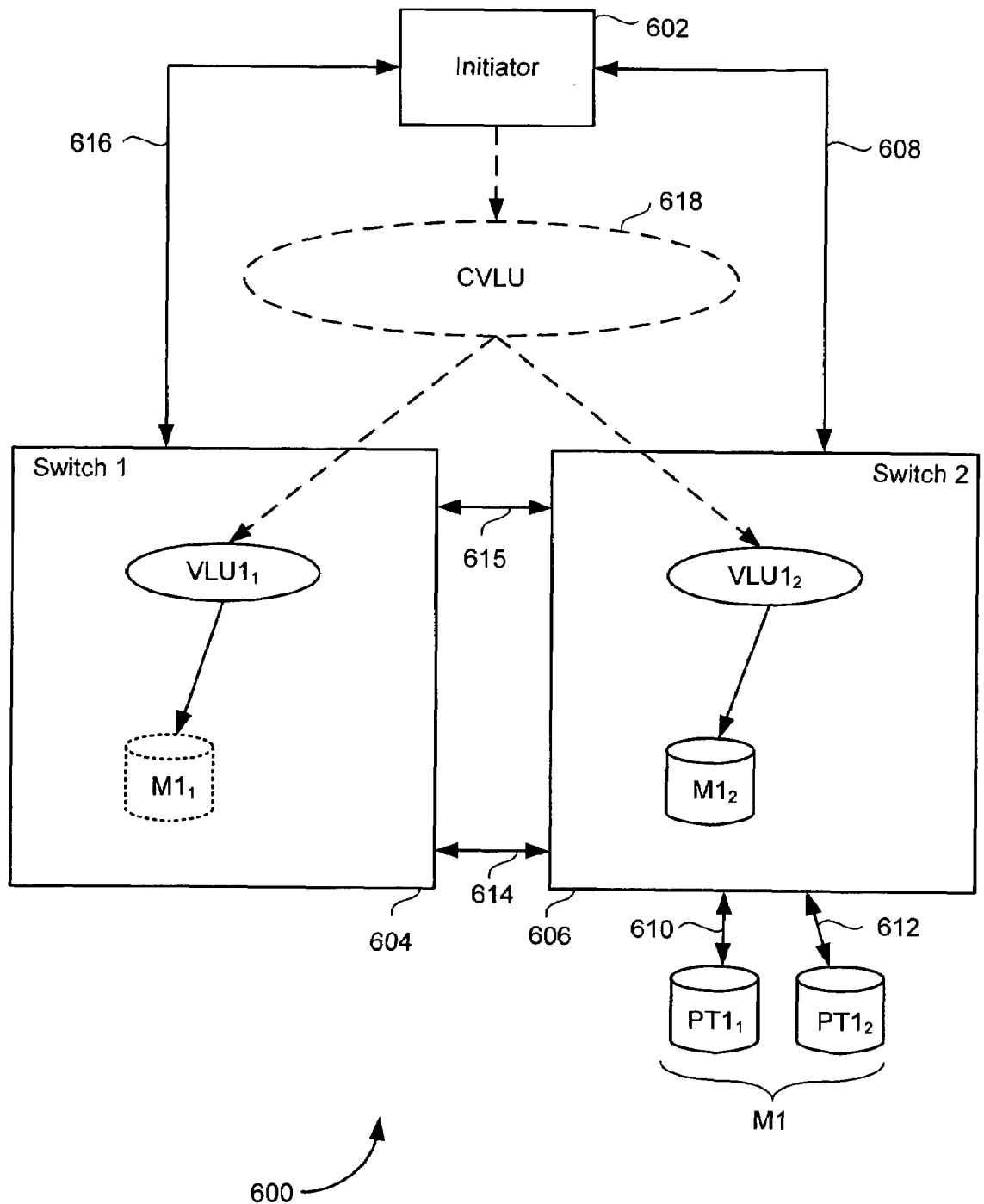
FIG. 12 is a block diagram depicting a storage area network in accordance with one embodiment.

FIG. 12 depicts a block diagram of a storage area network 600 in accordance with one embodiment for providing high availability of storage subsystems and data. Network 600 includes an initiator 602, a first storage switch 604, a second storage switch 606 and physical targets $PT1_1$ and $PT1_2$. Physical targets $PT1_1$ and $PT1_2$ are connected to switch 606 via one or more ports at one or more line cards of switch 1206. A virtual logic unit $VLU1_2$ has been provisioned at switch 606 to include a member M1 representing or mapping to physical targets $PT1_1$ and $PT1_2$.

Provisioned virtual target $VLU1_2$ represents two levels of virtualization within storage switch 606. The virtualization of one or more storage subsystems into members at switch represents a first level of virtualization. At switch 606, the combination of physical targets $PT1_1$ and $PT1_2$ is virtualized to create member M1, representing a first level of virtualization at switch 606. The virtualization of one or more members to create a virtual target or virtual logical unit represents a second level of virtualization. At switch 606, M1 is provisioned as a member of $VLU1_2$, representing a second level of virtualization.

Initiator 602 is connected to switch 606 via one or more ports at one or more line cards of the switch. $VLU1_2$ can be made accessible to initiator 602 by placing the unit into an accessible domain for the initiator. Initiator 602 can access $VLU1_2$ by passing read and write requests to the switch. Switch 606 will read the virtual target object provisioned for $VLU1_2$ and the initiator object provisioned for initiator 602 and pass initiator and virtual target information to the relevant line cards to process the request. Accordingly, initiator 602 can access data stored on, and write data to, physical targets $PT1_1$ and $PT1_2$ without knowledge of the underlying storage subsystems by issuing appropriate commands and data for $VLU1_2$.

In typical storage switches and storage area networks, a physical target is only accessible via the storage switch to which it is physically connected. Thus, if the storage switch or the connection between an initiating device and the storage switch becomes unavailable, then the physical target and the data residing thereon will become unavailable. For example, if data path or connection 608 between initiator 602 and switch 606 is lost, initiator 602 will be unable to provide requests for $VLU1_2$. Similarly, if either of data paths 610 or 612 between switch 606 and physical targets $PT1_1$ and $PT1_2$ are lost, switch 606 will be unable to fulfill requests involving the physical target of the lost path. Obviously such unavailability of data and devices can present problems in any storage area network and in particular, those networks where fast, accurate, and reliable access of data is necessary.

In accordance with one embodiment, multiple paths over multiple chassises to physical targets are provided across one or more storage switches in order to provide alternate or additional access to such physical devices. An inter-chassis link (ICL) 614 is provided between storage switches 604 and 606 for communication between each chassis. Inter chassis link 614 can be formed between ports at a line card of each storage switch. Inter chassis link 614 can include any suitable protocol such as fiber channel, Gigabit Ethernet (utilizing iSCSI protocol), or Internet Protocol (IP). In one embodiment, an IP link 615 is provided in addition to ICL 614. Additionally, multiple ICLs 614 can be provided as more fully described hereinafter. The switches can be connected directly, over one or more networks, or have other switches connected with similar ICLs, as more fully described hereinafter.

With such available communication between switches established, physical targets connected at one switch can be virtualized at a second switch. For example physical targets $PT1_1$ and $PT1_2$ can be virtualized as one or more members at switch 604. As depicted in FIG. 12, physical targets $PT1_1$ and $PT1_2$ are virtualized as member $M1_1$. $VLU1_1$ will include much of the same information as $VLU1_2$ at switch 606, however, $VLU1_1$ will include information to designate that the physical targets $PT1_1$ and $PT1_2$ are remotely located at switch 606. $VLU1_1$ can include destination information (e.g., a Flow ID in the associated VTD) specifying the line card at which the ICL is provided rather than information specifying the port and line card to which the physical target is located, as with targets virtualized at the switch to which they are located. When command and data packets are received for $VLU1_1$, a local header can be added to the packet that specifies the port and line card of the ICL. In one embodiment, a special ICL frame header is added to packets to transport messages between chassis in addition to a local header (as previously described) that can be added to specify port and line card information at which the physical targets are connected.

Member $M1_1$ and $M1_2$ are essentially the same member, both referencing the same physical storage. Their difference lies in the destination information for accessing that physical storage. A VTD and Flow ID (or portion of a VLU VTD associated with the member) for member $M1_2$ will reference a linecard and port to which targets $PT1_1$ and $PT1_2$ are connected. A VTD and Flow ID for $M1_1$, however, will reference a linecard a port of ICL connection 614 and/or 615. Members like $M1_1$ may be referred to as remote members to indicate such remote provisioning and to distinguish the virtualization of the physical storage at the two (or more) switches.

Provisioning virtual target $VLU1_2$ and member $M1_2$ is not a requirement for provisioning $VLU1_1$ and $M1_1$ for remotely located physical targets $PT1_1$ and $PT1_2$. $VLU1_1$ can operate independently at switch 604 to provide access to targets $PT1_1$ and $PT1_2$ across ICL 614. A VTD provisioned for $VLU1_1$ can maintain the necessary information (Flow ID, etc.) for virtualizing incoming messages and determining relevant physical information. Such configuration of $VLU1_1$ independent of $VLU1_2$ can provide for multi-chassis pathing to physical targets $PT1_1$ and $PT1_2$.

However, in accordance with other embodiments, $VLU1_1$ and $VLU1_2$ can be provisioned to provide a multi-path storage solution taking advantage of a multi-chassis configuration. Accordingly, high availability of data of physical targets provisioned in such a manner can be achieved.

Referring again to FIG. 12, $VLU1_1$ is provisioned at switch 604 to include member $M1_1$ (remote), corresponding to physical targets $PT1_1$ and $PT1_2$ while $VLU1_2$ is provisioned at switch 606 to include member $M1_2$, corresponding to the same physical targets. In accordance with one embodiment, $VLU1_1$ and $VLU1_2$ are assigned the same virtual target or virtual logical unit identification (e.g., VLU ID) to provide an apparent single virtual logical unit to initiating devices. This apparent single volume, formed of two individual VLUs at separate storage switches having the same identification, is referred to herein as a clustered virtual logical unit (CVLU). As previously described, virtual targets can be identified by a VLU ID. $VLU1_1$ and $VLU1_2$ are assigned the same VLU ID so that a single volume can be presented to host devices connected to both switches 604 and 606.

Initiator 602, connected to switch 606 via line 608, will see a volume at switch 606 having the assigned VLU ID to $VLU1_2$. Initiator 602, via line 616, will see the apparent same volume at switch 604 by virtue of $VLU1_1$ having the same VLU ID as $VLU1_2$. Thus, initiator 602 will see two paths to the same logical unit or volume. That is to say, although distinct VLU's have been provisioned at switches 604 and 606, they will appear as a single virtual target to initiator 602 by virtue of having same assigned VLU ID.

The volume appearing to initiating devices is denoted as CVLU 618. CVLU 618 is not an actual provisioned logical unit within either of switches 604 or 606. CVLU 618, depicted in FIG. 12, represents the conceptualized clustering of $VLU1_1$ and $VLU1_2$ by virtue of assigning the same VLU ID. Thus, initiator 602 will see the same virtual target along paths 608 and 616. The clustering of VLUs across storage switches provides a third level of virtualization within the switches for multi-path availability of physical targets.

The availability and access of $VLU1_1$ and $VLU1_2$ can both be active at any given time. $VLU1_1$ and $VLU1_2$ can both accept requests for the target and provide two active paths to physical targets $PT1_1$ and $PT1_2$. There is no requirement that only one available connection or VLU be active at one time. Such a configuration is referred to as an active/active connection for the virtual target.

The resulting functionality of such a provisioning allows multiple paths across multiple switches from initiating devices to the same physical target(s). For example, if path 608 becomes unavailable between initiator 602 and switch 606, physical targets $PT1_1$ and $PT1_2$, and the data residing thereon, can be accessed via path 616 without any loss of service or interruption to initiator 602. As is common and well known in the art, host devices can include multiple connections to a destination volume or target. For example, a server can provide two direct paths to the same physical storage subsystem. Such multiple paths are managed in initiating devices by well known software such as STORAGE FOUNDATION™ with DYNAMIC MULTIPATHING OPTION, available from VERITAS Software Corporation of 350 Ellis Street, Mountain View, Calif. 94043. Such software can utilize either of the available paths to access the destination. Accordingly, to initiating devices coupled to multiple storage switches having VLUs with the same LUN in accordance with embodiments, the target VLUs will simply appear as a single target with multiple paths provided thereto. Such software can be intelligent and choose optimal paths or be set in any configuration desired to utilize either of multiple paths as well as to allow selection of an individualized path. Accordingly, should path 616 become unavailable, initiator 602 can access switch 606 via path 608 to access the virtual target and underlying storage subsystems. A CVLU can thus provide virtualization of the same physical storage across multiple storage switches. The CVLU can provide access to the storage through multiple switches without host or initiating devices needing any specialized switch or storage subsystem related software for realizing the CVLU.

Figure 13:
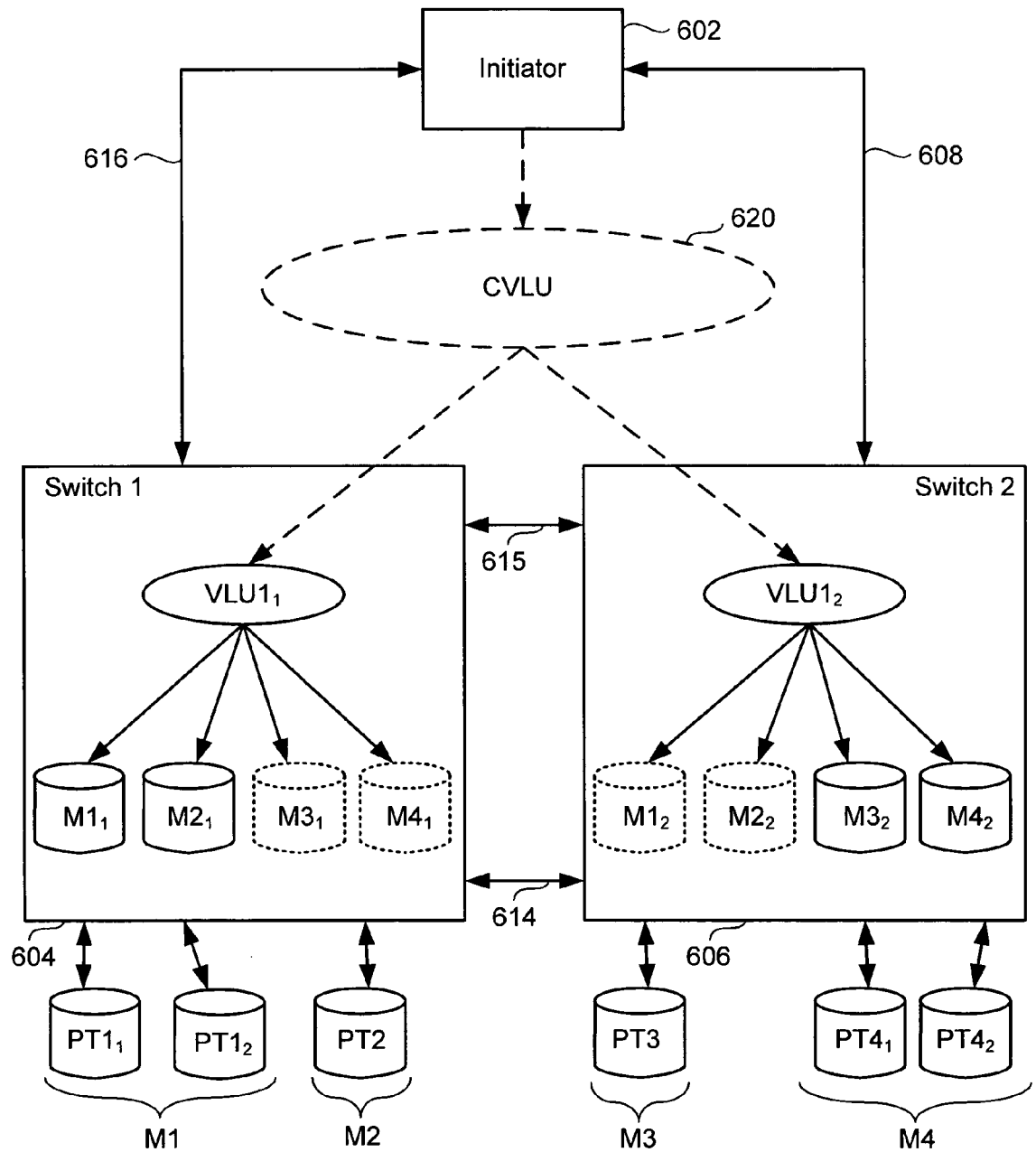
FIG. 13 is a block diagram depicting a storage area network in accordance with one embodiment.

In accordance with one embodiment, the multi-chassis, multi-pathing solution depicted in FIG. 12 can be expanded to provide a mirrored virtual logical unit across switches, as depicted in FIG. 13. FIG. 13 depicts a block diagram of a storage area network including initiator 602, switch 604 and switch 606. Physical targets $PT1_1$, $PT1_2$ and PT2 are physically connected to switch 602. Physical targets PT3, $PT4_1$ and $PT4_2$ are connected to storage switch 604. Physical targets $PT1_1$ and $PT1_2$ are virtualized at switch 604 as member $M1_1$. Physical target PT2 is virtualized at switch 1 as member $M2_1$. Physical target PT3 is virtualized at switch 606 as member $M3_2$ and physical targets $PT4_1$ and $PT4_2$ are virtualized at switch 606 as member $M4_2$.

$VLU1_1$ at switch 604 can be provisioned to include members $M1_1$ and $M2_1$. $VLU1_1$ can be provisioned as a local mirrored virtual target such that data for $VLU1_1$ is provided to both members $M1_1$ and $M2_1$ and their underlying targets. That is, data written to $VLU1_1$ will be routed to members $M1_1$ and $M2_1$. This will include storing the data in the physical targets corresponding to each of the mirrored members. Data for $VLU1_1$ will have a first copy stored within the combination of $PT1_1$ and $PT1_2$ and second copy stored within PT2. Likewise, $VLU1_2$ at switch 606 is provisioned as a local mirrored virtual logical unit having mirrored members $M3_2$ and $M4_2$. Data for $VLU1_2$ is written to both of members $M3_2$ and $M4_2$ and their respective corresponding physical targets. Thus, data from an initiating device to be stored at $VLU1_2$ will have a first copy routed to physical target PT3 and a second copy routed to the combination of physical targets $PT4_1$ and $PT4_2$. Such mirroring of members of a virtual target can provide for increased reliability and availability of data within a single storage switch. For example, referring to switch 604, if physical targets $PT1_1$ and $PT1_2$ of $M1_1$ were to become unavailable, the data could be retrieved from physical target PT2 of member $M2_1$. Although $VLU1_1$ and $VLU1_2$ are locally mirrored with members corresponding to at least two physical targets connected to the switch at which they are provisioned, such is not a requirement of mirroring across storage switches as hereinafter described. For example, the local VLUs could include a single member or multiple non-mirrored members.

In accordance with one embodiment, such mirroring can be expanded across storage switches to provide availability of data stored at a physical target connected to a switch which becomes unavailable. At each of the storage switches, members (or remote members) are provisioned that correspond to the physical targets connected to the other storage switch. Member $M1_2$ (remote) is provisioned at switch 606. Member $M1_2$ represents the virtualization of physical targets $PT1_1$ and $PT1_2$ (connected to switch 604) at switch 606. Likewise, physical target PT2, connected to switch 1, is virtualized at switch 606 as remote member $M2_2$. Similarly, physical target PT3, connected to switch 606, is virtualized at switch 604 as remote member $M3_1$ and physical targets $PT4_1$ $PT4_2$, connected to switch 606, are virtualized at switch 604 as remote member $M4_1$. Thus, members $M1_1$ and $M1_2$ represent the virtualization of the same physical storage as $M2_1$ and $M2_2$.

Members $M1_1$, $M2_1$, $M3_1$ and $M4_1$ are provisioned as members of virtual logical unit $VLU1_1$ at switch 604. $VLU1_2$ is provisioned at switch 606 to include members $M1_2$, $M2_2$, $M3_2$ and $M4_2$. $VLU1_1$ is provisioned with an identifier, such as a VLU ID, that is identical to the identifier provisioned for $VLU1_2$. This results in a clustered virtual logical unit CVLU 620. Initiator 602, via paths 616 and 618 will seemingly have access to the same volume by virtue of each of the virtual logical units being assigned the same identifier.

$VLU1_1$ and $VLU1_2$ are each provisioned as mirrored virtual logical units to provide for redundant storage or mirroring of data across switches. $VLU1_1$ is provisioned as a mirrored VLU with each of members $M1_1$, $M2_1$, $M3_1$, and $M4_1$ being a mirrored member. $VLU1_2$ is provisioned as a mirrored VLU with each of members $M1_2$, $M2_2$, $M3_2$, and $M4_2$ being a mirrored member. Accordingly, data written to either of these virtual logical units will be routed to each of the members of the virtual logical unit. Accordingly, data provided to $VLU1_1$ from initiator 602 is routed to members $M1_1$, $M2_1$, $M3_1$ and $M4_1$. Data for local members $M1_1$ and $M2_1$ is routed locally to targets $PT1_1$ or $PT1_2$ and PT2. Data for remote members $M3_1$ and $M4_1$ is routed from storage switch 604, across inter-chassis link 614, to target PT3 and the combination of $PT4_1$ and $PT4_2$. Thus, data written to $VLU1_1$ will be routed to four physical storage locations. The data will be stored in the combination of $PT1_1$ and $PT1_2$, in PT2, in PT3 and in the combination of $PT4_1$ and $PT4_2$. Data written to $VLU1_2$ will be routed to each of the physical devices corresponding to the mirrored members similarly as described with respect to data written to $VLU1_1$.

By virtue of having the data stored at physical devices connected to both of switches 604 and 606, high availability of the data can be achieved even if one of the switches becomes unavailable. For example, if switch 606 becomes unavailable, initiator 602 can access switch 604 and $VLU1_1$ for access to the common CVLU 620. By mirroring the virtual logical units across storage switches, access to the data stored on the physical devices is provided even if one of the storage switches becomes unavailable. A best path algorithm can be implemented to provide the best performance in given situations. For example, each VLU can be provisioned to handle read requests by accessing a local member if available to avoid accessing the ICL unless necessary.

Because the levels of virtualization are maintained within each storage switch and a single volume is presented to host devices, no specialized software is required at hosts or targets in order to provide for and utilize a clustered virtual logical unit. Host devices need not be aware that physical storage is provided across multiple switches. The hosts will be presented with a single volume such that their interaction is just as if they were accessing a single volume provisioned at a single switch.

Figure 14:
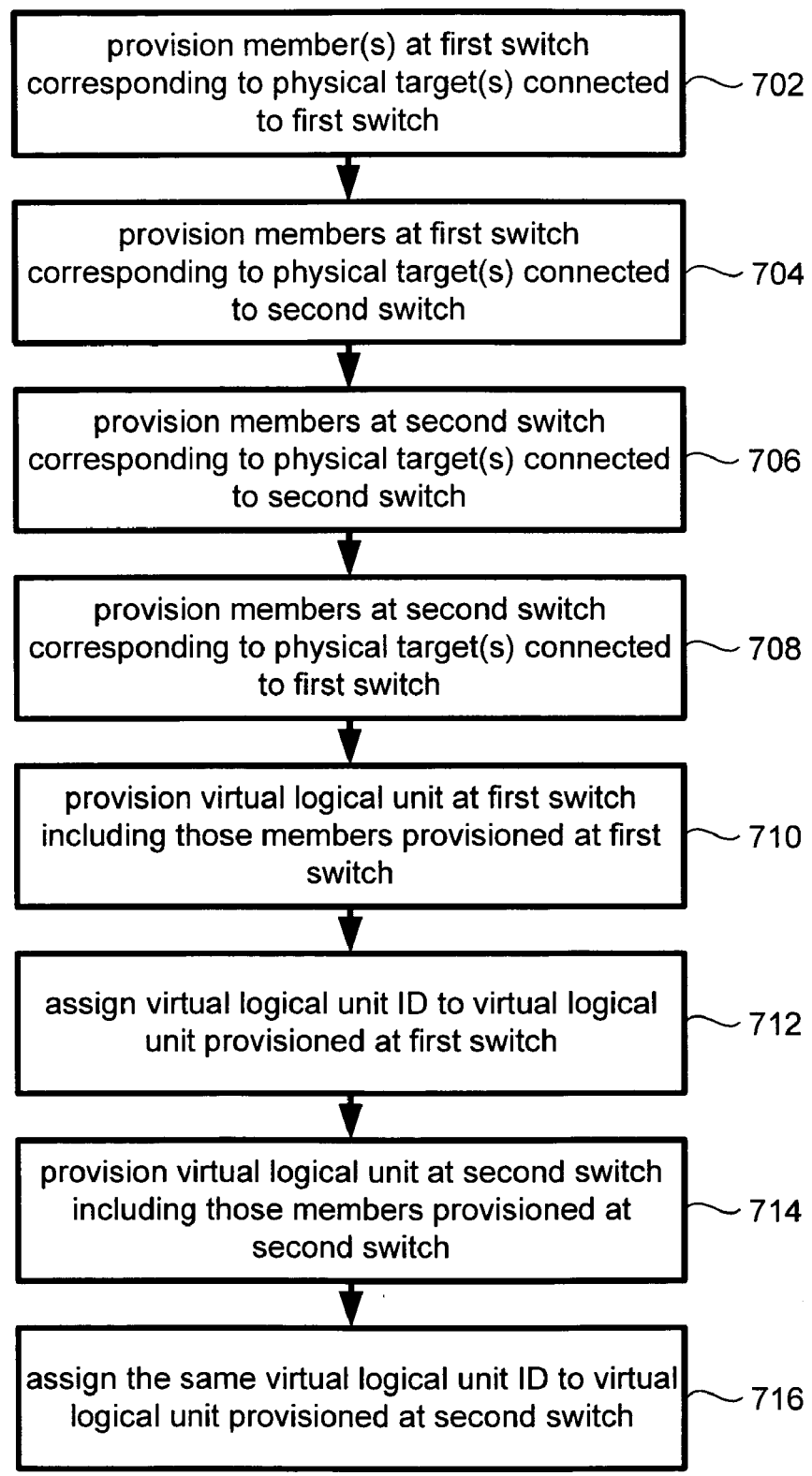
FIG. 14 is a flowchart depicting a provisioning process for a clustered virtual logical unit in accordance with one embodiment.

FIG. 14 is a flowchart in accordance with one embodiment depicting a method for provisioning mirrored virtual logical units across storage switches. At step 702, member(s) are provisioned at a first storage switch that correspond to physical targets connected to the first storage switch. With reference to FIG. 13, step 702 may include provisioning members $M1_1$ and $M2_1$ at switch 1 which correspond to physical targets $PT1_1$ and $PT1_2$, and PT2. At step 704, members (remote) are provisioned at the first storage switch that correspond to physical targets connected to a second storage switch. Referring again to FIG. 13, step 704 may include provisioning members $M3_1$ and $M4_1$ which correspond to physical targets PT3, and $PT4_1$ and $PT4_2$. At step 706, members are provisioned at the second storage switch that correspond to the physical targets connected to the second storage switch. In FIG. 13, step 706 may include provisioning members $M3_2$ (physical target PT3) and $M4_2$ (physical targets $PT4_1$ and $PT4_2$). At step 708, members (remote) are provisioned at the second switch that correspond to the physical targets connected to the first switch. In FIG. 13, step 708 may include provisioning members $M1_2$ (physical targets $PT1_1$ and $PT1_2$) and $M2_1$ (physical target PT2).

At step 710, a first virtual logical unit is provisioned at the first switch to include those members provisioned at the first switch. Step 710 may include provisioning $VLU1_1$ to include members $M1_1$, $M2_1$, $M3_1$ and $M4_1$. The virtual logical unit is provisioned as a mirrored unit with each of the individual members as mirrored members. As previously described, in other embodiments the VLUs are not locally mirrored. A virtual logical unit identification is assigned to the first virtual logical unit provisioned at the first switch at step 712. Step 712 can include assigning a VLU ID to the virtual logical unit. A second virtual logical unit is provisioned at the second storage switch to include those members provisioned at the second storage switch at step 714. Step 714 may include provisioning $VLU1_2$ to include members $M1_2$, $M2_2$, $M3_2$ and $M4_2$. At step 716, the same virtual logical unit identification assigned to the first virtual logical unit at step 712 is assigned to the second virtual logical unit provisioned at the second storage switch. For example the VLU ID assigned to $VLU1_1$ can be assigned to $VLU1_2$. Together, mirrored $VLU1_1$ and mirrored $VLU1_2$, provisioned with the same identifier, from a mirrored clustered VLU. An initiator can write data to either of $VLU1_1$ or $VLU1_2$ and have it mirrored to physical storage subsystems connected at separate storage switches.

It will be appreciated by those of ordinary skill in the art that the steps depicted in FIG. 14 do not need to be performed in the order necessarily depicted therein. For example, a first virtual logical unit could be provisioned at a first storage switch prior to provisioning any members or a second virtual logical unit at a second storage switch. Numerous alternative orders and modifications can be used in accordance with embodiments. In one embodiment, previously provisioned VLUs can be modified to include the same logical unit identifier to form a mirrored CVLU such that many of the steps of FIG. 14 can be omitted.

Figure 15:
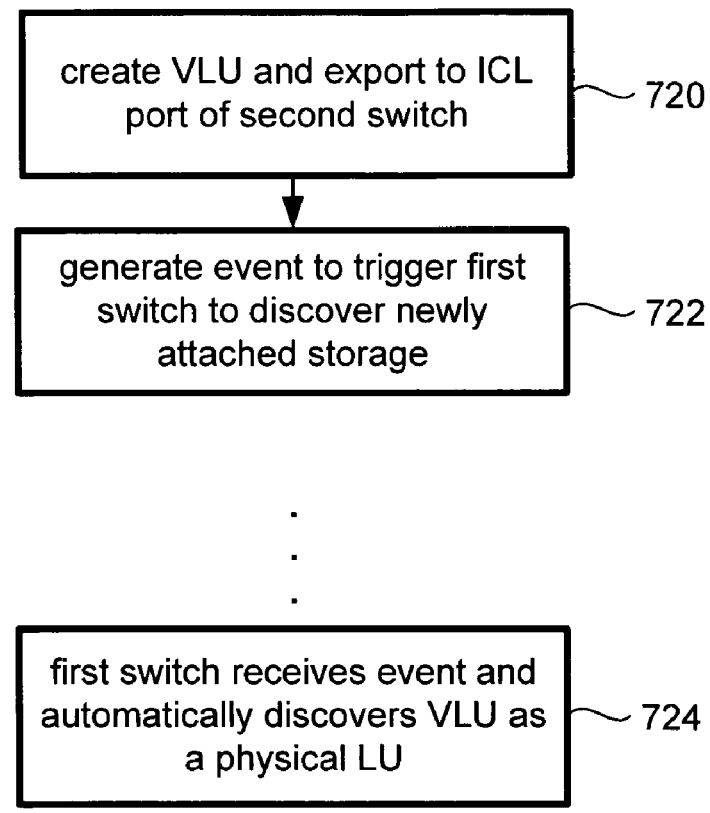
FIG. 15 is flowchart depicting a process for provisioning a member at a first switch for physical storage connected to a second switch.

FIG. 15 is a flowchart depicting a method for provisioning a member at a first switch for physical storage connected at a second switch. FIG. 15 could be used to provision the remote members at steps 704 and 708 of FIG. 14. At step 720, a virtual logical unit is created from the physical storage and exported or provisioned to the port of the ICL connection at the second switch. The VLU represents the physical storage for which the member is being created and step 720 can include exporting the VLU to memory accessible at the ICL port. An event message is generated and passed across the ICL connection to the first switch at step 722. The event message (e.g., an RSCN message in the fibre channel protocol) can alert the first switch that new physical storage is connected to the first switch at its ICL connection. The VLU provisioned at the ICL of the second switch will appear exactly as physical storage attached to a port of the first switch. Thus, the first switch discovers the VLU as a physical LU at step 724. The first switch can now create a member from the VLU just as it would from physical storage actually connected at the switch.

Figure 16:
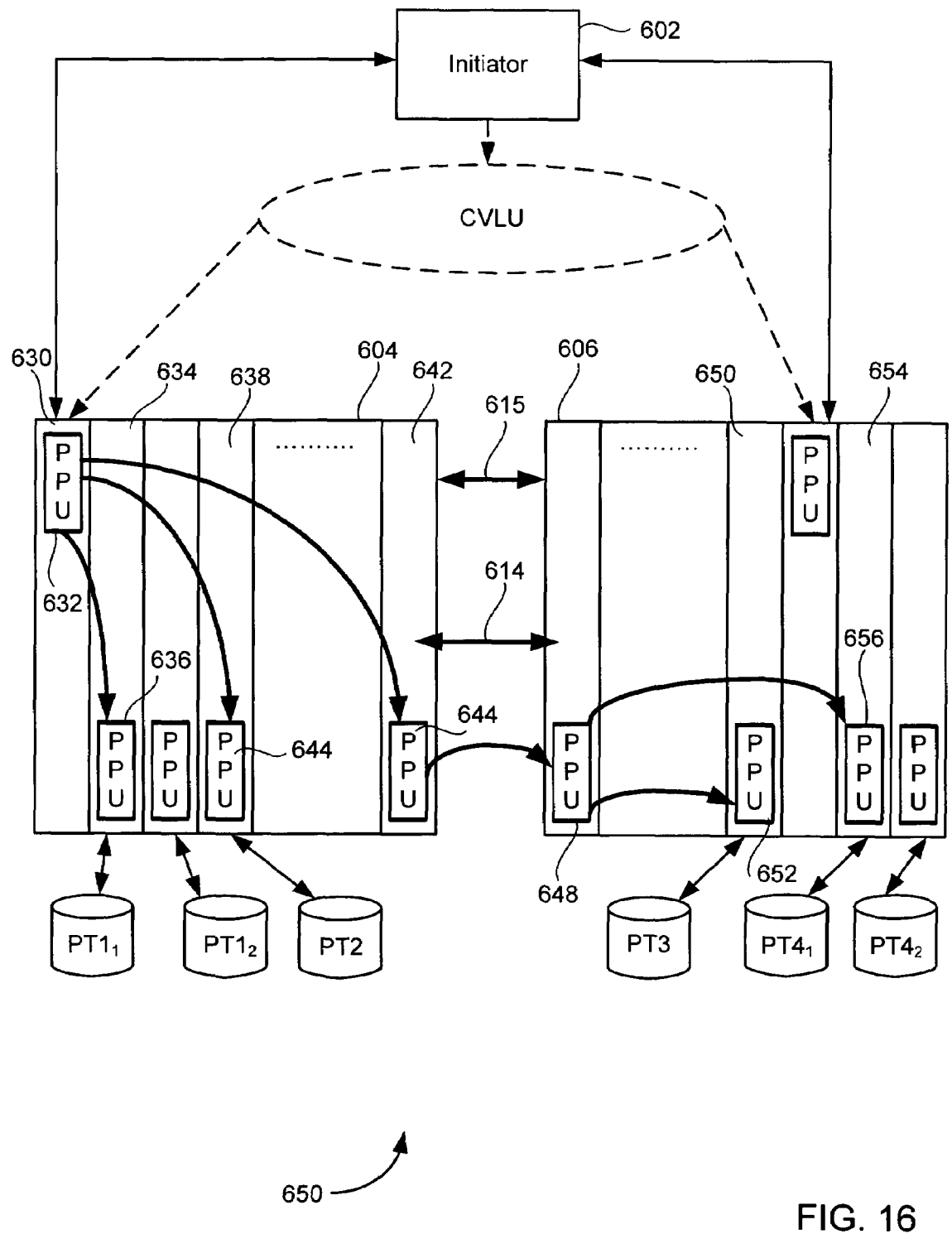
FIG. 16 is a block diagram depicting a write data flow in the storage area network of FIG. 13 in accordance with one embodiment.
Figure 17:
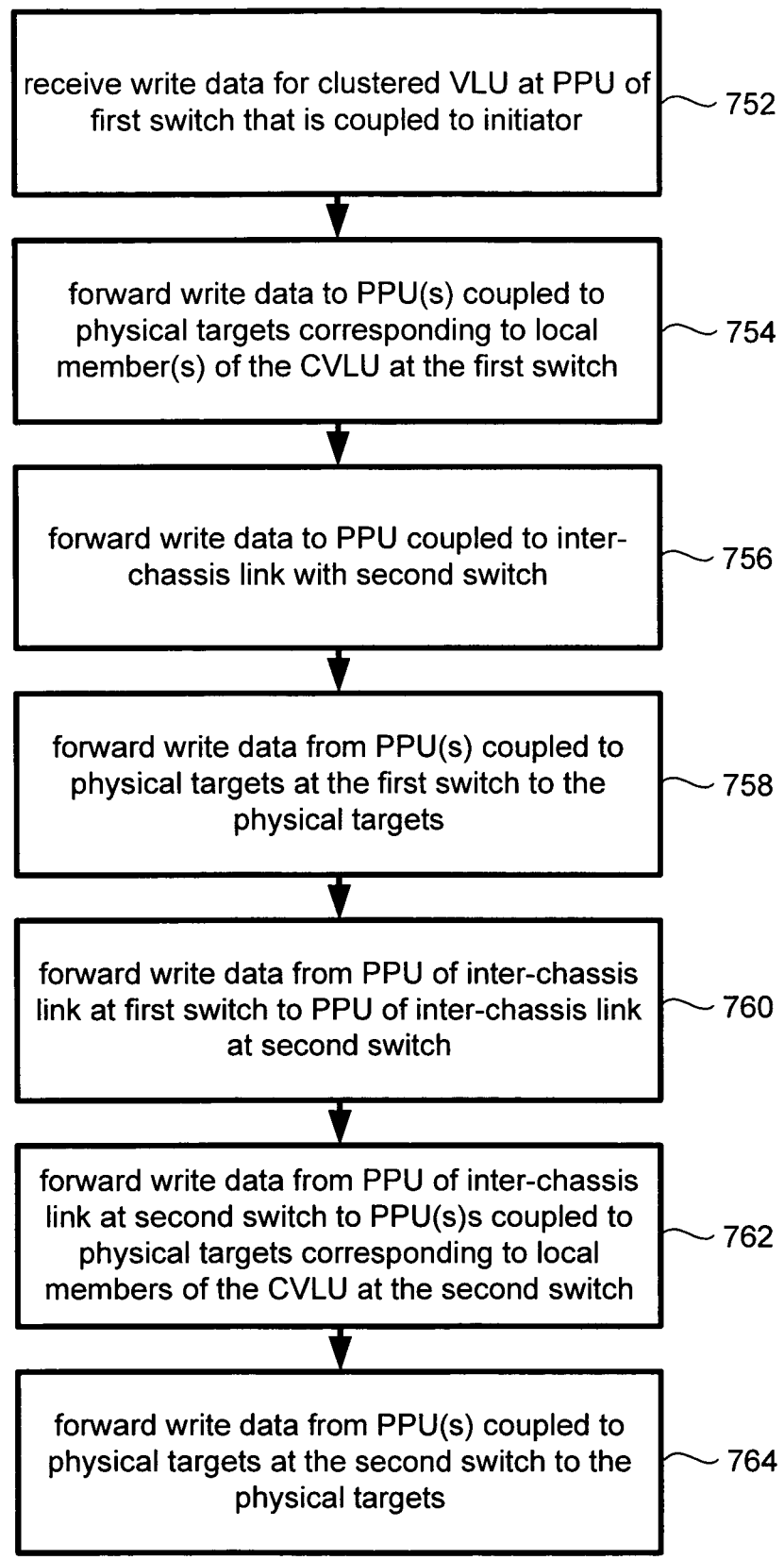
FIG. 17 is a flowchart depicting a write operation in a storage area network in accordance with one embodiment.

FIG. 16 is a block diagram depicting storage area network 650 in accordance with one embodiment. In FIG. 16, the line cards and packet processing units associated therewith are depicted to illustrate the data flow for a write operation to the mirrored CVLU. FIG. 17 is a flowchart depicting a method for writing data to a mirrored virtual logical unit across storage switches such as that depicted in FIG. 16. FIGS. 16 and 17 will be described concurrently, the method depicted in FIG. 17 being described with relation to the block diagram depicted in FIG. 16 for exemplary purposes. It will be appreciated that FIGS. 16 and 17 depict the data flow resulting from a processed write request. FIGS. 16 and 17 do not depict control messages between the switches (see FIGS. 20-22), the command flow for the write request, transfer ready resolution, or responses that would precede the actual transfer of data. More information regarding read and write request processing can be found in co-pending U.S. patent application Ser. No. 10/833,438.

At step 752, write data for a mirrored clustered VLU is received at a first storage switch. As depicted in FIG. 16, the write data is received from initiator 602 at storage switch 604. More specifically the write data is received at a line card 630 of storage switch 604. Line card 630 includes a packet processing unit 632. The packet processing unit can determine the corresponding members of the virtual logical unit to which the right data is destined (such as by accessing the VTD and Flow ID for $VLU1_1$) and forward the write data to the line cards and packet processing units coupled to the physical targets corresponding to the local members of the clustered virtual logical unit at switch 604. Local members as used herein refers to the members provisioned at a switch that correspond to physical targets physically connected to that switch. As depicted in FIG. 16 for step 754, PPU 632 forwards the write data to the packet processing units and line cards connected to the respective physical targets. In FIG. 16, the data at step 754 is forwarded to PPU 636 at line card 634 and PPU 640 at line card 638. At step 756, the ICL location is determined from a Flow ID for members $M3_1$ and $M4_1$ and the write data is forwarded to the packet processing unit and line card connected to the second storage switch across an inter chassis link. In FIG. 16, PPU 632 forwards the write data to PPU 644 at line card 642.

At step 758, the write data is forwarded from the PPUs of the line cards connected to the physical targets to the respective physical targets. For example, step 708 includes forwarding write data from PPU 636 to physical target $PT1_1$ and from PPU 640 to physical target PT2. At step 760, the write data is forwarded across the inter chassis link to the second storage switch. In FIG. 16, step 760 includes forwarding the write data from PPU 644, across inter chassis link 614, to PPU 648 at line card 646.

At step 762, the write data from the PPU at the inter chassis link of the second switch will forward the write data to the PPUs coupled to the physical targets corresponding to the local members of the virtual logical unit at the second switch. In FIG. 16, PPU 648 will forward the write data to PPU 652 and PPU 656. At step 764, the PPUs forward the data to the actual physical targets connected to the second storage switch. Thus, PPU 652 forwards the data to physical target PT3 and PPU 656 forwards the data to physical target $PT4_2$. Accordingly, by virtue of providing a mirrored clustered virtual logical unit which corresponds to virtual logical units provisioned at more than one storage switch, data is successfully routed to physical targets connected to more than one storage switch to provide high availability of the data stored thereon. The data can be routed in a cut through fashion at wire-speed without buffering of data within the switch. The data path to each physical target can be provisioned prior to issuing a transfer ready response to an initiating device. Because a local header containing all routing information can be added to incoming packets, the data is routed through the switch without buffering for intermediate processing.

Figure 18:
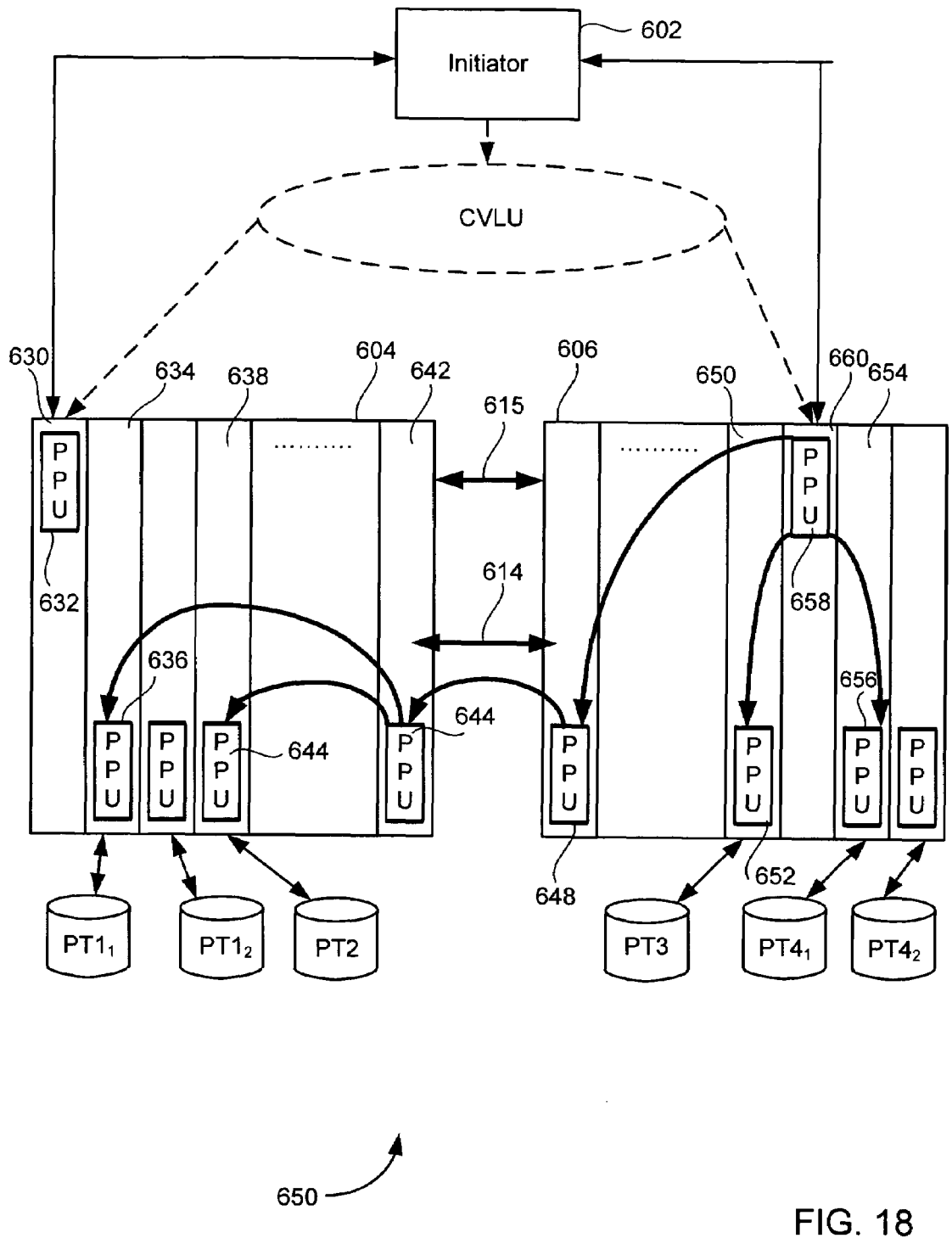
FIG. 18 is a block diagram depicting a write data flow for the storage network of FIG. 16 in accordance with one embodiment.

FIG. 18 is the block diagram of FIG. 16 depicting the data flow for a command received at switch 606 rather than switch 604. The write data for the mirrored clustered VLU is received at PPU 658 of linecard 660 at switch 606. PPU 658 can determine the corresponding members of the virtual logical unit to which the right data is destined (such as by accessing the VTD for $VLU1_2$). The Flow ID for each destination PPU connected to a local physical target can be determined from a Flow ID table provisioned at PPU 658 and the write data multicast to each of these line cards. The data can also be multicast to the line card of the ICL connection to switch 604, as determined from the Flow ID table. Accordingly, that data is multicast to PPU 656, PPU 652, and PPU 648. The write data is forwarded from the local PPUs to the local targets and from PPU 648 to PPU 644 at switch 604. PPU 644 accesses a VTD for $VLU1_1$ to determine the destination for the data. After accessing a Flow ID for each destination and updating header information, commands are forwarded to PPU 644, and PPU 636.

Figure 19:
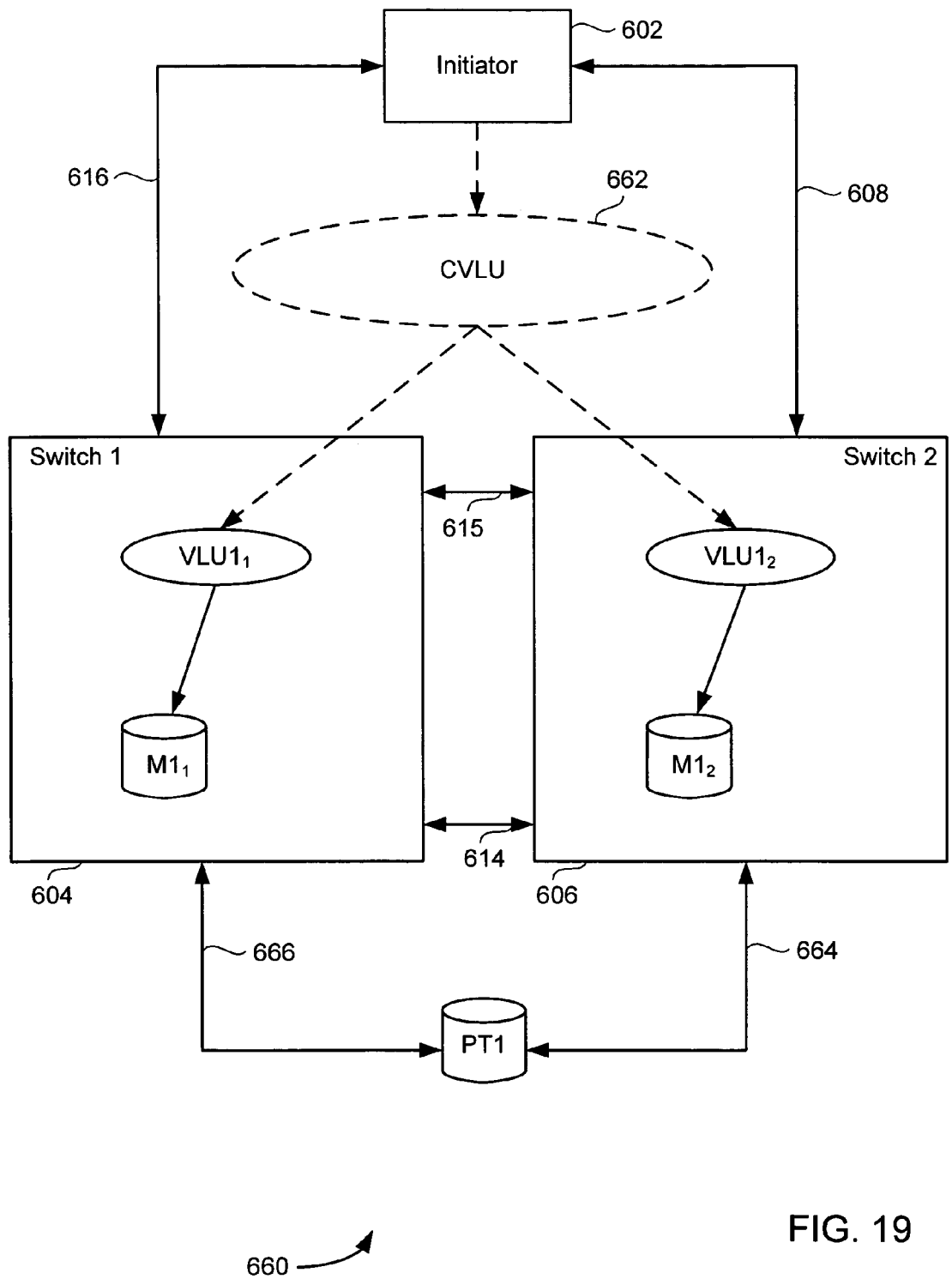
FIG. 19 is a block diagram of a storage area network in accordance with one embodiment.

FIG. 19 is a block diagram of a storage area network in accordance with another embodiment for providing high availability of physical targets and data using multi-chassis, multi-pathing storage solutions. Storage area network 660 includes initiator 602, storage switch 604, storage switch 606 and physical target PT1. Physical target PT1 has a physical connection to both of switches 604 and 606. Many storage subsystems include multiple port capabilities to enable connections to multiple host devices or multiple connections to a single host device. This functionality is taken advantage of as depicted in FIG. 19 to provide a physical connection between the physical target and both of the storage switches.

$VLU1_1$ at storage switch 604 has been provisioned to include member $M1_1$, representing the virtualization of physical target PT1 at switch 604. Likewise $VLU1_2$ has been provisioned at switch 606 to include member $M1_2$, representing the virtualization of physical target PT1 at storage switch 606. As previously described, a clustered virtual logical unit 662 is created by assigning the same identification to both of $VLU1_1$ and $VLU1_2$. Accordingly, initiator 602 has multiple paths, 616 and 608, to CVLU 662 via $VLU1_1$ at switch 604 and $VLU1_2$ at switch 606. Although each of the paths are physically connected to different storage switches, and distinct virtual logical units are provisioned at each of the storage switches, each distinct virtual logical unit appears as a single clustered VLU virtual logical unit to initiator 602 by virtue of the identical identifications assigned to each of the virtual logical units. As previously described, initiator 602 can access PT1 via $VLU1_1$ at switch 604 and via $VLU1_2$ at switch 606.

In the configuration depicted in FIG. 19, high availability of physical target PT1 is provided by virtue of the clustered virtual logical unit and the multiple connections between the physical target and storage switches. For example, should connection 608 become unavailable, initiator 602 can access CVLU 662 (and the underlying physical target) via $VLU1_1$ at switch 604. Likewise, should path 616 become unavailable, initiator 602 can access CVLU 622 (and physical target PT1) via path 608 and $VLU1_1$ at storage switch 606.

Furthermore, because multiple paths are provided between the physical target and the storage switches, the loss of a storage switch will not affect the availability of the physical target to initiator 602. For example, if path 664 or storage switch 606 becomes unavailable, initiator 606 will have access to physical target PT1 and CVLU 662 via switch 604 and $VLU1_1$. Likewise, if path 666 or switch 604 becomes unavailable, initiator 602 will have access to physical target PT1 and CVLU 662 via switch 606 and $VLU1_2$.

Additionally, each VLU can be provisioned to provide best path availability to physical target PT1. For example, $VLU1_1$ can be provisioned to access physical target PT1 via path 666, provided directly from switch 604 to the physical target, if such path is available. However, to provide for an alternate path should path 666 become unavailable, $VLU1_1$ can be provisioned to include an alternate path across inter chassis link 614. Thus, should $VLU1_1$ receive a write or read command from initiator 602 on path 616, $VLU1_1$ can route the appropriate command data to member $M1_1$, across inter chassis link 614 to switch 606, where the data or command will be routed to PT1 via path 664. As apparent in the figure, multiple such paths are provided and can be taken advantage of to provide high availability of the physical target.

It will be apparent to those of ordinary skill in the art that the present disclosure is not limited to the numbers and exact configurations of the networks, physical targets, switches, and initiators depicted herein. For example, a virtual logical unit can be provisioned to include any number of members and each member can be provisioned to include any number of physical targets or portions thereof.

As mentioned previously, embodiments can include accessing physical targets over multiple switches including intervening switches. For example, a first switch can be connected to a second switch over an ICL, and the second switch can be connected to a third switch over an additional ICL. A VLU can be provisioned at the first storage switch to include a member corresponding to a physical target connected to the third storage switch. The VLU (via an associated VTD and Flow ID) at the first storage switch can reference the line card and port of the ICL at the first switch to provide a cut-through implementation for accessing the third switch and ultimately the physical target. The second switch, through a VTD and Flow ID provisioned at the second switch for the corresponding VLU, will add header information to packets to route the packets to the ICL connection at the second switch with the third switch. The packets received at the third switch have header information added as determined from the VTD and Flow ID for the VLU provisioned at that switch to route the packets to the line cards and ports connected to the actual physical targets.

Multiple ICLs can be provided amongst storage switches to provide even higher availability of data and physical targets. For example, a first member corresponding to a first physical target connected to a second storage switch can be provisioned at a first storage switch. The first member can be provisioned for access to the first physical target via the second storage switch across a first ICL. The member can further be provisioned to access the same first physical target across a second ICL to the second switch. A VTD for the virtual logical unit to which the member is provisioned can include a second Flow ID specifying routing information for the second ICL. If the first connection is unavailable, the internal virtual logical unit can route commands and data across the second ICL to the second storage switch. In one embodiment, a single Flow ID is used and code is provisioned to re-provision the Flow ID for the second connection if the first connection becomes unavailable. Multiple ICLs can be provisioned for redundancy to provide available paths should one or more other links become unavailable. Failover and failback mechanisms can be provided to increase availability of the underlying data and storage subsystems. A multiple inter-chassis link configuration can be used for load-sharing. Data can be routed across each link in a manner to distribute the load of each link to increase overall performance. Data can be routed more quickly by selectively routing data across one of the links.

A transaction-based messaging subsystem can be implemented on and between storage switches having related virtual logical units to maintain consistency between operations and manage incoming requests for a clustered virtual logical unit. For example, a storage services manager or module (SSM) can be implemented on each switch to relay information to remote switches regarding clustered virtual logical units. For example, requests for $VLU1_1$ or $VLU1_2$ in FIG. 12 in a CVLU configuration can be received and managed by the SSM in a transaction based messaging system. In one embodiment, a CVLU database is maintained within non-volatile memory at each switch. When a request is received for a VLU listed in the database, it can be determined that the request relates to a CVLU. Accordingly, the SSM can control processing of commands for and relay information to any remote switches associated with the CVLU to properly manage the interaction of each individual VLU. The messaging system can provide messages over ICL links(s) 614 in one embodiment or over an IP connection 615 in other embodiments. In one embodiment, the system can use an IP connection by default and use ICL link(s) 614 if the IP connection is unavailable.

In one embodiment, for example, when a write request is received for a CVLU, the switch receiving the request can provide a message to any remote switches that a request is being processed for the CVLU. The remote switches can then take appropriate action to ensure conflicting requests are not being processed at individual switches for the CVLU. For example, in one embodiment each remote switch will queue any incoming requests they receive for the CVLU after receiving a message that a request is being processed for the CVLU at another switch. The remote switches will continue to queue incoming requests until they receive a subsequent message that the request being processed has been completed. Upon receiving the subsequent message, the queued requests can be dequeued and processed in the order they were received. In one embodiment, each remote switch forwards incoming requests it receives to the switch providing the message that it is processing a request for the CVLU. The switch receiving the first command thus becomes the primary switch and it will queue all of the incoming requests at all switches while it processes the outstanding request. Upon completion, the primary switch will then dequeue the requests and process them.

Figure 20:
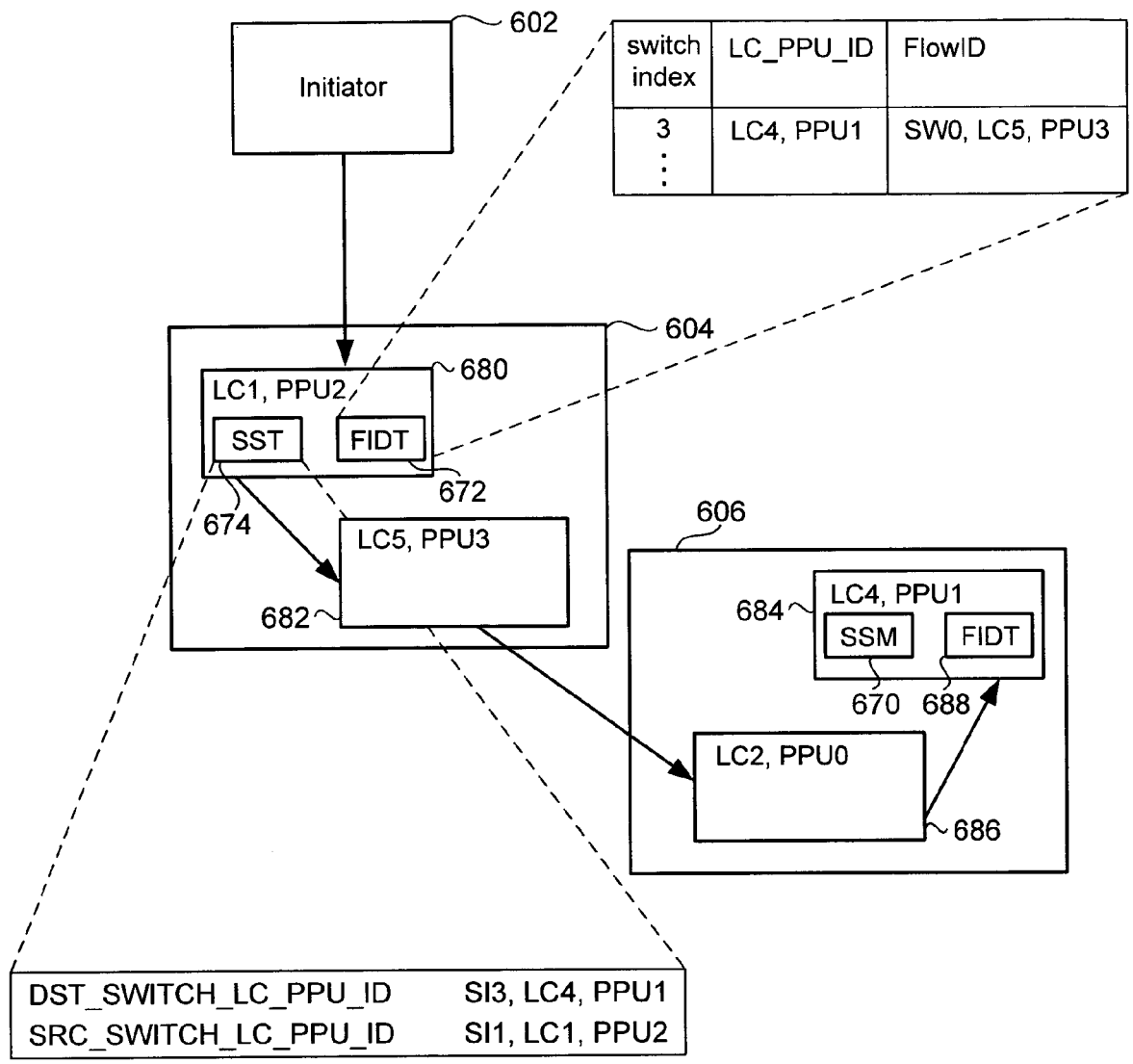
FIG. 20 is a block diagram of a storage area network depicting a message passing architecture.

FIG. 20 depicts a transaction based messaging subsystem that can be used to manage clustered virtual logical units provisioned across storage switches (the subsystem can also and at the same time manage non-clustered provisioned targets local to a single switch). Storage switches 604 and 606 are interconnected over one or more ICL links 614 and 615. A storage services module or instance (SSM) 670 is running on storage switch 606 at PPU1 684 on linecard 4 (LC4). Storage services module 670 can be a storage service instance provisioned for a specific virtual target. For example, the virtual target could be a clustered virtual logical unit having individual virtual logical units provisioned at each of switches 604 and 606, such as CVLU 620 of FIG. 13. There is no corresponding SSM at switch 604. Thus, the single storage service instance 670 controls storage services at both storage switches for the CVLU. A message passing architecture is implemented across both switches to facilitate such control involving a single storage services instance. Although the present example depicts two storage switches and a message passing architecture for the two switches, it will be appreciated that the present disclosure is not so limited and the disclosed principles and techniques can be applied to configurations including any number of switches.

In FIG. 20, control messages associated with commands received at storage switch 604 are forwarded to SSM 670 at storage switch 606. Initiator 602 can issue commands at LC1, PPU2 680 of switch 604 for $VLU1_1$. In response, control messages can be forwarded to SSM 670 such that SSM 670 controls access to and processing of I/O commands for CVLU 620. Accordingly, control commands are passed from LC1, PPU2 680 to LC5, PPU3 682, across an ICL link to LC2, PPU0 686 at switch 606, and onto SSM 670 at LC4, PPU1 684. For commands received at a linecard and PPU of storage switch 606, control messages can be passed to SSM 670 at PPU 684 using locally provisioned Flow IDs as previously and hereinafter described.

In order to facilitate the message passing architecture, a Flow ID table for PPU 680 is provisioned to include entries for every PPU in the multi-switch configuration. Each PPU of a switch has a unique Flow ID table that includes information for accessing every other PPU in the switch. In a simple single switch configuration, an index (e.g., a 6-bit LC_PPU_ID field) in a Flow ID table uniquely identifies each PPU at that switch by its number and the number of the linecard on which it is located. This technique is extended in a multi-switch configuration to identify every PPU at every interconnected switch. In FIG. 20, for example, Flow ID table (FITD) 672 for PPU 680 will include entries for each PPU at switches 604 and 606. In order to properly reference each PPU, a unique index used to identify each PPU includes a switch or chassis index in addition to an index identifying the PPU and linecard number. This switch index (SW index) can uniquely identify the switch on which the indexed PPU is physically located. Thus, the resulting index for each PPU will comprise a SWITCH index+LC_PPU_ID index.

The switch index and Flow ID table can be provisioned relative to the local switch such that a common index (e.g., 0) is always used to identify the local switch or switch of the PPU for which the Flow ID applies. For example, the Flow ID table provisioned for PPU 680 at switch 604 will identify each PPU at storage switch 604 with the same switch index, assumed to be 0 for the remainder of this example. For the Flow ID table provisioned at switch 604, the PPUs at switch 606 will be identified by some other identifier. Likewise, a Flow ID table provisioned at switch 606 will identify each PPU of switch 606 with a switch index of 0 to designate that they are at the local switch and each PPU of the other switches by some other identifier. In FIG. 20, it will be assumed that the index for switch 606 that is maintained at switch 604 is 3 and the index for switch 604 that is maintained at switch 606 is 1.

The Flow ID in the table for each PPU (local) having a switch index of 0 is provisioned as previously described for typical single switch routing functions. Accordingly, when a reference to the Flow ID table is made and the switch index for the destination PPU is 0, typical local routing using the Flow ID as previously described will be performed. For example, a command may be directly routed from an ingress PPU to the egress PPUs connected to the physical targets associated with the command.

The Flow ID in the table for each PPU of another switch, however, is provisioned to point to the PPU at the local switch that forms an ICL connection to the second switch. For example, an entry in Flow ID table 672 for PPU 684 at switch 606 will point to PPU 682 of switch 604 that forms the ICL connection to switch 606. An ICL port ID can also be provisioned and made accessible to the ICL PPU to identify the actual port number forming the ICL connection in embodiments where multiple ports are controlled by a single PPU.

If more than one ICL connection is provided, a Flow ID can reference the PPU of one connection by default. If failure of the ICL connection occurs, the Flow ID table can be re-provisioned to reflect the PPU for the redundant ICL connection. Multiple Flow IDs can be provisioned for a single destination PPU to reflect the different ICL connections that can be used to access the PPU. For example, a default Flow ID can be used and when the bandwidth exceeds a threshold value, new messages can be sent across another ICL connection by selecting the Flow ID for the other connection.

A storage service module such as SSM 670 can provision storage service tables (SST) for the virtual target to which the storage service module is associated. Storage services table 674 can include a first destination entry or field DST_SWITCH_LC_PPU_ID that identifies or points to PPU 684 on which SSM 670 is running at storage switch 606. The switch index for the entry identifies the switch at which the SSM is running by the index for that switch maintained at the current switch. Thus, continuing with our example, storage services table 674 at switch 604 will contain a DST_SWITCH_LC_PPU_ID field with a switch index of 3 and linecard and PPU index of LC4, PPU1. A second (source) entry (e.g., SRC_CHASSIS_LC_PPU_ID) can identify or point to the linecard and PPU for which the storage services table is provisioned. This source entry essentially points to itself. The switch index for the source entry will identify the switch index of the switch where the table is provisioned as maintained on the switch at which the SSM is running. Thus, in our example, SST 674 will contain a SRC_SWITCH_LC_PPU_ID field with a switch index of 1 and linecard and PPU index of LC1, PPU2.

Figure 21:
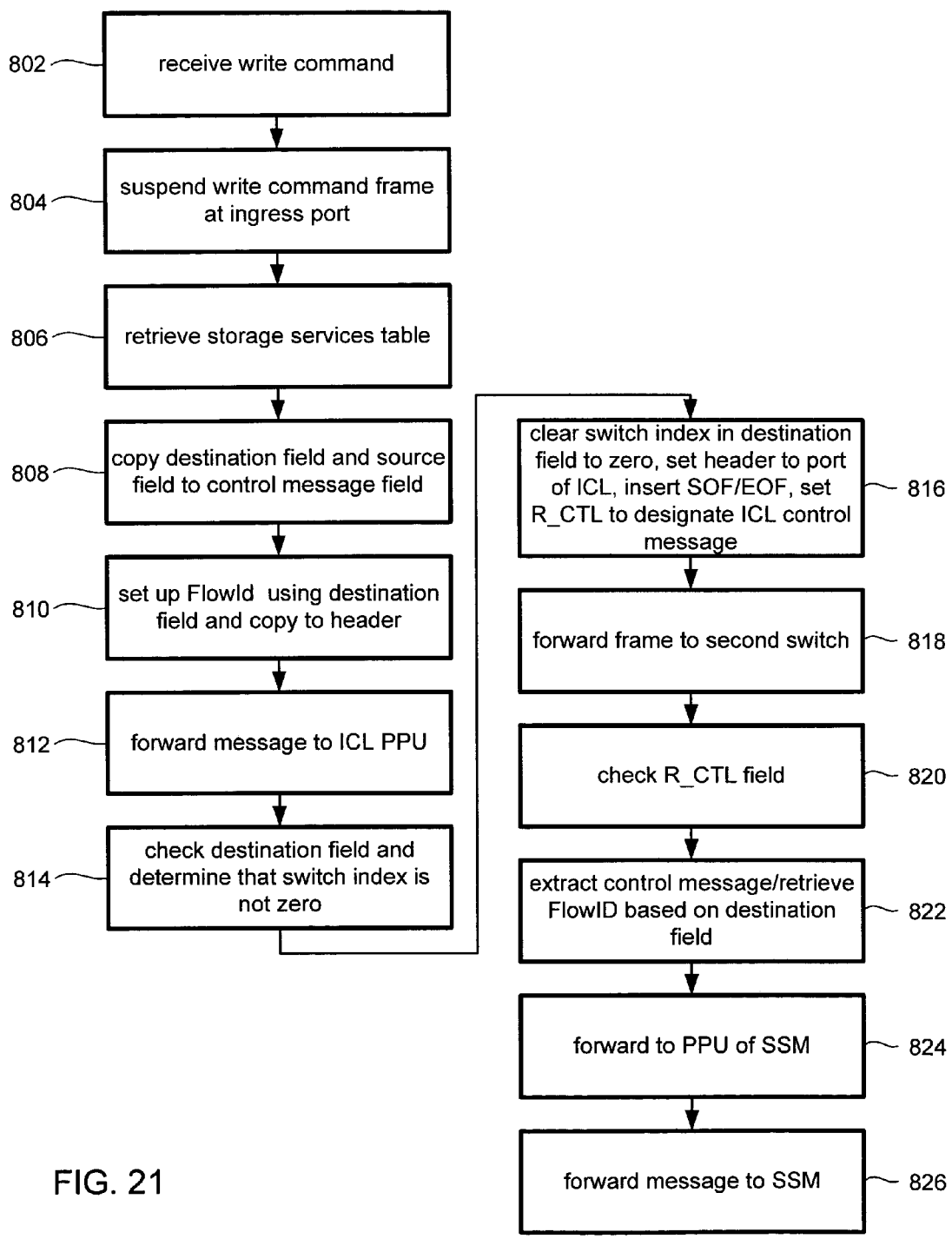
FIG. 21 is a flowchart depicting an exemplary control command flow for a message passing architecture.

FIG. 21 is a flowchart for passing an exemplary control message across switches in accordance with one embodiment. A write command is received from initiator 602 at step 802, and suspended at step 804, such as by buffering in a first in/first out (FIFO) buffer at LC1. PPU2 at LC1 retrieves storage services table 674 at step 806. The table includes field DST_SWITCH_LC_PPU_ID set to switch index 3, LC4, PPU1 (switch 606, linecard 4, PPU 1) and field SRC_SWITCH_LC_PPU_ID set to switch index 1, LC 1, PPU2 (switch 604, linecard 1, PPU 2). The values for each field are copied into the message at step 808. The Flow ID for the command is set up at step 810 based on the destination field. PPU2 accesses Flow ID table 672 and determines that the Flow ID for switch index 3, LC4, PPU1 points to switch index 0, LC5, PPU3 and the ICL port ID is fibre channel port A. PPU2 sets up a VIX header with the Flow ID information, adds it to the message and passes the message to LC5, PPU3 at step 812.

LC5, PPU3 receives the message, checks the destination field and determines that the switch index is 3 (not zero) at step 814. From the switch index, PPU3 determines that the message is to be forwarded out an ICL port. PPU3 clears the destination field to zero (so that when it arrives at switch 606 it will be designated for local processing and not message passing), sets the local header to identify port A as the destination port, inserts start of header and end of header indications, sets the R_CTL field of the header to indicate ICL control message processing, and puts the control message into the frame payload. The frame is forwarded from PPU 682 to PPU 686 (LC2, PPU0) at step 818. PPU 686 checks the R_CTL field and determines that the message is for ICL control message processing at step 820. PPU 686 extracts the control message and based on the destination field (DST_SWITCH_LC_PPU_ID), retrieves the Flow ID for switch 0, LC4, PPU1 (switch 0 because the Flow ID table is local for switch 606) at step 822. The Flow ID is added to a header for the control message and the message forwarded to PPU 684 at step 824. The message is received at PPU 686 at step 826 and forwarded to SSM 670.

Figure 22:
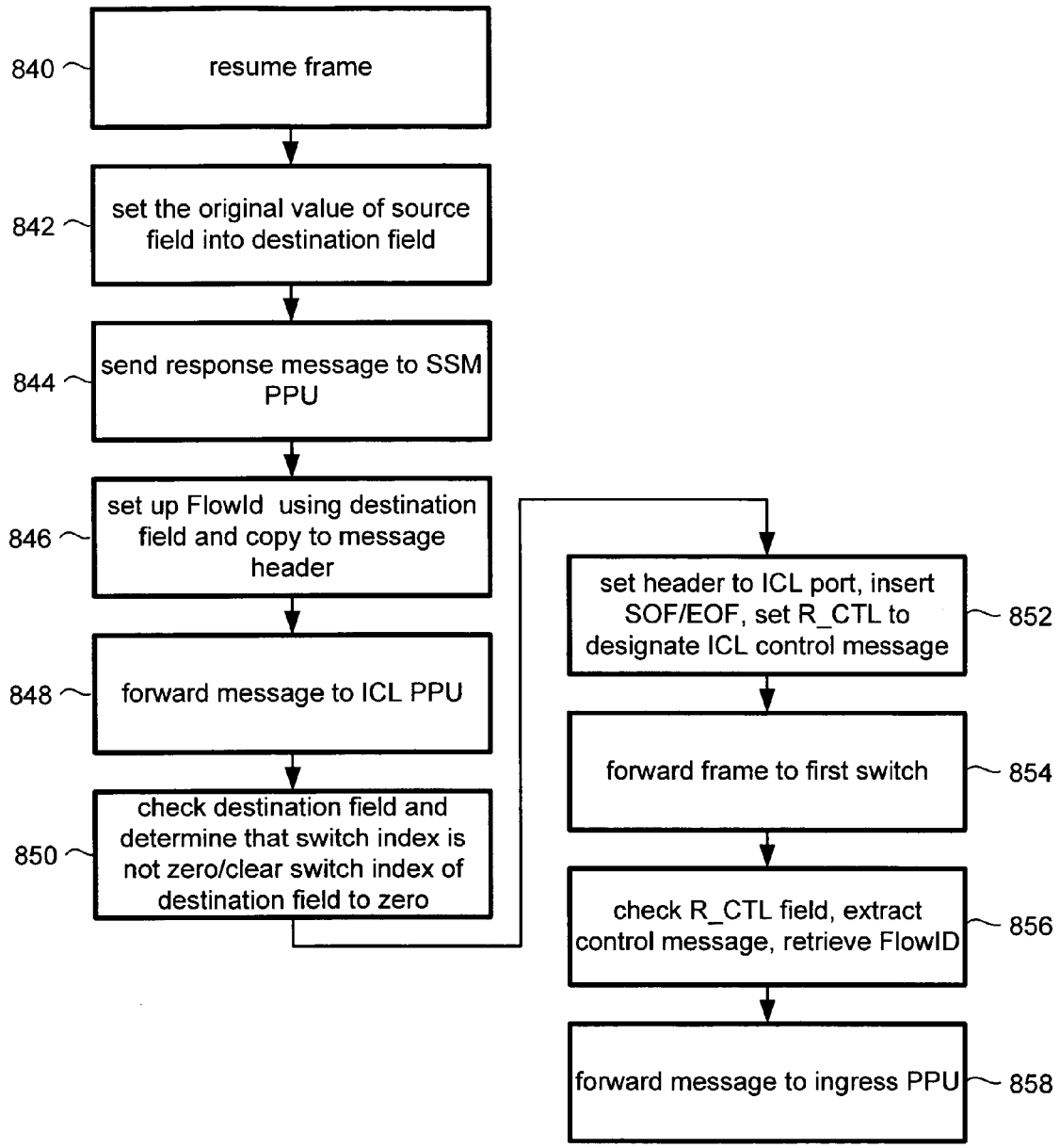
FIG. 22 is a flowchart depicting an exemplary control command flow for a message passing architecture.

After processing the control message, SSM 670 passes a control message back to the source PPU. FIG. 22 is a flowchart for passing a response control message (resume message) back to a source PPU such as PPU 680 depicted in FIG. 20. An SSM can pass a resume message back to the PPU at which the write command is queued so that the write command can be processed.

SSM 670 resumes the frame (e.g., dequeues it from a buffer) at step 840. A control message is created and a destination field in the message set to the original source field (switch index 1, LC1, PPU2—switch index 1 is used to designate switch 604 at switch 606) at step 842. The control message is sent to PPU 684 at step 844. PPU 684 uses the destination field to retrieve the Flow ID for PPU 680 (switch index 1, LC1, PPU2) from Flow ID table 688. The Flow ID points to PPU 686 (switch index 0, LC2, PPU0). The Flow ID for the message is set up and inserted into a header for the message at step 846. PPU 684 forwards the message to PPU 686 at step 848. PPU 686 determines that the switch index is not zero and clears the destination field to zero (switch index 0, LC1, PPU2) in response at step 850. PPU 686 sets the local header to identify the ICL port, inserts start of header and end of header indications, sets the R_CTL field of the header to indicate ICL control message processing, and puts the control message into the frame payload at step 852.

The frame is forwarded to PPU 682 at step 854. PPU 682 checks the R_CTL field which is set to zero, extracts the control message, and retrieves the Flow ID for PPU 680 based on the destination field (switch index 0, LC1, PPU2) at step 856. The message is then forwarded to PPU 680 at step 858. After receiving the control message, PPU 680 can resume the write command received from initiator 602. If the command is for CVLU 620, the write command will be dequeued and processed by multicasting the write command to each of the PPUs connected to a physical target associated with the CVLU. After transfer ready management is performed, the data received from initiator 602 is multicast to the physical targets as depicted in FIG. 16.

State Maintenance Rules Engine

Figure 23:
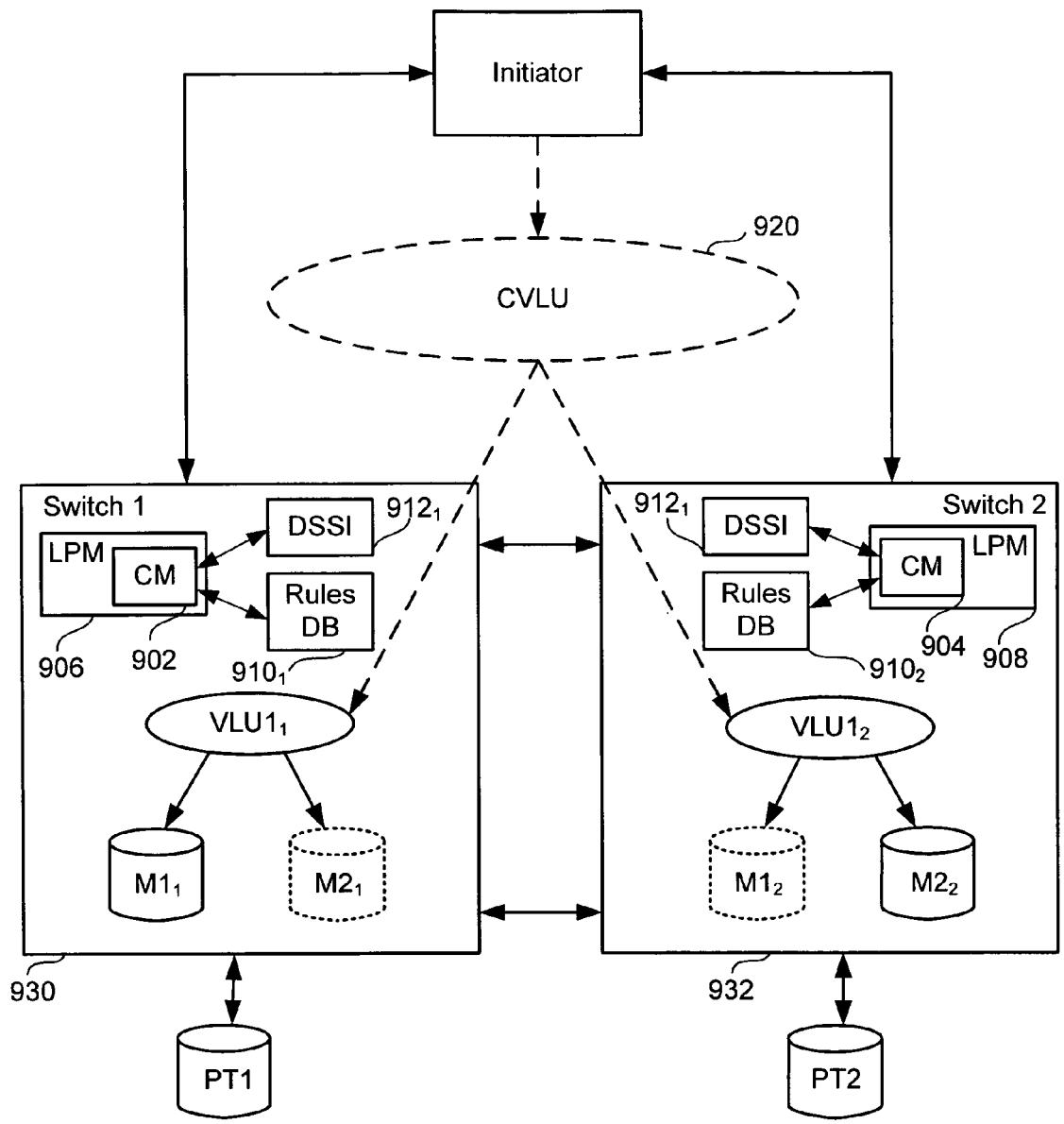
FIG. 23 is a block diagram depicting a storage area network including a rules engine in accordance with one embodiment.

A cluster manager (CM) is provided in one embodiment to control and manage clustered virtual logical units provisioned across storage switches. FIG. 23 depicts a storage area network in accordance with one embodiment. A clustered virtual logical unit 920 has been provisioned at storage switches 930 and 932. CVLU 920 represents the clustered virtualization of VLU $1_1$ and VLU $1_2$ across storage switches 932 and 930. CVLU 920 includes two members M1 and M2 representing the virtualization of physical targets PT1 and PT2. Members M1 and M2 are mirrored (store the same data) such that CVLU 920 is a mirrored clustered VLU. Target PT1 is connected at switch 930 and is virtualized as member M1 including a local portion $M1_1$ at switch 930 and a remote counterpart at switch 932. Target PT2 is connected at switch 932 and is virtualized as member M2, having a local portion $M2_2$ at switch 932 and a remote counterpart $M2_1$ at switch 930.

A first cluster manager instance 902 is provided at switch 930 and a second cluster manager instance 904 is provided at switch 932. Collectively, these instances provide management capability for CVLU 920, representing the clustered virtualization of $VLU1_1$ and $VLU1_2$ across switches 930 and 932. Cluster manager instances 902 and 904 are associated with local provisioning modules 906 at switch 930 and 908 at switch 932. A local provisioning module can manage and provide provisioning services such as maintaining member state and status information, determining VLU availability, maintaining and updating VLU information such as target location, size, etc. for a non-clustered VLU.

These management and provisioning services can become very complex operations for clustered VLUs provisioned across storage switches. Accordingly a cluster manager is provided and associated with a local provisioning module to provide specific management capabilities for a clustered virtual logical unit. For example, the cluster manager can maintain and manage member state and status for the clustered virtual logical unit 920. Using such information, the cluster manager can also maintain and manage the status of the clustered virtual logical unit. This management can include the orchestration of state transitions and operations related to the clustered virtual logical unit. The cluster manager can be provided at one or more system control cards of a storage switch.

A member's status (online/offline) is based on the status of the physical logical unit(s) associated with that member. For example, the status of member M1 (comprised of local member $M1_1$ and remote member $M1_2$) is based on the status of physical target PT 1 (which can be a physical device/subsystem or one or more VLUs of a storage device or subsystem). To achieve data consistency and availability, the cluster manager also maintains various internal state information for each member of a clustered VLU. Internal state information can include whether the member is synchronized (S), needs synchronization (N), or whether the member is in the process of synchronizing (IZ). Each member of a clustered virtual logical unit is likely to transition through these various states during its lifetime. The state of a member is used to determine what operation or operations to perform such that the data is always consistent and to the best extent available for initiator input/output commands. In order to maintain consistency and availability of data, the cluster manager and local provisioning module may initiate operations in response to state and status transitions such as bringing the clustered virtual logical unit offline in the distributed configuration, starting or aborting a logical unit copy operation, etc.

The availability of a clustered virtual logical unit such as CVLU 920 is a collective function of the various member states and status across two or more storage switches. For a clustered virtual logical unit in a dual switch configuration, the member is viewed as a local member and its remote counterpart (for example, member M1 comprised of local member $M1_1$ and remote member $M1_2$). As will be apparent to one of ordinarily skilled in the art, determining, maintaining state and status information, and performing appropriate action on a clustered virtual logical unit to provide consistency and data availability is a very complex operation, especially when members transition states and/or status.

Consider an example where a link connecting a physical target to a storage switch is unplugged such as for example, unplugging physical target PT1 from storage switch 930. Local Switch 930 will detect the transition of target PT1 to an offline status. An event will be generated at the port to which physical target PT1 is connected when the target is unplugged. Switch 930 receives this event and can determine that member $M1_1$ is now offline. In response to this member status transition, cluster manager instance 902 must make a determination of the actual state of the mirrored configuration and the corresponding status for the clustered virtual logical unit. In order to make such determinations, cluster manager instance 902 must correlate member events from the local and remote storage switch as well as determine the state and status of each member of the clustered virtual logical unit.

The resulting clustered virtual logical unit status resulting from member M1 going offline depends not only on the state and status that member M1 was previously in, but also the state and status of each remaining member of the clustered virtual logical unit, such as member M2. There are numerous permutations and combinations of member state and status and VLU status that can exist in clustered virtualizations. The effective CVLU status is based upon the availability of at least one synchronized member of the virtual logical unit. These various permutations and combinations of member state and status and VLU status can be summarized as a set of rules.

For example, for a clustered VLU including two mirrored members, M1 and M2, having local and remote counterparts, a few select rules would be:

1. If M1 goes from online to offline (resulting offline status), and M1 is currently in the synchronized state and M2 is currently online and in the synchronized state, then the resulting status of CVLU 920 is online. The resulting status of M1 is offline and the resulting state of M1 is needs synchronization. Due to M1 transitioning to an offline status, M1 is noted as needing synchronization due to changes in data in the CVLU that may occur via member M2 while M1 is offline. The status of M2 remains online and its state remains synchronized.

2. If M1 goes from offline to online, and M1 is currently in the needs synchronization state, and M2 is currently online and in the synchronized state, then the resulting status of CVLU 920 is online. The resulting status of M1 is online, and the resulting state of M1 is being synchronized. Because M1 has gone from offline to online, the cluster manager can initiate a logical unit copy on the primary chassis 930 to resynchronize member M1 with the remaining members (M2) of the CVLU. M2's status remains online and its state remains synchronized.

These are but a few of the numerous rules required to handle each permutation and combination of member state and status and CVLU status for such a two member configuration as depicted in FIG. 23. One possible scenario or implementation for resolving and providing for the management of such various permutations and combinations is to individually code each such permutation and combination. A number of rules representing each permutation and combination could be hard-coded and applied to a clustered virtual logical unit to ascertain its resulting status after each possible member transition. The current state and status of each relevant member could be determined after every event. A number of coded scenarios could be applied in conditional loops to determine resulting state and status information for the CVLU. Full management and data availability control could thus be provided.

Such a solution, however, is time-consuming and inflexible. It can be impractical in scenarios including clustered virtual logical units. Each possible scenario including each possible permutation and combination of member state and status must be hard coded to represent each scenario. If any of the parameters for a virtual logical unit (are changed e.g., adding or deleting a member), new code must be written to handle the new configuration. During operation of a VLU, this solution can be inefficient and degrade application performance.

In accordance with one embodiment, a rules engine is provided to derive the results of each possible permutation and combination of member and VLU state and status. When a member transitions state or status, the member event can be funneled through a rules engine to determine the resulting state and status of each member and the resulting status of the clustered virtual logical unit itself. The rules engine, in various embodiments, can comprise a collection of table schema, look-up processing, and statically defined rules data that accounts for each possible permutation and combination of member state and status to accurately maintain appropriate CVLU status.

The various rules representing various permutations and combinations of the current state and status of each member of a CVLU can be represented in various formats and in one embodiment, is represented by a table schema to provide efficient determinations of resulting member state and status and resulting CVLU status resulting from various member events. In one embodiment, a rules database including such schema is provided at a storage switch at which a clustered virtual logical unit is provisioned. The rules database can represent the various permutations and combinations of the current state and status of each CVLU member and provide the resulting state and status of each member and the CVLU given a member event. Upon detecting the transition of a member's status, the rules database can be accessed. An entry matching the current state and status of each member of the CVLU can be identified. From the matching entry, the resulting state and status of each member and that of the CVLU can be determined. A cluster manager can interface with the rules database to provide run time determinations of all members and CVLU status and state. By utilizing a rules database, the core functionality of clustered virtual logical unit state maintenance can be centralized and maintained in an extendable and flexible format. Such a solution can make maintenance of the rules easy as the rules are crisply formulated from various possible state and status combinations. Such a solution also makes it flexible for future modifications and enhancements as only new rules need to be entered into the centralized format to handle new permutations and combinations. Furthermore, updates to the rules can be done without hard coding changes by using simple XML field upgrade utilities if desired, for example. Furthermore, the clustered virtual logical unit state maintenance algorithm is made efficient and scalable irrespective of the number of rules. The resulting state of all members and the CVLU can be determined in an atomic and dynamic fashion.

Referring again to FIG. 23, a rules database $910_1$ is provisioned at switch 930. The rules database can be maintained in flash memory 211 at system control card 210 in one embodiment. Rules database $910_1$ is in communication with CM 902. Upon detection of a member event associated with CVLU 920 (e.g., unplugging physical target PT1), LPM 906 can call cluster manager instance 902 to determine the resulting state and status of CVLU 920 and its members.

In order to access the appropriate entry in rules database $910_1$, cluster manager instance 902 is in communication with a dynamic state and status indicator $912_1$. Dynamic state and status indicator $912_1$ maintains information regarding the current state and status of each member of CVLU 920. For example, DSSI $912_1$ can include an indication of the current state and status of member M1 as well as the state and status of member M2. This information can be dynamically populated and updated such that it always contains an up-to-date and accurate representation of the state and status of each member. A dynamic state and status indicator can be maintained in flash memory 211 at system control card 210 in one embodiment.

In one embodiment, DSSI $912_1$ is part of a database or table provisioned for a clustered or other virtual logical unit. This database or table can include information in addition to member state and status information. For example, DSSI $912_1$ may include information on the various member sizes, whether a member is read-only or read/write capable, which VLU and CVLU a member belongs to, etc. DSSI $912_1$ can further be used for validation, to keep track of various attributes for member VLUs, and for use in persisting data across reboots.

Corresponding dynamic state and status indicators and rules databases are maintained at each storage switch. For example, in the example of FIG. 23, the dynamic state and status indicators $912_1$ and $912_2$ are maintained at both switches 930 and 932. At switch 932, a dynamic state and status indicator $912_2$ is provisioned that will include the same up-to-date and dynamically populated information as maintained in DSSI $912_1$. Likewise, a second rules database is maintained at storage switch 932 that corresponds to rules database $910_1$. This rules database is denoted as $912_2$. Accordingly, for local events at switch 932, cluster manager instance 904 will access DSSI $912_2$ and rules database $910_2$ to determine any resulting state and status member information as well as the CVLU status information.

The rules database can be maintained in numerous formats according to well-known techniques in the art. By way of non-limiting example, the rules database may be a structured SQL database or an unstructured XML-based database defined by an appropriate schema. In other embodiments, the rules database may be simple table or other representation of resulting state and status information according to a set of current states and status and input events.

When an event is detected at a switch, such as from a physical target being unplugged, for example, a local provisioning module can determine that the event is associated with a member of a clustered VLU and call a cluster manager instance to make determinations as to the resulting state and status of each member of the CVLU and the resulting status of the CVLU. For example, cluster manager instance 902 can access DSSI $912_1$ to determine the current state and status of each member of CVLU 920. If PT1 is unplugged from switch 930, for example, CM 902 can access DSSI $912_1$ to determine the state and status of member M2. CM 902 can also determine the state information for member M1. CM 902 need not determine the status of member M1 because its status is known from the event that was generated by unplugging physical target PT1. Because PT1 was unplugged, it is known from the resulting event that member M1 is now offline.

After determining the various state and status information, cluster manager instance 902 can access rules database $910_1$ to determine the resulting state and status information for each member and the CVLU. Cluster manager instance 902 can use the current state and status of each member of the CVLU as determined from DSSI $912_1$ to find a matching entry in rules database $910_1$. For example, the current state and status of each member can be used to formulate a key. The key can be used to index into rules database $910_1$.

Each entry in the rules database can be indexed by the current state and status of each member of the CVLU. The key formulated from the current state and status information can be used to find a matching index within the rules database. Once a matching entry is found, the resulting state and status of each member and the resulting status of the CVLU can be determined from the rules database. CM 902 can use this information to determine any appropriate action to take in response to the event such as starting a logical unit copy or bringing CVLU 920 offline, etc.

In one embodiment, the rules database can include individual databases or tables for various event types. For example, the rules database may include a first database for member and CVLU state and status resulting from member transitions to an offline state from an online state. A second database can be provided for transitions from an offline state to an online state. Accordingly, two or more rules engines can be provided: an offline to online rules engine, an online to offline rules engine, etc. In other embodiments, a single database or table is provided that includes rules for both offline to online, online to offline transitions, etc.

FIG. 25 depicts an exemplary rules database 1002 for a two-member clustered virtual logical unit in accordance with one embodiment. FIG. 24 is a legend for the notations used to represent various state and stats designations in the rules databases set forth in FIGS. 25, 26, and 28a-29b. Rules database 1002 is in tabular format and represents each possible permutation and combination of the current state and status of each member of a two member CVLU. Rules database 1002 is an online to offline database. Thus, it includes the resulting state and status of each member of the CVLU and the resulting status of the CVLU after a member's status transitions from online to offline.

Rules database 1002 is indexed according to the current state of the event member (the member associated with a detected event) and the state and status of the remaining member of the CVLU. The event member state is in column 1004, the status of the second or remaining member is in column 1006, and the state of the second member is in column 1008. Together, columns 1004, 1006 and 1008 form an index or key index 1010 into the rules database 1002. It should be noted that the notation of FIG. 24 for the remaining members of the CVLU is denoted as member 2. Member 2 does not refer to a specific member but rather refers to the member that is not the event member. For example in the example presented with respect to FIG. 23 if an event is associated with member M2 then member M2 would be the event member and member M1 would be member 2 as noted in the database.

The current status of the event member is not included within key index 1010 because the database is specific to a particular event type. In this example, the database is used to resolve state and status information following a member transition from online to offline. When a member transitions offline, the current status of the event member is offline. Since reference is made to a specified database in accordance with this resulting offline status, there is no need to reference the database according to the event member status. However, in embodiments where a single database is provided for transitions both from offline to online status and online to offline status, the event member status can be included with the key index as a separate column. In this manner, a single database can be provided and based upon the resulting event member status resulting from the event, an appropriate entry identified.

Cluster manager 902 can reference a dynamic state and status indicator to determine the current state of an event member and the current state and status of each remaining member of a CVLU after an event is generated. This information is used to formulate a key that is used to determine an appropriate entry within the rules database. The cluster manager can correlate the current state of the event member with the current status and state of the remaining members to formulate a key. This key can then be compared against key index 1010 to find a matching entry. For example, if cluster manager 902 determines that member M1 has transitioned offline (X), CM 902 may access DSSI 912$_1$ and determine: that the event member (M1) is synchronized (S); that member M2 is online (O), and that M2 needs synchronization (NS). CM 902 can determine that rule number 3 matches this scenario because the key (S, O, NS) matches the key index of rule number 3.

After determining that rule number 3 matches, CM 902 can determine the resulting event member state (column 1012), resulting state and status of member 2 (columns 1014 and 1016), and resulting status of CVLU 920 (column 1018). If a single table or database is used for both online to offline transitions and offline to online transitions, the current status of the event member can be used in the key to find a matching index. An additional column having the current event member status is included in the index. If an event is detected, the member's status as a result of the event is determined and added to the key. The key is used to find a matching entry in the key index. In this manner a single database or table can be provided for both types of transitions.

The 7 rules for online to offline transitions for a two member CVLU depicted in FIG. 24 are:

1. If the event member state is synchronized and member 2 is online and synchronized, the resulting event member state is needs synchronization, the resulting member 2 status is online, the resulting member 2 state is synchronized, and the resulting CVLU status is online;

2. If the event member is synchronized and member 2 is online and being synchronized, the resulting event member state is synchronized, the resulting member 2 status is online, the resulting member 2 state is needs synchronization, and the resulting CVLU status is offline;

3. If the event member is synchronized and member 2 is online and needs synchronization, the resulting event member state is synchronized, the resulting member 2 status is online, the resulting member 2 state is needs synchronization, and the resulting CVLU status is offline;

4. If the event member is synchronized and member 2 is offline and synchronized, the resulting event member state is synchronized, the resulting member 2 status is offline, the resulting member 2 state is needs synchronization, and the resulting CVLU status is offline;

5. If the event member is synchronized and member 2 is offline and needs synchronization, the resulting event member state is synchronized, the resulting member 2 status is offline, the resulting member 2 state is needs synchronization, and the resulting CVLU status is offline;

6. If the event member is synchronized and member 2 is offline and being synchronized, the resulting event member state is synchronized, the resulting member 2 status is offline, the resulting member 2 state is needs synchronization, and the resulting CVLU status is offline; and 7. If the event member is being synchronized and member 2 is online and synchronized, the resulting event member state is needs synchronization, the resulting member 2 status is online, the resulting member 2 state is synchronized, and the resulting CVLU status is online.

FIG. 26 depicts a second table or rules database 1020 that can be used for offline-to-online transitions for a two-member CVLU. Tables 1002 and 1020, collectively, provide for each possible combination and permutation of the current state and status of each member of a two-member CVLU when a member transitions from online to offline or offline to online. When a member event is detected that is associated with transition from offline to online, table 1020 is accessed to determine the resulting state and status of each member as well as the resulting status of the CVLU. When an event associated with a member transitioning from online to offline is detected, table 1002 can be accessed to determine the resulting state and status of each member and the resulting status of the CVLU information.

The 5 rules for offline-to-online transitions for a two-member CVLU depicted in FIG. 26 are:

1. If the event member is synchronized and member 2 is online and synchronized, the resulting event member state is being synchronized, the resulting member 2 status is online, the resulting member 2 state is synchronized, and the resulting CVLU status is online;

2. If the event member is synchronized and member 2 is online and needs synchronization, the resulting event member state is synchronized, the resulting member 2 status is online, the resulting member 2 state is being synchronized, and the resulting CVLU status is online;

3. If the event member is synchronized and member 2 is offline and needs synchronization, the resulting event member state is synchronized, the resulting member 2 status is offline, the resulting member 2 state is needs synchronization, and the resulting CVLU status is online;

4. If the event member needs synchronization and member 2 is online and synchronized, the resulting event member state is being synchronized, the resulting member 2 status is online, the resulting member 2 state is synchronized, and the resulting CVLU status is online; and 5. If the event member needs synchronization and member 2 is offline and synchronized, the resulting event member state is needs synchronization, the resulting member 2 status is offline, the resulting member 2 state is synchronized, and the resulting CVLU status is offline.

Figure 27:
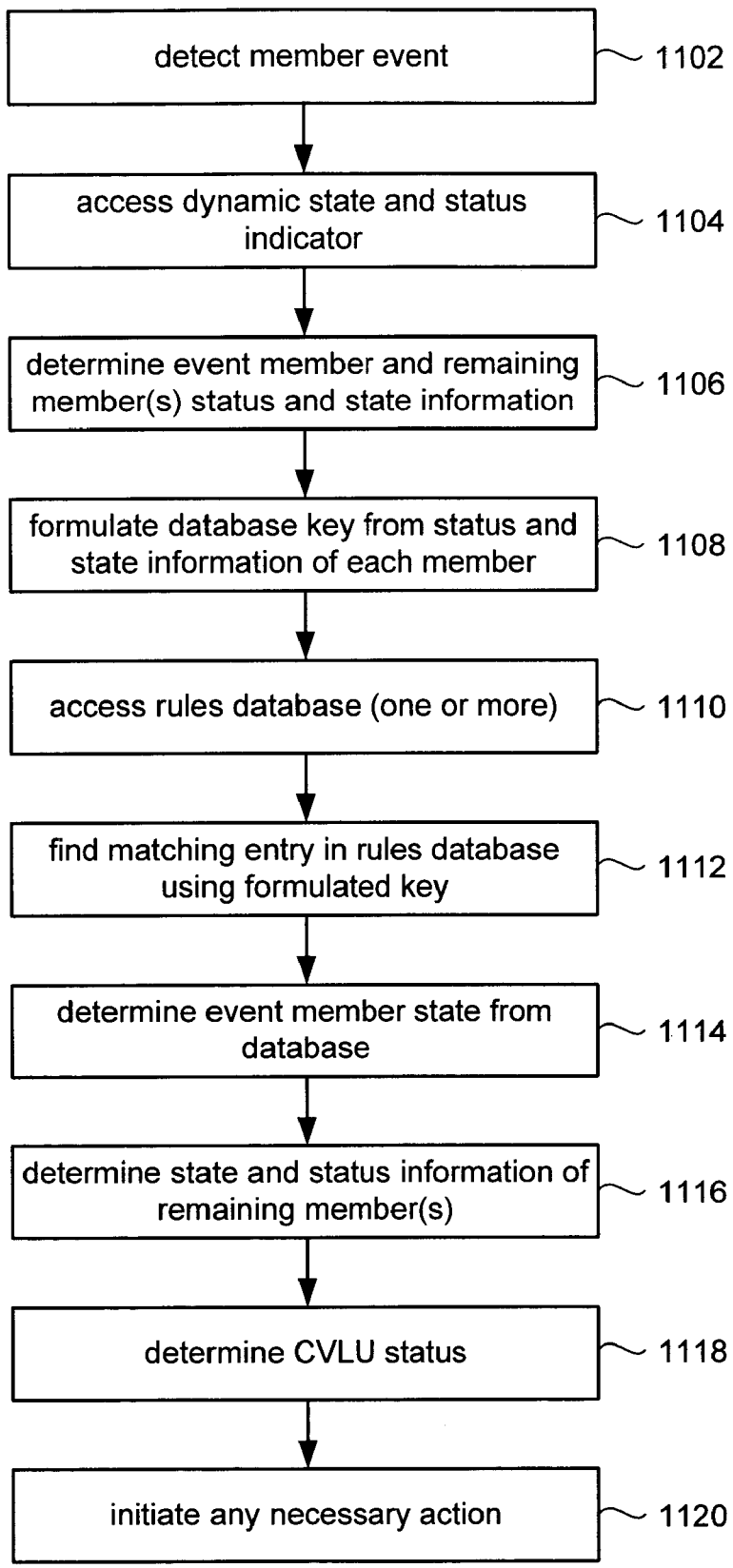
FIG. 27 is a flowchart for using a rules database to determine status and/or state information for a virtual logical unit configuration.

FIG. 27 is flowchart depicting a method in accordance with one embodiment for utilizing a rules engine including a rules database and dynamic state and status indicator to maintain consistency and availability of data in a clustered virtualized logical unit configuration. At step 1102, a storage switch detects a member event. The event is detected at a local storage switch to which a physical target is connected. With respect to FIG. 23, for example, unplugging physical target PT1 from switch 930 causes a member event at switch 930. The event is detected and determined to be associated with a member of a CVLU. A cluster manager such as CM 902 can determine resulting state and status information for the CVLU. The cluster manager can also determine any necessary action(s) to take in response to the detected event.

At step 1104, the CM accesses a dynamic state and status indicator associated with the CVLU. As previously described, this dynamic state and status indicator may be part of a larger database of information pertaining to VLUs and CVLUs provisioned at the local switch. At step 1104, the CM will determine the state of the event member as well as the status and state of each remaining member of the CVLU. In the example of FIG. 23, CM 902 determines the state of member M1 (event member) and the state and status of member M2 from DSSI 912$_1$. CM 902 knows the status of event member M1 from the event itself.

The CM formulates a database key from the status and state information at step 1108. For example, the CM can aggregate or pool the information in order to form a key that can be used when accessing a rules database associated with the CVLU. At step 1110, the CM accesses the rules database. As previously described, step 1110 can include accessing a single database comprising tables or information pertaining to both online-to-offline transitions and offline to online transitions, or can include accessing a specialized database or table for one of these types of transitions. If a single table is used for both offline-to-online and online-to-offline transitions, then the key formulated at step 1108 will include the status of the event member, such that that information can be used to access the appropriate database. The resulting status of the event member as determined from the event will denote whether the applicable rule (and entry in the database) is an offline-to-online rule or an online-to-offline rule. If the database includes individual databases or tables for offline-to-online and online-to-offline events, then the key need only include the current state of the event member.

At step 1112, the cluster manager will find a matching entry in the rules database using the key formulated at step 1108. At step 1114, the event member's state is determined from the database. At step 1116, the CM determines the state and status of each remaining member of the CVLU. At step 1118, the cluster manager determines the resulting status of the CVLU from the detected event.

At step 1120, the cluster manager reports the resulting state and status information to the local provisioning module. The cluster manager can further initiate any necessary action or set of actions in response to the resulting states and status of the members and CVLU. The cluster manager can directly initiate action or an instruction to a local provisioning module can initiate such action or set of actions. For example, the local provisioning module can initiate a logical unit copy for a member after determining that the member is in a needs synchronization state as a result of a member state transition. Likewise, an LPM can bring a VLU offline in order to bring a corresponding CVLU offline. Furthermore, an LPM can pass a control message to another switch associated with the CVLU to bring its local VLU for the CVLU offline.

FIGS. 28*a* and 28*b* depict a rules database 1200 for a three-member CVLU. FIGS. 28*a* and 28*b* depict 76 rules representing 76 possible state and status combinations at the time an event associated with a member status transition to online from offline. Rules database 1200 is very similar to rules databases 1002 and 1020. However, rules database 1200 includes two extra columns for the additional member's state and status. As with databases 1002 and 1020, rules database 1200 includes a key index 1202 formed of the current state of the event member and the state and status of each remaining member of the CVLU.

FIGS. 29*a* and 29*b* depict a rules database 1220 for offline-to-online member status transitions in a three-member CVLU configuration. As with the online-to-offline member status transitions, there are 76 rules representing each possible current situation when the offline-to-online transition is detected.

FIGS. 30*a* and 30*b* depict a rules database 1300 for online-to-offline member status transitions in a four-member CVLU. FIG. 31 depicts a rules database 1320 for offline-to-online member status transitions in a four-member CVLU. For the sake of brevity, FIGS. 30*a*-31 include the notations * and UT. A * refers to either a synchronized, needs synchronization, or being synchronized state. Where a * is denoted, the remaining column values are the same regardless of the state denoted with the *. In an actual implementation, three separate rows can be provided for each possible state as represented by the *. For example, rule number 1 in FIG. 30*a* would actually include three separate rules, each with a different state for the event member but all having the same values for each remaining column. A UT refers to an untouched value. This denotes that the status of the member denoted with a UT does not change as a result of the that combination of current states and status. If the status was online, it remains online after the event. If the status was offline, it remains offline after the event. Any entry having a UT designation could have two separate rows or rules provided in an actual implementation to represent each status.

The foregoing disclosure of a state maintenance rules engine has been presented with respect to clustered virtual logical units. The present disclosure is not so limited however. It will be apparent to those of ordinary skill in the art that the principles set forth for a rules engine to resolve state and status information for a CVLU could be equally applied to more standard non-clustered VLUs. A rules database and dynamic state and status indicator can interface with a local provisioning module, for example. The LPM can manage and maintain member and VLU state and status information just as the cluster manager does for a CVLU. The LPM can utilize the current state and status of a VLU to access a database and determine resulting state and status information for the VLU following a detected member status transition.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto and their equivalents.

What is claimed is:

1. A method of managing virtual logical units in a storage network, comprising:
   detecting an event associated with at least one first member of a virtual logical unit of said storage network;
   determining a first status of said at least one first member as a result of said event;
   accessing a current state and second status of at least one second member of said virtual logical unit, said at least one first and at least one second members corresponding to one or more physical storage units of said storage network; and
   determining a resulting status of said virtual logical unit from a rules database, wherein said current state and second status of said at least one second member and said first status of said at least one first member are used as indices into said rules database to information indicating said resulting status.

2. The method of claim 1, wherein said virtual logical unit is a part of a clustered virtual logical unit.

3. The method of claim 2, wherein said clustered virtual logical unit includes as a first instance said virtual logical unit provisioned at a first storage switch of said storage network, and a second instance of another virtual logical unit provisioned at a second storage switch of said storage network.

4. The method of claim 3, wherein said at least one first member includes a local portion provisioned at said first storage switch and a remote portion provisioned at said second storage switch; and
   said at least one second member includes another local portion provisioned at said second storage switch and another remote portion provisioned at said first storage switch.

5. The method of claim 4, wherein:
   said at least one first member represents a virtualization of one or more first physical logical units coupled to said first storage switch; and
   said at least one second member represents another virtualization of one or more second physical logical units coupled to said second storage switch.

6. The method of claim 1, further comprising: formulating a key from said first status of said at least one first member and said current state and second status of said at least one second member for accessing said information in said rules database.

7. The method of claim 6, further comprising:
   determining said first state of said at least one first member and said current state and second status of said at least one second member from said rules database, wherein said current state and second status of said at least one second member and said first status of said at least one first member are used to index into said rules database.

8. The method of claim 7, wherein said step of determining a first state of said at least one first member and a current state and second status of said at least one second member comprises:
   matching said key to a key index in said rules database to determine an entry corresponding to said first status of said at least one first member and said current state and second status information for of said at least one second member; and
   determining said first state of said at least one first member and said current state and second status of said at least one second member from said entry in said rules database.

9. The method of claim 6, wherein said step of determining a resulting status of said virtual logical unit comprises:
   matching said key to a key index in said rules database to determine an entry corresponding to said first status of said at least one first member and said current state and second status for of said at least one second member; and
   determining said resulting status of said virtual logical unit from said entry in said rules database.

10. The method of claim 1, wherein said step of accessing said state and second status of at least one second member of said virtual logical unit includes:
    accessing a dynamic state and status indicator for said virtual logical unit, said dynamic state and status indicator is dynamically updated to reflect state and status information of each member of said virtual logical unit.

11. The method of claim 1, wherein said first status of said at least one first member includes at least one of online and offline.

12. The method of claim 1, wherein said current state of said at least one second member includes at least one of synchronized, needs synchronization, and being synchronized.

13. A storage network, comprising:
    a virtual logical unit including at least one first member and at least one second member, said first and said second members corresponding to one or more physical storage units of said storage network;
    a state and status indicator for said virtual logical unit, said state and status indicator indicating a current state and a current status of each of said first and second members of said first virtual logical unit;
    a rules database including resulting status information for said virtual logical unit, said resulting status information being indexed in said rules database based upon an event associated with one or both of said first and second members of said virtual logical unit and said current state and current status of each member; and
    a management module adapted to receive an indication of said event, wherein said management module, upon receipt of said indication, determines resulting status information for said virtual logical unit using said state and status indicator and said rules database.

14. The storage network of claim 13, wherein said rules database includes a plurality of entries and a key index for said plurality of entries;
said key index, comprising for each of said entries, a first field for a current first state of said first member, a second field for a current second state of said second member, and a third field for a current status of said second member.

15. The storage network of claim 14, wherein:
said key index further includes a fourth field for the current status of said first member.

16. The storage network of claim 15, wherein said status comprises one of online or offline of said members, and said rules database includes entries for offline to online member transitions and entries for online to offline member transitions.

17. The storage network of claim 16, wherein:
said fourth field denotes the current state of said first member as online for each entry in said rules database corresponding to offline to online member transitions; and
said fourth field denotes the current state of said first member as offline for each entry in said rules database corresponding to online to offline member transitions.

18. The storage network of claim 14, wherein:
said rules database includes a first portion for offline to online member transitions and a second portion for online to offline member transitions.

19. The storage network of claim 13, wherein said management module comprises a processor that, upon receiving said indication:
accesses said state and status indicator to determine the current state and status of said second member and the current state of said first member;
formulates a key using said current state and current status;
matches said key to a key index in said rules database to determine an entry corresponding to said current state and current status of said second member and said current state of said first member; and
determines the resulting status information for said virtual logical unit from said entry in said rules database.

20. The storage network of claim 19, wherein:
said rules database further includes resulting state and status information for said second member and resulting state information for said first member; and
said management module, upon receiving said indication, further determines resulting state information for said first member and resulting state and status information for said second member from said entry in said rules database.

21. One or more processor readable storage devices having processor readable code embodied thereon for controlling one or more processors to perform a method in a storage network comprising:
detecting an event associated with at least one first member of a virtual logical unit of said storage network:
determining a first status of said first member as a result of said event;
accessing a current state and second status of at least one second member of said virtual logical unit, said first and second members corresponding to one or more physical storage units of said storage network; and
determining a resulting status of said virtual logical unit from a rules database, wherein said current state and second status of said second member and said resulting status of said first member are used as indices into said rules database to information indicating said resulting status.

22. One or more processor readable storage devices according to claim 21, wherein said method further comprises:
formulating a key from said first status of said first member and said current state and second status of said second member for accessing said information in said rules database.

23. One or more processor readable storage devices according to claim 22, wherein said step of determining a resulting status of said virtual logical unit comprises:
matching said key to a key index in said rules database to determine an entry corresponding to said first status of said first member and said current state and second status information for said second member; and
determining said resulting status of said virtual logical unit from said entry in said rules database.

24. One or more processor readable storage devices according to claim 22, wherein said method further comprises:
determining said first state of said first member and said current state and second status of said second member from said rules database, wherein said current state and second status of said second member and said first status of said first member are used to index into said rules database.

25. A method of managing a storage network, comprising:
providing a dynamic state and status indicator for indicating, respectively, a synchronization state and an online/offline status of at least one first member of a virtual logical unit provisioned at a storage switch of said storage network;
providing a table of resulting state and status information for said virtual logical unit, said resulting state and status information includes a plurality of entries of said resulting state and status information indexed according to at least a current state and a current status of a second member of said virtual logical unit, said first and second members corresponding to one or more physical storage units of said storage network; and
updating said resulting state and status information as changed upon an occurrence of an event associated with one of said members.

26. The method of claim 25, wherein:
said plurality of entries are further indexed according to the status of a member of said virtual logical unit that is changed by said event.

27. The method of claim 26, further comprising:
detecting another event associated with said second member and determining a status of said second member;
classifying said second member as an event member;
determining current state and status information for said first member from said dynamic state and status indicator;
matching an entry in said table based on said current state and status information for said first member and said status of said second member; and
determining said resulting status of said virtual logical unit from said matching entry.

28. One or more processor readable storage devices having processor readable code embodied thereon for controlling one or more processors to perform a method in a storage network comprising:
providing a dynamic state and status indicator for indicating, respectively, a synchronization state and an online/ offline status of at least one first member of a virtual logical unit provisioned at a storage switch of said storage network;

providing a table of resulting state and status information for said virtual logical unit, said resulting state and status information includes a plurality of entries of said resulting state and status information indexed according to at least a current state and a current status of a second member of said virtual logical unit, said first and second members corresponding to one or more physical storage units of said storage network; and updating said resulting state and status information as changed upon an occurrence of an event associated with one of said members.

* * * * *